(12) United States Patent
Kitada

(10) Patent No.: US 7,679,767 B2
(45) Date of Patent: Mar. 16, 2010

(54) PRINTING SYSTEM, PRINTER, AND PROGRAM AND METHOD OF CONTROLLING THE PRINTER

(75) Inventor: Naruhide Kitada, Fujimi (JP)

(73) Assignee: Seiko Epson Corporation (JP)

( * ) Notice: Subject to any disclaimer, the term of this patent is extended or adjusted under 35 U.S.C. 154(b) by 1174 days.

(21) Appl. No.: 11/262,346

(22) Filed: Oct. 28, 2005

(65) Prior Publication Data

US 2006/0092461 A1 May 4, 2006

(30) Foreign Application Priority Data

Nov. 1, 2004 (JP) ............................. 2004-317564
Aug. 5, 2005 (JP) ............................. 2005-227988

(51) Int. Cl.
*G06K 15/00* (2006.01)
(52) U.S. Cl. ...................... 358/1.15; 358/1.14; 358/1.16
(58) Field of Classification Search ........................ None
See application file for complete search history.

(56) References Cited

U.S. PATENT DOCUMENTS

2001/0038462 A1* 11/2001 Teeuwen et al. ............ 358/1.15
2002/0145748 A1* 10/2002 Nonoyama et al. ......... 358/1.14

FOREIGN PATENT DOCUMENTS

| JP | 04-364971 | 12/1992 |
| JP | 11-191043 | 7/1999 |
| JP | 2001-306273 | 11/2001 |
| JP | 2003-140875 | 5/2003 |

\* cited by examiner

*Primary Examiner*—Mark K Zimmerman
*Assistant Examiner*—Haris Sabah
(74) *Attorney, Agent, or Firm*—Harness, Dickey & Pierce, P.L.C.

(57) ABSTRACT

A printing system is provided which includes a first printer; a second printer; and a print instruction unit. The first and second printers execute printing on the basis of print data. The first printer and the print instruction unit are connected so that data can be transmitted. The first printer and the second printer are connected so that data can be transmitted.

21 Claims, 16 Drawing Sheets

FIG. 8A

ADDRESS INFORMATION

| FIRST PRINTER 3A | 111.111.111.001 |
|---|---|
| FIRST PRINTER 3B | 111.111.111.002 |
| SECOND PRINTER 4A | 111.111.111.003 |
| SECOND PRINTER 4B | 111.111.111.004 |

FIG. 8B

FIRST PRINT-INSTRUCTION INFORMATION

| USER INFORMATION | EPS¥0001234 |
|---|---|
| NUMBER OF SETS | 10 |
| DESTINATION ADDRESS | 111.111.111.001 |

FIG. 8C

SECOND PRINT-INSTRUCTION INFORMATION

| USER INFORMATION | EPS¥0001234 |
|---|---|

FIG. 8D

PRINT-REQUEST INFORMATION 1

| USER INFORMATION | EPS¥0001234 |
|---|---|
| ADDRESS OF SECOND PRINTER | 111.111.111.003 |
| OPERATING CONDITION | NORMAL |

FIG. 8E

PRINTABLE-TIME-ZONE INFORMATION

| PRINTABLE TIME ZONE | 8:00~22:00 |
|---|---|

FIG. 8F

PRINT-REQUEST INFORMATION 2

| USER INFORMATION | EPS¥0001234 |
|---|---|
| ADDRESS OF SECOND PRINTER | 111.111.111.003 |
| OPERATING CONDITION | PAPER JAMMING |

FIG.11A ADDRESS INFORMATION

| ADDRESS INFORMATION | |
|---|---|
| FIRST PRINTER 3A | 111.111.111.001 |
| FIRST PRINTER 3B | 111.111.111.002 |
| SECOND PRINTER 4A | 111.111.111.003 |
| SECOND PRINTER 4B | 111.111.111.004 |
| INFORMATION PROCESSOR 2 | 111.111.111.005 |

FIG.11B

| FIRST PRINT-INSTRUCTION INFORMATION | |
|---|---|
| USER INFORMATION | EPS¥0001234 |
| DESTINATION ADDRESS | 111.111.111.001 |
| SOURCE ADDRESS | 111.111.111.005 |

FIG.11C STRUCTURE OF PRINT DATA STORED IN INFORMATION PROCESSOR 2

| USER INFORMATION | DOCUMENT ID (PRINT DATA) |
|---|---|
| ESP¥0001234 | 20040801001 |
| ESP¥0001235 | 20040801002 |

FIG.11D

| SECOND PRINT-INSTRUCTION INFORMATION | |
|---|---|
| USER INFORMATION | EPS¥0001234 |

FIG.11E

| PRINT-REQUEST INFORMATION | |
|---|---|
| USER INFORMATION | EPS¥0001234 |
| ADDRESS OF SECOND PRINTER | 111.111.111.003 |
| OPERATING CONDITION | NORMAL |

FIG.11F

| PRINTABLE-TIME-ZONE INFORMATION | |
|---|---|
| PRINTABLE TIME ZONE | 8:00~22:00 |

FIG.11G

| PRINT-REQUEST INFORMATION | |
|---|---|
| USER INFORMATION | EPS¥0001234 |
| ADDRESS OF FIRST PRINTER | 111.111.111.001 |

FIG.19A ADDRESS INFORMATION

| FIRST PRINTER 7 | 111.111.111.006 |
|---|---|
| SECOND PRINTER 8 | 111.111.112.001 |
| THIRD PRINTER 9 | 111.111.112.002 |

FIG.19B HEADER INFORMATION OF FIRST PRINT-INSTRUCTION INFORMATION

| USER INFORMATION | EPS¥0001234 |
|---|---|
| NUMBER OF SETS | 10 |
| DESTINATION ADDRESS | 111.111.111.006 |

FIG.19C SECOND PRINT-INSTRUCTION INFORMATION

| USER INFORMATION | EPS¥0001234 |
|---|---|

FIG.19D FIRST PRINT-REQUEST INFORMATION 1

| USER INFORMATION | EPS¥0001234 |
|---|---|
| ADDRESS OF SECOND PRINTER | 111.111.112.001 |
| OPERATING CONDITION | NORMAL |

FIG.19E SECOND PRINT-REQUEST INFORMATION 1

| USER INFORMATION | EPS¥0001234 |
|---|---|
| ADDRESS OF SECOND PRINTER | 111.111.112.001 |
| OPERATING CONDITION | NORMAL |
| ADDRESS OF THIRD PRINTER | 111.111.112.002 |

FIG.19F FIRST PRINT-REQUEST INFORMATION 2

| USER INFORMATION | EPS¥0001234 |
|---|---|
| ADDRESS OF SECOND PRINTER | 111.111.112.001 |
| OPERATING CONDITION | DOING EXCESS PROCESSING |

FIG.19G SECOND PRINT-REQUEST INFORMATION 2

| USER INFORMATION | EPS¥0001234 |
|---|---|
| ADDRESS OF SECOND PRINTER | 111.111.112.001 |
| OPERATING CONDITION | DOING EXCESS PROCESSING |
| ADDRESS OF THIRD PRINTER | 111.111.112.002 |

PRINTING SYSTEM, PRINTER, AND PROGRAM AND METHOD OF CONTROLLING THE PRINTER

BACKGROUND

1. Technical Field

The present invention relates to a printing system that uses a plurality of printers, and in particular, it relates to a printing system in which a printer can obtain print data from another printer without the intermediary of a printer server, and printers and a program and a method for controlling the printer, which construct the printing system.

2. Related Art

For printing in general printers, when print instructions are sent from information processors capable of issuing print instructions, such as personal computers (PCs), to printers, printing is immediately executed. Accordingly, even confidential printed matters are left on the output tray of the printers until the person(s) who gave the print instructions go to the printers for the printed matters. This may produce problems in that the contents of the printed matters are exposed to others or the printed matters themselves are taken away by unauthorized persons.

In view of the foregoing problems, techniques for printing have been disclosed in which persons who give print instructions can obtain printed matters without exposing the printed matters to third persons including: a printer and a print control method disclosed in JP-A-4-364971 (Patent Document 1); and a method and an apparatus for outputting images disclosed in JP-A-2001-306273 (Patent Document 2).

With the printer and the print control method of Patent Document 1, even when a print job is sent from a print instruction terminal, the printer does not immediately execute printing, but holds the print job in standby and then executes printing after being instructed to execute printing in response to the print job via an instruction input mechanism of the printer.

With the method and apparatus for outputting images disclosed in Patent Document 2, when an authentication code is sent together with print data from a client unit, the printer system does not immediately execute printing, but generates reference data from the received print data, encrypts the print data using the authentication code to generate storage data, and stores the storage data in a storage unit in association with the reference data. When a user selects the storage data and inputs the authentication code, a printer server decodes the storage data using the inputted authentication code and determines whether or not the decoding has been executed correctly. When the decoding has been executed correctly, the decoded result is printed by the printer.

By the techniques disclosed in Patent Documents 1 and 2, however, in the case where a print instructor cannot go to a remote printer for print output or in the case where a printer to which a print job is sent runs out of toner, the print instructor cannot change the destination of printing at the first print destination to obtain the printed matter by another printer (different from the initial destination printer).

Accordingly, another technique including a printing system, an output terminal, and a printing method is disclosed in JP-A-2003-140875 (Patent Document 3) in which a print instructor can select a destination printer on the spot.

The printing system, the output terminal, and the printing method of Patent Document 3 allow a print instructor to input authentication information onto printers in shops, and to print a corresponding print job. This system allows the print instructor to change a destination printer as deemed appropriate.

However, the printing system of Patent Document 3 needs an additional printer server for storing print information. This poses problems such as increasing the size of the system and complicating the maintenance of the system because printers for authentication printing must be registered in the printer server.

SUMMARY

An advantage of some aspects of the invention is to provide a printing system in which a printer can obtain print data from another printer without the intermediary of a printer server, and printers and a program and a method for controlling the printers, which construct the printing system.

Form 1

A printing system according to an aspect of the invention includes a first printer; a second printer; and a print instruction unit. The first and second printers execute printing on the basis of print data. The first printer and the print instruction unit are connected so that data can be transmitted. The first printer and the second printer are connected so that data can be transmitted.

The print instruction unit includes: a print-instruction-information generating unit that generates first print-instruction information containing the print data and first authentication information; a print-instruction-information transmission unit that transmits the first print-instruction information generated by the print-instruction-information generating unit to the first printer; a print-instruction-information acquisition unit that obtains second print-instruction information of the print data for the second printer, the second print-instruction information containing second authentication information corresponding to the first authentication information; and a print-request-information transmission unit that transmits print-request information to the first printer, the print-request information containing information on the second printer in addition to the second print-instruction information obtained by the print-instruction-information acquisition unit.

The first printer includes: a print-instruction-information storage unit that stores the first print-instruction information received from the print instruction unit; a determination unit that receives the print-request information transmitted from the print-request-information transmission unit, and determines whether or not there is first print-instruction information corresponding to the print-request information on the basis of the second authentication information in the received print-request information and the first authentication information contained in the first print-instruction information stored in the print-instruction-information storage unit; and a print-data transmission unit that transmits print data corresponding to the print-request information to the second printer corresponding to the print-request information when it is determined from the determination result of the determination unit that first print-instruction information corresponding to the print-request information is present.

The second printer executes printing on the basis of the print data received from the first printer and corresponding to the print-request information.

With such a structure, the print instruction unit can generate first print-instruction information containing print data and first authentication information with the print-instruction-information generating unit, and can transmit the first print-instruction information generated by the print-instruction-information generating unit to the first printer with the print-instruction-information transmission unit.

The printing system can obtain second print-instruction information of the print data for the second printer with the print-instruction-information acquisition unit, the second print-instruction information containing second authentication information corresponding to the first authentication information with the print-instruction-information acquisition unit; and can transmit print-request information to the first printer with the print-request-information transmission unit, the print-request information containing information on the second printer in addition to the second print-instruction information obtained by the print-instruction-information acquisition unit.

The first printer can store the first print-instruction information received from the print instruction unit by the print-instruction-information storage unit; can receive the print-request information transmitted from the print-request-information transmission unit, and determine whether or not there is first print-instruction information corresponding to the print-request information on the basis of the second authentication information in the received print-request information and the first authentication information contained in the first print-instruction information stored in the print-instruction-information storage unit by the determination unit; and can transmit print data corresponding to the print-request information to the second printer corresponding to the print-request information by the print-data transmission unit when it is determined from the determination result of the determination unit that first print-instruction information corresponding to the print-request information is present.

The second printer can execute printing on the basis of the print data received from the first printer and corresponding to the print-request information.

Since print-request information for the second printer is sent to the first printer, the second printer can obtain print data corresponding to the print-request information from the first printer. This eliminates the necessity for the printing system to have an information processor that relays print data, such as a printer server, thus offering the advantage of reducing the cost of the system.

The format of print data includes created files such as a document file and an image file created by a document editor and an image editor, and intermediate files converted from the document file or image file to a intermediate-language description (e.g., page description language (PDL)). Accordingly, the process of printing of a printer sometimes includes not only the process of printing characters or pictures on a printed matter (the surface of paper, CD, and DVD media, etc.) for outputting on the basis of the print data but also converting document files and image files to intermediate-language description and rendering process of converting intermediate files to image data for printing (e.g., bitmap data). This also applies to the printing system of Forms 2 to 4, the first printer of Forms 9, 11, 13, and 16, the second printer of Forms 10, 12, 14, and 17, the third printer of Form 15, the first-printer control program of Forms 22, 24, 26, and 29, the second-printer control program of Forms 23, 25, 27, and 30, the third-printer control program of Form 28, the first-printer control method of Forms 35, 37, 39, and 42, the second-printer control method of Forms 36, 38, 40, and 43, and the third-printer control method of Form 41.

The first authentication information and the second authentication information are information for authenticating a user who provides print instruction, such as information on the user and information in which user information is encrypted. The determination unit determines whether or not there is print-instruction information corresponding to print-request information by determination using the first authentication information and the second authentication information, such as simply determining whether or not the first authentication information and the second authentication information match or determining whether or not the results of decoding the encrypted first authentication information and the encrypted second authentication information using different decoding information match. This also applies to the printing system of Forms 2 to 4, the first printer of Forms 9, 11, 13, and 16, the first-printer control program of Forms 22, 24, 26, and 29, and the first-printer control method of Forms 35, 37, 39, and 42.

Form 2

A printing system according to another aspect of the invention includes: a first printer; a second printer; and a print instruction unit, the first and second printers executing printing on the basis of print data. The first printer and the print instruction unit are connected so that data can be transmitted. The first printer and the second printer are connected so that data can be transmitted.

The print instruction unit includes: a print-instruction-information generating unit that generates first print-instruction information containing first authentication information corresponding to the print data; a print-data storage unit that stores print data corresponding to the first print-instruction information; a print-instruction-information transmission unit that transmits the first print-instruction information generated by the print-instruction-information generating unit to the first printer; a first print-data transmission unit that reads print data corresponding to the print-data-acquisition-request information received from the first printer from the print-data storage unit and transmits the read print data to the first printer that is the source of the acquisition-request information; a print-instruction-information acquisition unit that obtains second print-instruction information of the print data for the second printer, the second print-instruction information containing second authentication information corresponding to the first authentication information; and a print-request-information transmission unit that transmits print-request information to the first printer, the print-request information containing information on the second printer in addition to the second print-instruction information obtained by the print-instruction-information acquisition unit.

The first printer includes: a print-instruction-information storage unit that stores the first print-instruction information received from the print instruction unit; a determination unit that receives the print-request information transmitted from the print-request-information transmission unit and determines whether or not there is first print-instruction information corresponding to the print-request information on the basis of the second authentication information in the received print-request information and the first authentication information contained in the print-instruction information stored in the print-instruction-information storage unit; an acquisition-request-information transmission unit that transmits acquisition-request information of print data corresponding to the first print-instruction information to the print instruction unit when it is determined from the determination result of the determination unit that first print-instruction information corresponding to the print-request information is present; and a second print-data transmission unit that transmits print data corresponding to the acquisition-request information received from the print instruction unit to a second printer corresponding to the print-request information.

The second printer executes printing on the basis of the print data received from the first printer and corresponding to the print-request information.

With such a structure, the print instruction unit can generate first print-instruction information containing first authentication information by the print-instruction-information generating unit; can store print data corresponding to the first print-instruction information with the print-data storage unit; can transmit the first print-instruction information generated by the print-instruction-information generating unit to the first printer by the print-instruction information transmission unit; and can read print data corresponding to the print-data-acquisition-request information received from the first printer from the print-data storage unit and transmit the read print data to the first printer that is the source of the acquisition-request information by the first print-data transmission unit.

The printing system can obtain second print-instruction information of the print data for the second printer by the print-instruction-information acquisition unit, the second print-instruction information containing second authentication information corresponding to the first authentication information; and can transmit print-request information to the first printer by the print-request-information transmission unit, the print-request information containing information on the second printer in addition to the second print-instruction information obtained by the print-instruction-information acquisition unit.

The first printer can store the first print-instruction information received from the print instruction unit by the print-instruction-information storage unit; and can receive the print-request information transmitted from the print-request-information transmission unit and determine whether or not there is first print-instruction information corresponding to the print-request information on the basis of the second authentication information in the received print-request information and the first authentication information contained in the first print-instruction information stored in the print-instruction-information storage unit by the determination unit; can transmit acquisition-request information of print data corresponding to the first print-instruction information to the print instruction unit by the acquisition-request-information transmission unit when it is determined from the determination result of the determination unit that first print-instruction information corresponding to the print-request information is present; and can transmit print data corresponding to the acquisition-request information received from the print instruction unit to a second printer corresponding to the print-request information by the second print-data transmission unit.

The second printer can execute printing on the basis of the print data received from the first printer and corresponding to the print-request information.

Since print-request information for the second printer is sent to the first printer, the second printer can obtain print data corresponding to the print-request information from the first printer. This eliminates the necessity for the printing system to have an information processor that relays print data, such as a printer server, thus offering the advantage of reducing the cost of configuring the system. Furthermore, the first printer has to only store the first print-instruction information that contains no print data and manage it, thus decreasing data memory capacity necessary for relaying print data.

Form 3

A printing system according to another aspect of the invention includes: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted.

The print instruction unit includes: a print-instruction-information generating unit that generates first print-instruction information containing the print data and first authentication information; a print-instruction-information transmission unit that transmits the first print-instruction information generated by the print-instruction-information generating unit to the first printer; a print-instruction-information acquisition unit that obtains second print-instruction information of the print data for the second printer, the second print-instruction information containing second authentication information corresponding to the first authentication information; and a first print-request-information transmission unit that transmits first print-request information to the third printer, the first print-request information containing information on the second printer in addition to the second print-instruction information obtained by the print-instruction-information acquisition unit.

The first printer includes: a print-instruction-information storage unit that stores the first print-instruction information received from the print instruction unit; a determination unit that determines whether or not there is first print-instruction information corresponding to the second print-request information, on the basis of the second authentication information in the second print-request information received from the third printer and the first authentication information contained in the first print-instruction information stored in the print-instruction-information storage unit; and a first print-data transmission unit that transmits print data corresponding to the second print-request information to the third printer corresponding to the second print-request information when it is determined from the determination result of the determination unit that first print-instruction information corresponding to the second print-request information is present.

The third printer includes: a second print-request-information transmission unit that transmits second print-request information to the first printer, the second print-request information containing information on the third printer in addition to the first print-request information received from the second printer; and a second print-data transmission unit that transmits the print data received from the first printer and corresponding to the second print-request information to the second printer corresponding to the second print-request information.

The second printer executes printing on the basis of the print data received from the third printer and corresponding to the print-request information.

With such a structure, the print instruction unit can generate first print-instruction information containing the print data and first authentication information by the print-instruction-information generating unit; and can transmit the first print-instruction information generated by the print-instruction-information generating unit to the first printer by the print-instruction-information transmission unit.

Also, the printing system can obtain second print-instruction information of the print data for the second printer by the print-instruction-information acquisition unit, the second print-instruction information containing second authentication information corresponding to the first authentication information; and can transmit first print-request information to the third printer by the first print-request-information transmission unit, the first print-request information containing information on the second printer in addition to the second print-instruction information obtained by the print-instruction-information acquisition unit.

The first printer can store the first print-instruction information received from the print instruction unit by the print-instruction-information storage unit; can determine whether or not there is first print-instruction information corresponding to the second print-request information, on the basis of the second authentication information in the second print-request information received from the third printer and the first authentication information contained in the first print-instruction information stored in the print-instruction-information storage unit by the determination unit; and can transmit print data corresponding to the second print-request information to the third printer corresponding to the second print-request information by the first print-data transmission unit when it is determined from the determination result of the determination unit that first print-instruction information corresponding to the second print-request information is present.

The third printer can transmit second print-request information to the first printer by the second print-request-information transmission unit, the second print-request information containing information on the third printer in addition to the first print-request information received from the second printer; and can transmit the print data received from the first printer and corresponding to the second print-request information to the second printer corresponding to the second print-request information by the second print-data transmission unit.

The second printer can execute printing on the basis of the print data received from the third printer and corresponding to the print-request information.

Since print-request information for the second printer is sent to the third printer, the second printer can obtain print data corresponding to the print-request information from the first printer via the third printer. This eliminates the necessity for the printing system to have an information processor that relays print data, such as a printer server, thus offering the advantage of reducing the cost of configuring the system, and obtaining print data from a first printer in various connections, such as a first printer connected to another network to which the third printer is connected, or a first printer located ahead of a firewall that allows only the passage of data from or to the third printer.

Form 4

A printing system according to another aspect of the invention includes a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted.

The print instruction unit includes: a print-instruction-information generating unit that generates first print-instruction information containing first authentication information corresponding to the print data; a print-data storage unit that stores print data corresponding to the first print-instruction information; a print-instruction information transmission unit that transmits the first print-instruction information generated by the print-instruction-information generating unit to the first printer; a first print-data transmission unit that reads print data corresponding to the print-data-acquisition-request information received from the first printer from the print-data storage unit and transmits the read print data to the first printer that is the source of the acquisition-request information; a print-instruction-information acquisition unit that obtains second print-instruction information of the print data for the second printer, the second print-instruction information containing second authentication information corresponding to the first authentication information; and a first print-request-information transmission unit that transmits first print-request information to the third printer, the first print-request information containing information on the second printer in addition to the second print-instruction information obtained by the print-instruction-information acquisition unit.

The first printer includes: a print-instruction-information storage unit that stores the first print-instruction information received from the print instruction unit; a determination unit that determines whether or not there is first print-instruction information corresponding to the second print-request information, on the basis of the second authentication information in the second print-request information received from the third printer and the first authentication information contained in the first print-instruction information stored in the print-instruction-information storage unit; an acquisition-request-information transmission unit that transmits acquisition-request information of print data corresponding to the first print-instruction information to the print instruction unit when it is determined from the determination result of the determination unit that first print-instruction information corresponding to the second print-request information is present; and a second print-data transmission unit that transmits print data received from the print instruction unit and corresponding to the second acquisition-request information to the third printer corresponding to the second print-request information.

The third printer includes: a second print-request-information transmission unit that transmits second print-request information containing information on the third printer in addition to the first print-request information received from the second printer to the first printer; and a third print-data transmission unit that transmits print data received from the first printer and corresponding to the second print-request information to the second printer corresponding to the second print-request information.

The second printer executes printing on the basis of the print data received from the third printer and corresponding to the print-request information.

With such a structure, the print instruction unit can generate first print-instruction information containing first authentication information by the print-instruction-information generating unit; and can store print data corresponding to the first print-instruction information by the print-data storage unit; can transmit the first print-instruction information generated by the print-instruction-information generating unit to the first printer by the print-instruction information transmission unit; and can read print data corresponding to the print-data-acquisition-request information received from the first printer from the print-data storage unit and transmit the read print data to the first printer that is the source of the acquisition-request information by the first print-data transmission unit.

The printing system can obtain second print-instruction information of the print data for the second printer by the print-instruction-information acquisition unit, the second print-instruction information containing second authentication information corresponding to the first authentication information; and can transmit first print-request information to the third printer by the first print-request-information transmission unit, the first print-request information containing information on the second printer in addition to the second print-instruction information obtained by the print-instruction-information acquisition unit.

The first printer can store the first print-instruction information received from the print instruction unit by the print-instruction-information storage unit; can determine whether or not there is first print-instruction information corresponding to the second print-request information, on the basis of the second authentication information in the second print-request information received from the third printer and the first authentication information contained in the first print-instruction information stored in the print-instruction-information storage unit by the determination unit; can transmit acquisition-request information of print data corresponding to the first print-instruction information to the print instruction unit by the acquisition-request-information transmission unit when it is determined from the determination result of the determination unit that first print-instruction information corresponding to the second print-request information is present; and can transmit print data received from the print instruction unit and corresponding to the second acquisition-request information to the third printer corresponding to the second print-request information by the second print-data transmission unit.

The third printer can transmit second print-request information containing information on the third printer in addition to the first print-request information received from the second printer to the first printer by the second print-request-information transmission unit; and can transmit print data received from the first printer and corresponding to the second print-request information to the second printer corresponding to the second print-request information by the second print-data transmission unit.

The second printer can execute printing on the basis of the print data received from the third printer and corresponding to the print-request information.

Since print-request information for the second printer is sent to the third printer, the second printer can obtain print data corresponding to the print-request information from the first printer via the third printer. This eliminates the necessity for the printing system to have an information processor that relays print data, such as a printer server, thus offering the advantage of reducing the cost of configuring the system, and obtaining print data from a first printer in various connections, such as a first printer connected to another network to which the third printer is connected, or a first printer located ahead of a firewall that allows only the passage of data from or to the third printer.

Form 5

Preferably, the first printer of the printing system of Form 1 or 2 further includes time-transmission determination unit that determines whether or not to transmit the print data to a second printer corresponding to the print-request information on the basis of time-zone information on a predetermined printable time zone and time information on the reception of the print-request information when the determination unit determines that there is first print-instruction information corresponding to the print-request information.

With such a structure, when the determination unit determines that there is first print-instruction information corresponding to the print-request information, the time-transmission determination unit can determine whether or not to transmit the print data to a second printer corresponding to the print-request information on the basis of time-zone information on a predetermined printable time zone and time information on the reception of the print-request information.

Thus no print data is sent to the second printer when the time that the print-request information is received is outside a predetermined printable time zone, thus offering the advantage of preventing printing of confidential documents by unauthorized persons at night or the like.

Form 6

Preferably, the first printer of the printing system of one of Forms 1, 2, and 5 further includes an operating-condition-information acquisition unit that obtains operating-condition information indicative of the operating condition of the second printer that is the destination of the print data; and an operation-transmission determination unit that determines whether or not to transmit the print data to the second printer corresponding to the print-request information on the basis of the obtained operating-condition information.

This structure allows acquisition of operating-condition information indicative of the operating condition of the second printer that is the destination of the print data by the operating-condition-information acquisition unit; and allows determination whether or not to transmit the print data to the second printer corresponding to the print-request information on the basis of the obtained operating-condition information by the operation-transmission determination unit.

This provides an operating condition such as when the second printer has a problem or when the second printer is executing a long printing process. Accordingly, no print data is transmitted to the second printer that is in an inappropriate operating condition to receive print data. This offers the advantage of preventing damage to print data due to transmission of print data to a malfunctioning second printer or preventing transmission of print data to an inappropriate second printer.

Form 7

Preferably, the first printer of the printing system of Form 3 or 4 further includes time-transmission determination unit that determines whether or not to transmit the print data to a second printer corresponding to the second print-request information on the basis of time-zone information on a predetermined printable time zone and time information on the reception of the second print-request information when the determination unit determines that there is first print-instruction information corresponding to the print-request information.

With such a structure, when the determination unit determines that there is first print-instruction information corresponding to the print-request information, the time-transmission determination unit can determine whether or not to transmit the print data to a second printer corresponding to the second print-request information on the basis of time-zone information on a predetermined printable time zone and time information on the reception of the second print-request information.

Thus no print data is sent to the second printer when the time that the print-request information is received is outside a predetermined printable time zone, thus offering the advantage of preventing printing of confidential documents by unauthorized persons at night or the like.

Form 8

Preferably, the first printer of the printing system of one of Forms 3, 4, and 7 further includes an operating-condition-information acquisition unit that obtains operating-condition information indicative of the operating condition of the second printer that is the destination of the print data; and an operation-transmission determination unit that determines whether or not to transmit the print data to the second printer corresponding to the second print-request information on the basis of the obtained operating-condition information.

This structure allows acquisition of operating-condition information indicative of the operating condition of the second printer that is the destination of the print data by the operating-condition-information acquisition unit; and allows a determination whether or not to transmit the print data to the second printer corresponding to the second print-request information on the basis of the obtained operating-condition information by the operation-transmission determination unit.

This provides an operating condition such as when the second printer has a problem or when the second printer is executing a long printing process. Accordingly, no print data is transmitted to the second printer that is in an inappropriate operating condition to receive print data. This offers the advantage of preventing damage to print data due to transmission of print data to a malfunctioning second printer or preventing transmission of print data to an inappropriate second printer.

Form 9

A first printer according to another aspect of the invention is the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted.

The first printer includes a print-instruction-information storage unit that stores first print-instruction information received from a print instruction unit and containing print data and first authentication information; a determination unit that receives print-request information transmitted from a print-request-information transmission unit that transmits print-request information on the print data, the print-request information containing second authentication information corresponding to the first authentication information and information on the second printer, and determines whether or not there is print-instruction information corresponding to the print-request information on the basis of the second authentication information in the received print-request information and the first authentication information contained in the first print-instruction information stored in the print-instruction-information storage unit; and a print-data transmission unit that transmits print data corresponding to the print-request information to the second printer corresponding to the print-request information when it is determined from the determination result of the determination unit that first print-instruction information corresponding to the print-request information is present.

This structure allows storage of first print-instruction information containing print data and first authentication information received from a print instruction unit by the print-instruction-information storage unit; allows reception of the print-request information transmitted from the print-request-information transmission unit that transmits print-request information on the print data containing second authentication information corresponding to the first authentication information and information on the second printer, and determination on whether or not there is first print-instruction information corresponding to the print-request information, on the basis of the second authentication information in the received print-request information and the first authentication information contained in the first print-instruction information stored in the print-instruction-information storage unit by the determination unit; and allows transmission of print data corresponding to the print-request information to the second printer corresponding to the print-request information when it is determined from the determination result of the determination unit that first print-instruction information corresponding to the print-request information is present by the print-data transmission unit.

This form is a first printer applicable to the printing system of Form 1, and offers the same advantages as those of the printing system of Form 1.

Form 10

A second printer according to another aspect of the invention is the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted.

The second printer includes: a print-instruction-information acquisition unit that obtains second print-instruction information on the print data, the second print-instruction information containing second authentication information corresponding to first authentication information in first print-instruction information containing the first authentication information; and a print-request-information transmission unit that transmits print-request information to the first printer, the print-request information containing information on the second printer in addition to the second print-instruction information obtained by the print-instruction-information acquisition unit. The second printer executes printing on the basis of print data corresponding to the print-request information received from the first printer.

This structure allows acquisition of second print-instruction information of the print data for the second printer, the second print-instruction information containing second authentication information corresponding to first authentication information in first print-instruction information containing the first authentication information by the print-instruction-information acquisition unit; allows transmission of print-request information to the first printer, the print-request information containing information on the second printer in addition to the second print-instruction information obtained by the print-instruction-information acquisition unit to the first printer by the print-request-information transmission unit; and allows execution of printing on the basis of print data received from the first printer and corresponding to the print-request information.

This form is a second printer applicable to the printing system of Form 2, and offers the same advantages as those of the printing system of Form 2.

Form 11

A first printer according to another aspect of the invention is the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The first printer includes: a print-instruction-information storage unit that stores first print-instruction information received from the print instruction unit and containing first authentication information; a determination unit that receives print-request information transmitted from a print-request-information transmission unit that transmits print-request information of the print data and containing second authentication information corresponding to the first authentication information and information on the second printer, and determines whether or not there is first print-instruction information corresponding to the print-request information, on the basis of the second authentication information in the received print-request information and the first authentication information contained in the first print-instruction information stored in the print-instruction-information storage unit;

an acquisition-request-information transmission unit that transmits print-data-acquisition-request information corresponding to the print-request information to the print instruction unit when it is determined from the determination result of the determination unit that print-instruction information corresponding to the print-request information is present; and a second print-data transmission unit that transmits print data corresponding to the acquisition-request information received from the print instruction unit to a second printer corresponding to the print-request information.

This structure allows storage of first print-instruction information received from the print instruction unit and containing first authentication information by the print-instruction-information storage unit; allows reception of the print-request information transmitted from the print-request-information transmission unit that transmits print-request information of the print data and containing second authentication information corresponding to the first authentication information and information on the second printer, and determination on whether or not there is first print-instruction information corresponding to the print-request information on the basis of the second authentication information in the received print-request information and the first authentication information contained in the first print-instruction information stored in the print-instruction-information storage unit by mean of the determination unit; allows transmission of print-data-acquisition-request information corresponding to the print-request information to the print instruction unit when it is determined from the determination result of the determination unit that print-instruction information corresponding to the print-request information is present by the acquisition-request-information transmission unit; and allows transmission of print data corresponding to the acquisition-request information received from the print instruction unit to a second printer corresponding to the print-request information by the second print-data transmission unit.

This form is a first printer applicable to the printing system of Form 2, and offers the same advantages as those of the printing system of Form 2.

Form 12

A second printer according to another aspect of the invention is the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The second printer includes: a print-instruction-information acquisition unit that obtains second print-instruction information of the print data for the second printer, the second print-instruction information containing second authentication information corresponding to first authentication information in first print-instruction information containing the first authentication information; and a print-request-information transmission unit that transmits print-request information to the first printer, the print-request information containing information on the second printer in addition to the second print-instruction information obtained by the print-instruction-information acquisition unit. The second printer executes printing on the basis of print data corresponding to the print-request information received from the first printer.

This structure allows acquisition of second print-instruction information of the print data for the second printer, the second print-instruction information containing second authentication information corresponding to first authentication information in first print-instruction information containing the first authentication information by the print-instruction-information acquisition unit; allows transmission of print-request information to the first printer, the print-request information containing information on the second printer in addition to the second print-instruction information obtained by the print-instruction-information acquisition unit by the print-request-information transmission unit; and allows execution of printing on the basis of print data corresponding to the print-request information received from the first printer.

This form is a second printer applicable to the printing system of Form 2, and offers the same advantages as those of the printing system of Form 2.

Form 13

A first printer according to another aspect of the invention is the first printer of a printing system including: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted. The first printer includes: a print-instruction-information storage unit that stores first print-instruction information received from the print instruction unit and containing print data and first authentication information; a determination unit that receives second print-request information sent from the second print-request-information transmission unit that transmits second print-request information, the second print-request information containing second authentication information corresponding to the first authentication information, information on the second printer, and information on the third printer, and determines whether or not there is first print-instruction information corresponding to the second print-request information, on the basis of the second authentication information in the received second print-request information and the first authentication information contained in the first print-instruction information stored in the print-instruction-information storage unit; and a first print-data transmission unit that transmits print data corresponding to the second print-request information to the third printer corresponding to the second print-request information when it is determined from the determination result of the determination unit that first print-instruction information corresponding to the second print-request information is present.

This structure allows storage of first print-instruction information received from the print instruction unit and containing print data and first authentication information by the print-instruction-information storage unit; allows reception of second print-request information sent from the second print-request-information transmission unit that transmits second print-request information and containing second authentication information corresponding to the first authentication information, information on the second printer, and information on the third printer, and determination whether or not there is first print-instruction information corresponding to the second print-request information, on the basis of the second authentication information in the received second print-request information and the first authentication information contained in the first print-instruction information stored in the print-instruction-information storage unit by the determination unit; and allows transmission of print data corresponding to the second print-request information to the third printer corresponding to the second print-request information when it is determined from the determination result of the determination unit that first print-instruction information corresponding to the second print-request information is present by the first print-data transmission unit.

This form is a first printer applicable to the printing system of Form 3, and offers the same advantages as those of the printing system of Form 3.

Form 14

A second printer according to another aspect of the invention is the second printer of a printing system including: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted. The second printer includes: a print-instruction-information acquisition unit that obtains second print-instruction information of the print data for the second printer, the second print-instruction information containing second authentication information corresponding to first authentication information in first print-instruction information containing the first authentication information; and a first print-request-information transmission unit that transmits first print-request information to the third printer, the first print-request information containing information on the second printer in addition to the second print-instruction information obtained by the print-instruction-information acquisition unit. The second printer executes printing on the basis of print data corresponding to the first print-request information received from the third printer.

This structure allows acquisition of second print-instruction information of the print data for the second printer, the second print-instruction information containing second authentication information corresponding to first authentication information in first print-instruction information containing the first authentication information by the print-instruction-information acquisition unit; allows transmission of first print-request information to the third printer, the first print-request information containing information on the second printer in addition to the second print-instruction information obtained by the print-instruction-information acquisition unit by the first print-request-information transmission unit; and allows execution of printing on the basis of print data corresponding to the first print-request information received from the third printer.

This form is a second printer applicable to the printing system of Form 3, and offers the same advantages as those of the printing system of Form 3.

Form 15

A third printer according to another aspect of the invention is the third printer of a printing system including: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted. The third printer includes: a second print-request-information transmission unit that transmits second print-request information received from the second printer to the first printer, the second print-request information containing information on the third printer in addition to the first print-request information containing the second authentication information and information on the second printer; and a third print-data transmission unit that transmits print data corresponding to the second print-request information received from the first printer to the second printer corresponding to the second print-request information.

This structure allows transmission of second print-request information received from the second printer to the first printer, the second print-request information containing information on the third printer in addition to the first print-request information containing the second authentication information and information on the second printer by the second print-request-information transmission unit; and allows transmission of print data corresponding to the second print-request information received from the first printer to the second printer corresponding to the second print-request information by the third print-data transmission-unit.

This form is a third printer applicable to the printing system of Form 3 or 4, and offers the same advantages as those of the printing system of Form 3 or 4.

Form 16

A first printer according to another aspect of the invention is the first printer of a printing system including: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted. The first printer includes: a print-instruction-information storage unit that stores first print-instruction information received from the print instruction unit and containing first authentication information; a determination unit that receives second print-request information transmitted from a second print-request-information transmission unit that transmits second print-request information containing second authentication information corresponding to the first authentication information, information on the second printer, and information on the third printer, and determines whether or not there is first print-instruction information corresponding to the second print-request information, on the basis of the second authentication information in the received second print-request information and the first authentication information contained in the first print-instruction information stored in the print-instruction-information storage unit; an acquisition-request-information transmission unit that transmits print-data-acquisition-request information corresponding to the first print-instruction information to the print instruction unit when it is determined from the determination result of the determination unit that first print-instruction information corresponding to the second print-request information is present; and a second print-data transmission unit that transmits print data corresponding to the second acquisition-request information received from the print instruction unit to the third printer corresponding to the second print-request information.

This structure allows storage of first print-instruction information received from the print instruction unit and containing first authentication information by the print-instruction-information storage unit; allows reception of the second print-request information transmitted from the second print-request-information transmission unit that transmits second print-request information containing second authentication information corresponding to the first authentication information, information on the second printer, and information on the third printer, and determination on whether or not there is first print-instruction information corresponding to the second print-request information, on the basis of the second authentication information in the received second print-request information and the first authentication information contained in the first print-instruction information stored in the print-instruction-information storage unit by the determination unit; allows transmission of print-data-acquisition-request information corresponding to the first print-instruction information to the print instruction unit when it is determined from the determination result of the determination unit that first print-instruction information corresponding to the second print-request information is present by the acquisition-request-information transmission unit; and transmission of print data corresponding to the second acquisition-request information received from the print instruction unit to the third printer corresponding to the second print-request information by the second print-data transmission unit.

This form is a first printer applicable to the printing system of Form 4, and offers the same advantages as those of the printing system of Form 4.

Form 17

A second printer according to another aspect of the invention is the second printer of a printing system including: a first printer; a second printer; a third printer; and a print instruction unit, the printers executing printing on the basis of print data. The first printer and the print instruction unit and the third printer are connected so that data can be transmitted. The second printer and the third printer are connected so that data can be transmitted. The second printer includes: a print-instruction-information acquisition unit that obtains second print-instruction information of the print data for the second printer, the second print-instruction information containing second authentication information corresponding to first authentication information in first print-instruction information containing the first authentication information; and a first print-request-information transmission unit that transmits first print-request information to the third printer, the first print-request information containing information on the second printer in addition to the second print-instruction information obtained by the print-instruction-information acquisition unit. The second printer executes printing on the basis of print data corresponding to the first print-request information received from the third printer.

This structure allows acquisition of second print-instruction information of the print data for the second printer by the print-instruction-information acquisition unit, the second print-instruction information containing second authentication information corresponding to first authentication information in first print-instruction information containing the first authentication information; allows transmission of first print-request information to the third printer by the first print-request-information transmission unit, the first print-request information containing information on the second printer in addition to the second print-instruction information obtained by the print-instruction-information acquisition unit; and allows execution of printing on the basis of print data corresponding to the first print-request information received from the third printer.

This form is a second printer applicable to the printing system of Form 4, and offers the same advantages as those of the printing system of Form 4.

Form 18

Preferably, the first printer of Form 9 or 11 further includes a time-transmission determination unit that determines whether or not to transmit the print data to a second printer corresponding to print-request information on the basis of time-zone information on a predetermined printable time zone and time information on the reception of the print-request information when the determination unit determines that there is first print-instruction information corresponding to the print-request information.

This structure allows determination whether or not to transmit the print data to a second printer corresponding to the print-request information on the basis of time-zone information on a predetermined printable time zone and time information on the reception of the print-request information by the time-transmission determination unit when the determination unit determines that there is first print-instruction information corresponding to the print-request information.

This form is a first printer applicable to the printing system of Form 5, and offers the same advantages as those of the printing system of Form 5.

Form 19

Preferably, the first printer of one of Forms 9, 11, and 18 further includes: an operating-condition-information acquisition unit that obtains operating-condition information indicative of the operating condition of the second printer that is the destination of the print data; and an operation-transmission determination unit that determines whether or not to transmit the print data to the second printer corresponding to the print-request information on the basis of the obtained operating-condition information.

This structure allows acquisition of operating-condition information indicative of the operating condition of the second printer that is the destination of the print data by the operating-condition-information acquisition unit; and allows determination whether or not to transmit the print data to the second printer corresponding to the print-request information on the basis of the obtained operating-condition information by the operation-transmission determination unit.

This form is a first printer applicable to the printing system of Form 6, and offers the same advantages as those of the printing system of Form 6.

Form 20

Preferably, the first printer of Form 13 or 16 further includes a time-transmission determination unit that determines whether or not to transmit the print data to a second printer corresponding to the second print-request information on the basis of time-zone information on a predetermined printable time zone and time information on the reception of the second print-request information when the determination unit determines that there is first print-instruction information corresponding to the print-request information.

This structure allows determination whether or not to transmit the print data to a second printer corresponding to the second print-request information on the basis of time-zone information on a predetermined printable time zone and time information on the reception of the second print-request information by the time-transmission determination unit when the determination unit determines that there is first print-instruction information corresponding to the print-request information.

This form is a first printer applicable to the printing system of Form 7, and offers the same advantages as those of the printing system of Form 7.

Form 21

Preferably, the first printer of one of Forms 13, 16, and 20 further includes: an operating-condition-information acquisition unit that obtains operating-condition information indicative of the operating condition of the second printer that is the destination of the print data; and an operation-transmission determination unit that determines whether or not to transmit the print data to the second printer corresponding to the second print-request information on the basis of the obtained operating-condition information.

This structure allows acquisition of operating-condition information indicative of the operating condition of the second printer that is the destination of the print data by the operating-condition-information acquisition unit; and allows determination whether or not to transmit the print data to the second printer corresponding to the second print-request information on the basis of the obtained operating-condition information by the operation-transmission determination unit.

This form is a first printer applicable to the printing system of Form 8, and offers the same advantages as those of the printing system of Form 8.

Form 22

A first-printer control program according to another aspect of the invention is a program for use in controlling the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The first-printer control program is a program for a computer to use in controlling the first printer. The first-printer control program includes: storing first print-instruction information received from the print instruction unit in a print-instruction-information storage unit, the first print-instruction information containing the print data and first authentication information; receiving the print-request information transmitted from a print-request-information transmission unit that transmits print-request information on the print data containing second authentication information corresponding to the first authentication information and information on the second printer, and determining whether or not there is first print-instruction information corresponding to the print-request information, on the basis of the second authentication information in the received print-request information and the first authentication information contained in the first print-instruction information stored in the print-instruction-information storage unit; and transmitting print data corresponding to the print-request information to the second printer corresponding to the print-request information when it is determined from the determination result of the determination step that first print-instruction information corresponding to the print-request information is present.

This structure provides the same advantages as those of the first printer of Form 9 when the computer reads the program and executes the process according to the read program.

Form 23

A second-printer control program according to another aspect of the invention is a program for use in controlling the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The second-printer control program is a program for a computer to use in controlling the first printer. The second-printer control program includes: obtaining second print-instruction information of the print data for the second printer, the second print-instruction information containing second authentication information corresponding to first authentication information in first print-instruction information containing the first authentication information; and transmitting print-request information to the first printer, the print-request information containing information on the second printer in addition to the second print-instruction information obtained in the print-instruction-information acquisition step.

This structure provides the same advantages as those of the second printer of Form 10 when the computer reads the program and executes the process according to the read program.

Form 24

A first-printer control program according to another aspect of the invention is a program for use in controlling the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The first-printer control program is a program for a computer to use in controlling the first printer. The first-printer control program includes: storing first print-instruction information received from the print instruction unit and containing first authentication information in a print-instruction-information storage unit; receiving print-request information transmitted from a print-request-information transmission unit that transmits print-request information on the print data, the print-request information containing second authentication information corresponding to the first authentication information and information on the second printer, and determining whether or not there is first print-instruction information corresponding to the print-request information on the basis of the second authentication information in the received print-request information and the first authentication information contained in the first print-instruction information stored in the print-instruction-information storage unit; transmitting print-data-acquisition-request information corresponding to the print-request information to the print instruction unit when it is determined from the determination result of the determination step that print-instruction information corresponding to the print-request information is present; and transmitting print data corresponding to the acquisition-request information received from the print instruction unit to the second printer corresponding to the print-request information.

This structure provides the same advantages as those of the first printer of Form 11 when the computer reads the program and executes the process according to the read program.

Form 25

A second-printer control program according to another aspect of the invention is a program for use in controlling the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The second-printer control program is a program for a computer to use in controlling the second printer. The second-printer control program includes: obtaining second print-instruction information for the second printer, the second print-instruction information containing second authentication information corresponding to first authentication information in first print-instruction information containing the first authentication information; and transmitting print-request information to the first printer, the print-request information containing information on the second printer in addition to the second print-instruction information obtained in the print-instruction-information acquisition step.

This structure provides the same advantages as those of the second printer of Form 12 when the computer reads the program and executes the process according to the read program.

Form 26

A first-printer control program according to another aspect of the invention is a program for use in controlling the first printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The first-printer control program is a program for a computer to use in controlling the first printer. The first-printer control program includes: storing first print-instruction information received from the print instruction unit in a print-instruction-information storage unit, the first print-instruction information containing print data and first authentication information; receiving second print-request information transmitted from a second print-request-information transmission unit that transmits second print-request information containing second authentication information corresponding to the first authentication information, information on the second printer, and information on the third printer, and determining whether or not there is first print-instruction information corresponding to the second print-request information on the basis of the second authentication information in the received second print-request information and the first authentication information contained in the first print-instruction information stored in the print-instruction-information storage unit; and transmitting print data corresponding to the second print-request information to the third printer corresponding to the second print-request information when it is determined from the determination result of the determination step that first print-instruction information corresponding to the second print-request information is present.

This structure provides the same advantages as those of the first printer of Form 13 when the computer reads the program and executes the process according to the read program.

Form 27

A second-printer control program according to another aspect of the invention is a program for use in controlling the second printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The second-printer control program is a program for a computer to use in controlling the second printer. The second-printer control program includes: obtaining second print-instruction information of the print data for the second printer, the second print-instruction information containing second authentication information corresponding to first authentication information in first print-instruction information containing the first authentication information; and transmitting first print-request information to the third printer, the first print-request information containing information on the second printer in addition to the second print-instruction information obtained in the print-instruction-information acquisition step.

This structure provides the same advantages as those of the second printer of Form 14 when the computer reads the program and executes the process according to the read program.

Form 28

A third-printer control program according to another aspect of the invention is a program for use in controlling the third printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The third-printer control program is a program for a computer to use in controlling the third printer. The third-printer control program includes: transmitting second print-request information to the first printer, the second print-request information containing information on the third printer in addition to first print-request information received from the second printer and containing second authentication information and information of the second printer; and transmitting print data corresponding to the second print-request information received from the first printer to the second printer corresponding to the second print-request information.

This structure provides the same advantages as those of the third printer of Form 15 when the computer reads the program and executes the process according to the read program.

Form 29

A first-printer control program according to another aspect of the invention is a program for use in controlling the first printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The first-printer control program is a program for a computer to use in controlling the first printer. The first-printer control program includes: storing first print-instruction information received from the print instruction unit and containing first authentication information in a print-instruction-information storage unit; receiving second print-request information transmitted from a second print-request-information transmission unit that transmits second print-request information containing second authentication information corresponding to the first authentication information, information on the second printer, and information on the third printer, and determining whether or not there is first print-instruction information corresponding to the second print-request information on the basis of the second authentication information in the received second print-request information and the first authentication information contained in the first print-instruction information stored in the print-instruction-information storage unit; transmitting print-data-acquisition-request information corresponding to the first print-instruction information to the print instruction unit when it is determined from the determination result of the determination step that first print-instruction information corresponding to the second print-request information is present; and transmitting print data corresponding to the second acquisition-request information received from the print instruction unit to the third printer corresponding to the second print-request information.

This structure provides the same advantages as those of the first printer of Form 16 when the computer reads the program and executes the process according to the read program.

Form 30

A second-printer control program according to another aspect of the invention is a program for use in controlling the second printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The second-printer control program is a program for a computer to use in controlling the second printer. The second-printer control program includes: obtaining second print-instruction information of the print data for the second printer, the second print-instruction information containing second authentication information corresponding to first authentication information in first print-instruction information containing the authentication information; and transmitting first print-request information to the third printer, the first print-instruction information containing information on the second printer in addition to the second print-instruction information obtained in the print-instruction-information acquisition step.

This structure provides the same advantages as those of the first printer of Form 17 when the computer reads the program and executes the process according to the read program.

Form 31

Preferably, the first-printer control program of Form 22 or 24 further includes a program for a computer to use in determining whether or not to transmit the print data to a second printer corresponding to the print-request information on the basis of time-zone information on a predetermined printable time zone and time information on the reception of the print-request information when the determination unit determines that there is first print-instruction information corresponding to the print-request information.

This structure provides the same advantages as those of the first printer of Form 18 when the computer reads the program and executes the process according to the read program.

Form 32

Preferably, the first-printer control program of one of Forms 22, 24, and 31 further includes a program for a computer to use in obtaining operating-condition information indicative of the operating condition of the second printer that is the destination of the print data; and determining whether or not to transmit the print data to the second printer corresponding to the print-request information on the basis of the obtained operating-condition information.

This structure provides the same advantages as those of the first printer of Form 19 when the computer reads the program and executes the process according to the read program.

Form 33

Preferably, the first-printer control program of Form 26 or 29 further includes a program for a computer to use in determining whether or not to transmit the print data to a second printer corresponding to the second print-request information on the basis of time-zone information on a predetermined printable time zone and time information on the reception of the second print-request information when the determination unit determines that there is first print-instruction information corresponding to the print-request information.

This structure provides the same advantages as those of the first printer of Form 20 when the computer reads the program and executes the process according to the read program.

Form 34

Preferably, the first-printer control program of one of Forms 26, 29, and 33 further includes a program for a computer to use in obtaining operating-condition information indicative of the operating condition of the second printer that is the destination of the print data; and determining whether or not to transmit the print data to the second printer corresponding to the second print-request information on the basis of the obtained operating-condition information.

This structure provides the same advantages as those of the first printer of Form 21 when the computer reads the program and executes the process according to the read program.

Form 35

A first-printer control method according to another aspect of the invention is a method for use in controlling the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The first-printer control method is a method for use in controlling the first printer. The first-printer control method includes: storing first print-instruction information received from the print instruction unit in a print-instruction-information storage unit, the first print-instruction information containing the print data and first authentication information; receiving the print-request information transmitted from a print-request-information transmission unit that transmits print-request information on the print data containing second authentication information corresponding to the first authentication information and information on the second printer, and determining whether or not there is first print-instruction information corresponding to the print-request information, on the basis of the second authentication information in the received print-request information and the first authentication information contained in the first print-instruction information stored in the print-instruction-information storage unit; and transmitting print data corresponding to the print-request information to the second printer corresponding to the print-request information when it is determined from the determination result of the determination step that first print-instruction information corresponding to the print-request information is present.

Thus the same advantages as those of the first printer of Form 9 are provided.

Form 36

A second-printer control method according to another aspect of the invention is a method for use in controlling the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The second-printer control method is a method for use in controlling the second printer. The second-printer control method includes: obtaining second print-instruction information of the print data for the second printer, the second print-instruction information containing second authentication information corresponding to first authentication information in first print-instruction information containing the first authentication information; and transmitting print-request information to the first printer, the print-request information containing information on the second printer in addition to the second print-instruction information obtained in the print-instruction-information acquisition step.

Thus the same advantages as those of the second printer of Form 10 are provided.

Form 37

A first-printer control method according to another aspect of the invention is a method for use in controlling the first printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The first-printer control method is a method for use in controlling the first printer. The first-printer control method includes: storing first print-instruction information received from the print instruction unit and containing first authentication information in a print-instruction-information storage unit; receiving print-request information transmitted from a print-request-information transmission unit that transmits print-request information on the print data, the print-request information containing second authentication information corresponding to the first authentication information and information on the second printer, and determining whether or not there is first print-instruction information corresponding to the print-request information on the basis of the second authentication information in the received print-request information and the first authentication information contained in the first print-instruction information stored in the print-instruction-information storage unit; transmitting print-data-acquisition-request information corresponding to the print-request information to the print instruction unit when it is determined from the determination result of the determination step that print-instruction information corresponding to the print-request information is present; and transmitting print data corresponding to the acquisition-request information received from the print instruction unit to the second printer corresponding to the print-request information.

Thus the same advantages as those of the first printer of Form 11 are provided.

Form 38

A second-printer control method according to another aspect of the invention is a method for use in controlling the second printer of a printing system including: a first printer; a second printer; and a print instruction unit, the first and second printers executing printing on the basis of print data. The first printer and the print instruction unit are connected so that data can be transmitted. The first printer and the second printer are connected so that data can be transmitted. The second-printer control method is a method for use in controlling the second printer. The second-printer control method includes: obtaining second print-instruction information of the print data for the second printer, the second print-instruction information containing second authentication information corresponding to first authentication information in first print-instruction information containing the first authentication information; and transmitting print-request information to the first printer, the print-request information containing information on the second printer in addition to the second print-instruction information obtained in the print-instruction-information acquisition step.

Thus the same advantages as those of the first printer of Form 12 are provided.

Form 39

A first-printer control method according to another aspect of the invention is a method for use in controlling the first printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The first-printer control method is a method for use in controlling the first printer. The first-printer control method includes: storing first print-instruction information received from the print instruction unit in a print-instruction-information storage unit, the first print-instruction information containing print data and first authentication information; receiving second print-request information transmitted from a second print-request-information transmission unit that transmits second print-request information containing second authentication information corresponding to the first authentication information, information on the second printer, and information on the third printer, and determining whether or not there is first print-instruction information corresponding to the second print-request information on the basis of the second authentication information in the received second print-request information and the first authentication information contained in the first print-instruction information stored in the print-instruction-information storage unit; and transmitting print data corresponding to the second print-request information to the third printer corresponding to the second print-request information when it is determined from the determination result of the determination step that first print-instruction information corresponding to the second print-request information is present.

Thus the same advantages as those of the first printer of Form 13 are provided.

Form 40

A second-printer control method according to another aspect of the invention is a method for use in controlling the second printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The second-printer control method is a method for use in controlling the second printer. The second-printer control method includes: obtaining second print-instruction information of the print data for the second printer, the second print-instruction information containing second authentication information corresponding to first authentication information in first print-instruction information containing the first authentication information; and transmitting first print-request information to the third printer, the first print-request information containing information on the second printer in addition to the second print-instruction information obtained in the print-instruction-information acquisition step.

Thus the same advantages as those of the second printer of Form 14 are provided.

Form 41

A third-printer control method according to another aspect of the invention is a method for use in controlling the third printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The third-printer control method is a method for use in controlling the third printer. The third-printer control method includes: transmitting second print-request information to the first printer, the second print-request information containing information on the third printer in addition to first print-request information received from the second printer and containing second authentication information and information of the second printer; and transmitting print data corresponding to the second print-request information received from the first printer to the second printer corresponding to the second print-request information.

Thus the same advantages as those of the third printer of Form 15 are provided.

Form 42

A first-printer control method according to another aspect of the invention is a method for use in controlling the first printer of a printing system including: a first printer; a second printer; a third printer; and a print instruction unit, the first, second, and third printers executing printing on the basis of print data. The first printer and the print instruction unit and the third printer are connected so that data can be transmitted. The second printer and the third printer are connected so that data can be transmitted. The first-printer control method is a method for use in controlling the first printer. The first-printer control method includes: storing first print-instruction information received from the print instruction unit and containing first authentication information in a print-instruction-information storage unit; receiving second print-request information transmitted from a second print-request-information transmission unit that transmits second print-request information containing second authentication information corresponding to the first authentication information, information on the second printer, and information on the third printer, and determining whether or not there is first print-instruction information corresponding to the second print-request information on the basis of the second authentication information in the received second print-request information and the first authentication information contained in the first print-instruction information stored in the print-instruction-information storage unit; transmitting print-data-acquisition-request information corresponding to the first print-instruction information to the print instruction unit when it is determined from the determination result of the determination step that first print-instruction information corresponding to the second print-request information is present; and transmitting print data corresponding to the second acquisition-request information received from the print instruction unit to the third printer corresponding to the second print-request information.

Thus the same advantages as those of the first printer of Form 16 are provided.

Form 43

A second-printer control method according to another aspect of the invention is a method for use in controlling the second printer of a printing system including: a first printer; a second printer; a third printer; and a print instruction unit, the first, second and third printers executing printing on the basis of print data. The first printer and the print instruction unit and the third printer are connected so that data can be transmitted. The second printer and the third printer are connected so that data can be transmitted. The second-printer control method is a method for use in controlling the second printer. The second-printer control method includes: obtaining second print-instruction information of the print data for the second printer, the second print-instruction information containing second authentication information corresponding to first authentication information in first print-instruction information containing the first authentication information; and transmitting first print-request information to the third printer, the first print-request information containing information on the second printer in addition to the second print-instruction information obtained in the print-instruction-information acquisition step.

Thus the same advantages as those of the second printer of Form 17 are provided.

Form 44

Preferably, the first-printer control method of Form 35 or 37 further includes: determining whether or not to transmit the print data to a second printer corresponding to the print-request information on the basis of time-zone information on a predetermined printable time zone and time information on the reception of the print-request information when the determination unit determines that there is first print-instruction information corresponding to the print-request information.

Thus the same advantages as those of the first printer of Form 18 are provided.

Form 45

Preferably, the first-printer control method of one of Forms 35, 37, and 44 further includes: obtaining operating-condition information indicative of the operating condition of the second printer that is the destination of the print data; and determining whether or not to transmit the print data to the second printer corresponding to the print-request information on the basis of the obtained operating-condition information.

Thus the same advantages as those of the first printer of Form 19 are provided.

Form 46

Preferably, the first-printer control method of Form 39 or 42 further includes determining whether or not to transmit the print data to a second printer corresponding to the second print-request information on the basis of time-zone information on a predetermined printable time zone and time information on the reception of the second print-request information when the determination unit determines that there is first print-instruction information corresponding to the print-request information.

Thus the same advantages as those of the first printer of Form 20 are provided.

Form 47

Preferably, the first-printer control program of one of Forms 39, 42, and 46 further includes: obtaining operating-condition information indicative of the operating condition of the second printer that is the destination of the print data; and determining whether or not to transmit the print data to the second printer corresponding to the second print-request information on the basis of the obtained operating-condition information.

Thus the same advantages as those of the first printer of Form 21 are provided.

Form 48

A printer according to another aspect of the invention includes: a print-instruction-information storage unit that stores print-instruction information received from a print instruction unit and containing print data and first authentication information; a determination unit that receives print-request information transmitted from a print-request-information transmission unit that transmits print-request information on the print data, the print-request information containing second authentication information corresponding to the first authentication information and information on a second printer, and determines whether or not there is print-instruction information corresponding to the print-request information on the basis of the second authentication information in the received print-request information and the first authentication information contained in the print-instruction information stored in the print-instruction-information storage unit; and a print-data transmission unit that transmits print data corresponding to the print-request information to the second printer corresponding to the print-request information when it is determined from the determination result of the determination unit that print-instruction information corresponding to the print-request information is present.

This form is a printer that is applicable to the printing system of Form 1 as a first printer, and offers the same advantages as those of the printing system of Form 1.

Form 49

A printer according to another aspect of the invention includes: a print-instruction-information acquisition unit that obtains print-instruction information of the print data for the printer, the print-instruction information containing second authentication information corresponding to first authentication information in first print-instruction information containing the first authentication information; and a print-request-information transmission unit that transmits print-request information to a second printer, the print-request information containing information on the printer in addition to the print-instruction information obtained by the print-instruction-information acquisition unit. The printer executes printing on the basis of print data corresponding to the print-request information received from the second printer.

This form is a printer that is applicable to the printing system of Form 2 as a second printer, and offers the same advantages as those of the printing system of Form 2.

Form 50

A printer according to another aspect of the invention includes: a print-instruction-information storage unit that stores print-instruction information received from a print instruction unit and containing first authentication information; a determination unit that receives print-request information transmitted from a print-request-information transmission unit that transmits print-data-print-request information containing second authentication information corresponding to the first authentication information and information on a source printer, and determines whether or not there is print-instruction information corresponding to the print-request information on the basis of the second authentication information in the received print-request information and the first authentication information contained in the print-instruction information stored in the print-instruction-information storage unit; an acquisition-request-information transmission unit that transmits print-data-acquisition-request information corresponding to the print-request information to the print instruction unit when it is determined from the determination result of the determination unit that print-instruction information corresponding to the print-request information is present; and a print-data transmission unit that transmits print data corresponding to the acquisition-request information received from the print instruction unit to the source printer corresponding to the print-request information.

This form is a printer that is applicable to the printing system of Form 2 as a first printer, and offers the same advantages as those of the printing system of Form 2.

Form 51

A printer according to another aspect of the invention includes: a print-instruction-information storage unit that stores print-instruction information received from a print instruction unit and containing print data and first authentication information; a determination unit that receives print-request information transmitted from a print-request-information transmission unit that transmits print-request information containing second authentication information corresponding to the first authentication information, information on a source printer, and information on a second printer that is different from the source printer, and determines whether or not there is print-instruction information corresponding to the print-request information on the basis of the second authentication information in the received print-request information and the first authentication information contained in the print-instruction information stored in the print-instruction-information storage unit; and a print-data transmission unit that transmits print data corresponding to the print-request information to the second printer corresponding to the print-request information when it is determined from the determination result of the determination unit that print-instruction information corresponding to the print-request information is present.

This form is a printer that is applicable to the printing system of Form 3 as a first printer, and offers the same advantages as those of the printing system of Form 3.

Form 52

A printer according to another aspect of the invention includes: a print-instruction-information acquisition unit that obtains print-data-print-instruction information for the printer, the print-instruction information containing second authentication information corresponding to first authentication information in first print-instruction information containing the first authentication information; and a print-request-information transmission unit that transmits print-request information to a second printer, the print-request information containing information on the printer in addition to the print-instruction information obtained by the print-instruction-information acquisition unit. The printer executes printing on the basis of print data corresponding to the print-request information received from the second printer.

This form is a printer that is applicable to the printing system of Form 3 as a second printer, and offers the same advantages as those of the printing system of Form 3.

Form 53

A printer according to another aspect of the invention includes: a second print-request-information transmission unit that transmits second print-request information to a third printer that is different from a second printer, the second print-request information containing information on the printer in addition to first print-request information received from the second printer and containing second authentication information and information on the second printer; and a print-data transmission unit that transmits print data corresponding to the second print-request information received from the third printer to the second printer corresponding to the second print-request information.

This form is a printer that is applicable to the printing system of Form 3 or 4 as a third printer, and offers the same advantages as those of the printing system of Form 3 or 4.

Form 54

A printer according to another aspect of the invention includes: a print-instruction-information storage unit that stores print-instruction information received from a print instruction unit and containing first authentication information; a determination unit that receives the print-request information transmitted from a print-request-information transmission unit that transmits print-request information containing second authentication information corresponding to the first authentication information, information on a source printer, and information on a second printer that is different from the source printer, and determines whether or not there is print-instruction information corresponding to the print-request information on the basis of the second authentication information in the received print-request information and the first authentication information contained in the print-instruction information stored in the print-instruction-information storage unit; an acquisition-request-information transmission unit that transmits print-data-acquisition-request information corresponding to the print-instruction information to the print instruction unit when it is determined from the determination result of the determination unit that print-instruction information corresponding to the print-request information is present; and a print-data transmission unit that transmits print data corresponding to the acquisition-request information received from the print instruction unit to the second printer corresponding to the print-request information.

This form is a printer that is applicable to the printing system of Form 4 as a first printer, and offers the same advantages as those of the printing system of Form 4.

Form 55

Preferably, the printer of Form 48 or 50 further includes a time-transmission determination unit that determines whether or not to transmit the print data to the second printer corresponding to the print-request information on the basis of time-zone information on a predetermined printable time zone and time information on the reception of the print-request information when the determination unit determines that there is print-instruction information corresponding to the print-request information.

This form is a printer that is applicable to the printing system of Form 5 as a first printer, and offers the same advantages as those of the printing system of Form 5.

Form 56

Preferably, the printer of one of Forms 48, 50, and 55 further includes an operating-condition-information acquisition unit that obtains operating-condition information indicative of the operating condition of the second printer that is the destination of the print data; and an operation-transmission determination unit that determines whether or not to transmit the print data to the second printer corresponding to the print-request information on the basis of the obtained operating-condition information.

This form is a printer that is applicable to the printing system of Form 6 as a first printer, and offers the same advantages as those of the printing system of Form 6.

Form 57

Preferably, the printer of Form 51 or 54 further includes a time-transmission determination unit that determines whether or not to transmit the print data to the second printer corresponding to the print-request information on the basis of time-zone information on a predetermined printable time zone and time information on the reception of the print-request information when the determination unit determines that there is print-instruction information corresponding to the print-request information.

This form is a printer that is applicable to the printing system of Form 7 as a first printer, and offers the same advantages as those of the printing system of Form 7.

Form 58

Preferably, the printer of one of Forms 51, 54, and 57 further includes: an operating-condition-information acquisition unit that obtains operating-condition information indicative of the operating condition of the second printer that is the destination of the print data; and an operation-transmission determination unit that determines whether or not to transmit the print data to the second printer corresponding to the print-request information on the basis of the obtained operating-condition information.

This form is a printer that is applicable to the printing system of Form 8 as a first printer, and offers the same advantages as those of the printing system of Form 8.

Form 59

A printer control program according to another aspect of the invention includes a program for a computer to use in: storing print-instruction information received from a print instruction unit in a print-instruction-information storage unit, the print-instruction information containing print data and first authentication information; receiving the print-request information transmitted from a print-request-information transmission unit that transmits print-request information on the print data, the print-request information containing second authentication information corresponding to the first authentication information and information on a source printer, and determining whether or not there is print-instruction information corresponding to the print-request information on the basis of the second authentication information in the received print-request information and the first authentication information contained in the first print-instruction information stored in the print-instruction-information storage unit; and transmitting print data corresponding to the print-request information to the source printer corresponding to the print-request information when it is determined from the determination result of the determination step that print-instruction information corresponding to the print-request information is present.

This structure provides the same advantages as those of the printer of Form 48 when the computer reads the program and executes the process according to the read program.

Form 60

A printer control program according to another aspect of the invention includes a program for a computer to use in: obtaining second print-instruction information of the print data for a printer, the second print-instruction information containing second authentication information corresponding to first authentication information in first print-instruction information containing the first authentication information; and transmitting print-request information to another printer that is different from the printer, the print-request information containing information on the printer in addition to the second print-instruction information obtained in the print-instruction-information acquisition step.

This structure provides the same advantages as those of the printer of Form 49 when the computer reads the program and executes the process according to the read program.

Form 61

A printer control program according to another aspect of the invention includes a program for a computer to use in: storing print-instruction information received from a print instruction unit in a print-instruction-information storage unit, the print-instruction information containing first authentication information; receiving print-request information transmitted from a print-request-information transmission unit that transmits print-request information on the print data, the print-request information containing second authentication information corresponding to the first authentication information and information on a source printer, and determining whether or not there is print-instruction information corresponding to the print-request information on the basis of the second authentication information in the received print-request information and the first authentication information contained in the print-instruction information stored in the print-instruction-information storage unit; transmitting print-data-acquisition-request information corresponding to the print-request information to the print instruction unit when it is determined from the determination result of the determination step that print-instruction information corresponding to the print-request information is present; and transmitting print data corresponding to the acquisition-request information received from the print instruction unit to the source printer corresponding to the print-request information.

This structure provides the same advantages as those of the printer of Form 50 when the computer reads the program and executes the process according to the read program.

Form 62

A printer control program according to another aspect of the invention includes a program for a computer to use in: storing print-instruction information received from a print instruction unit in a print-instruction-information storage unit, the print-instruction information containing print data and first authentication information; receiving print-request information transmitted from a print-request-information transmission unit that transmits print-request information, the print-request information containing second authentication information corresponding to the first authentication information, information on a source printer, and information on a second printer that is different from the source printer, and determining whether or not there is print-instruction information corresponding to the print-request information on the basis of the second authentication information in the received print-request information and the first authentication information contained in the print-instruction information stored in the print-instruction-information storage unit; and transmitting print data corresponding to print-request information to the second printer corresponding to the print-request information when it is determined from the determination result of the determination step that print-instruction information corresponding to the print-request information is present.

This structure provides the same advantages as those of the printer of Form 51 when the computer reads the program and executes the process according to the read program.

Form 63

A printer control program according to another aspect of the invention includes a program for a computer to use in: obtaining second print-instruction information of the print data for a printer, the second print-instruction information containing second authentication information corresponding to first authentication information in first print-instruction information containing the first authentication information; and transmitting print-request information to a second printer that is different from the printer, the print-request information containing information on the printer in addition to the second print-instruction information obtained in the print-instruction-information acquisition step.

This structure provides the same advantages as those of the printer of Form 52 when the computer reads the program and executes the process according to the read program.

Form 64

A printer control program according to another aspect of the invention includes a program for a computer to use in: transmitting second print-request information to a second printer that is different from the printer, the second print-request information containing information on a printer that executes a program therefore in addition to first print-request information received from the printer and containing second authentication information and information of the printer; and transmitting print data corresponding to the second print-request information received from the second printer to a printer corresponding to the second print-request information.

This structure provides the same advantages as those of the printer of Form 53 when the computer reads the program and executes the process according to the read program.

Form 65

A printer control program according to another aspect of the invention includes a program for a computer to use in: storing print-instruction information received from a print instruction unit in a print-instruction-information storage unit, the print-instruction information containing first authentication information; receiving print-request information transmitted from a print-request-information transmission unit that transmits print-request information containing second authentication information corresponding to the first authentication information, information on a printer, and information on a second printer that is different from the printer, and determining whether or not there is print-instruction information corresponding to the print-request information on the basis of the second authentication information in the received print-request information and the first authentication information contained in the print-instruction information stored in the print-instruction-information storage unit; transmitting print-data-acquisition-request information corresponding to the print-instruction information to the print instruction unit when it is determined from the determination result of the determination step that print-instruction information corresponding to the print-request information is present; and transmitting print data corresponding to the acquisition-request information received from the print instruction unit to a printer corresponding to the print-request information.

This structure provides the same advantages as those of the printer of Form 54 when the computer reads the program and executes the process according to the read program.

Form 66

Preferably, the printer control program of Form 59 or 61 further includes a program for a computer to use in determining whether or not to transmit the print data to a second printer corresponding to the print-request information on the basis of time-zone information on a predetermined printable time zone and time information on the reception of the print-request information when the determination unit determines that there is print-instruction information corresponding to the print-request information.

This structure provides the same advantages as those of the printer of Form 55 when the computer reads the program and executes the process according to the read program.

Form 67

Preferably, the printer control program of one of Forms 59, 61, or 66 further includes a program for a computer to use in: obtaining operating-condition information indicative of the operating condition of a second printer that is the destination of the print data; and determining whether or not to transmit the print data to the second printer corresponding to the print-request information on the basis of the obtained operating-condition information.

This structure provides the same advantages as those of the printer of Form 56 when the computer reads the program and executes the process according to the read program.

Form 68

Preferably, the printer control program of Form 62 or 65 further includes a program for a computer to use in determining whether or not to transmit the print data to a second printer corresponding to the second print-request information on the basis of time-zone information on a predetermined printable time zone and time information on the reception of the second print-request information when the determination unit determines that there is print-instruction information corresponding to the print-request information.

This structure provides the same advantages as those of the printer of Form 57 when the computer reads the program and executes the process according to the read program.

Form 69

Preferably, the printer control program of one of Forms 62, 65, and 68 further includes a program for a computer to use in: obtaining operating-condition information indicative of the operating condition of a second printer that is the destination of the print data; and determining whether or not to transmit the print data to the second printer corresponding to the print-request information on the basis of the obtained operating-condition information.

This structure provides the same advantages as those of the printer of Form 58 when the computer reads the program and executes the process according to the read program.

Form 70

A printer control method according to another aspect of the invention includes: storing print-instruction information received from a print instruction unit in a print-instruction-information storage unit, the print-instruction information containing print data and first authentication information; receiving print-request information transmitted from a print-request-information transmission unit that transmits the print-request information on the print data, the print-request information containing second authentication information corresponding to the first authentication information and information on a printer, and determining whether or not there is print-instruction information corresponding to the print-request information on the basis of the second authentication information in the received print-request information and the first authentication information contained in the first print-instruction information stored in the print-instruction-information storage unit; and transmitting print data corresponding to the print-request information to a printer corresponding to the print-request information when it is determined from the determination result of the determination step that print-instruction information corresponding to the print-request information is present.

Thus the same advantages as those of the printer of Form 48 are provided.

Form 71

A printer control method according to another aspect of the invention includes: obtaining second print-instruction information of print data for a printer, the second print-instruction information containing second authentication information corresponding to first authentication information in first print-instruction information containing the first authentication information; and transmitting print-request information to a second printer that is different from the printer, the print-request information containing information on the printer in addition to the second print-instruction information obtained in the print-instruction-information acquisition step.

Thus the same advantages as those of the printer of Form 49 are provided.

Form 72

A printer control method according to another aspect of the invention includes: storing print-instruction information received from a print instruction unit in a print-instruction-information storage unit, the print-instruction information containing first authentication information; receiving print-request information transmitted from a print-request-information transmission unit that transmits the print-data-print-request information, the print-request information containing second authentication information corresponding to the first authentication information and information on a source printer, and determining whether or not there is print-instruction information corresponding to the print-request information, on the basis of the second authentication information in the received print-request information and the first authentication information contained in the print-instruction information stored in the print-instruction-information storage unit; transmitting print-data-acquisition-request information corresponding to the print-request information to the print instruction unit when it is determined from the determination result of the determination step that print-instruction information corresponding to the print-request information is present; and transmitting print data corresponding to the acquisition-request information received from the print instruction unit to a printer corresponding to the print-request information.

Thus the same advantages as those of the printer of Form 50 are provided.

Form 73

A printer control method according to another aspect of the invention includes: storing print-instruction information received from a print instruction unit in a print-instruction-information storage unit, the print-instruction information containing print data and first authentication information; receiving second print-request information transmitted from a print-request-information transmission unit that transmits the second print-request information containing second authentication information corresponding to the first authentication information, information on a source printer, and information on a second printer that is different from the source printer, and determining whether or not there is print-instruction information corresponding to the second print-request information, on the basis of the second authentication information in the received print-request information and the first authentication information contained in the print-instruction information stored in the print-instruction-information storage unit; and transmitting print data corresponding to the print-request information to the second printer corresponding to the print-request information when it is determined from the determination result of the determination step that first print-instruction information corresponding to the print-request information is present.

Thus the same advantages as those of the printer of Form 51 are provided.

Form 74

A printer control method according to another aspect of the invention includes: obtaining second print-instruction information of the print data for a printer, the second print-instruction information containing second authentication information corresponding to first authentication information in first print-instruction information containing the first authentication information; and transmitting print-request information to a second printer that is different from the printer, the print-request information containing information on the printer in addition to the second print-instruction information obtained in the print-instruction-information acquisition step.

Thus the same advantages as those of the printer of Form 52 are provided.

Form 75

A printer control method according to another aspect of the invention includes: transmitting second print-request information to a second printer that is different from a first printer, the second print-request information containing information on the first printer that relays print request in addition to first print-request information received from the first printer and containing second authentication information and information on the first printer; and transmitting print data corresponding to the second print-request information received from the second printer to a printer corresponding to the second print-request information.

Thus the same advantages as those of the printer of Form 53 are provided.

Form 76

A printer control method according to another aspect of the invention includes: storing print-instruction information received from a print instruction unit in a print-instruction-information storage unit, the print-instruction information containing first authentication information; receiving print-request information transmitted from a print-request-information transmission unit that transmits the print-request information containing second authentication information corresponding to the first authentication information, information on a source printer, and information on a second printer that is different from the source printer, and determining whether or not there is print-instruction information corresponding to the print-request information, on the basis of the second authentication information in the received print-request information and the first authentication information contained in the print-instruction information stored in the print-instruction-information storage unit; transmitting print-data-acquisition-request information corresponding to the print-instruction information to the print instruction unit when it is determined from the determination result of the determination step that print-instruction information corresponding to the print-request information is present; and transmitting print data corresponding to the acquisition-request information received from the print instruction unit to the second printer corresponding to the print-request information.

Thus the same advantages as those of the printer of Form 54 are provided.

Form 77

Preferably, the printer control method of Form 70 or 72 further includes determining whether or not to transmit the print data to a second printer corresponding to the print-request information on the basis of time-zone information on a predetermined printable time zone and time information on the reception of the print-request information when the determination unit determines that there is print-instruction information corresponding to the print-request information.

Thus the same advantages as those of the printer of Form 55 are provided.

Form 78

Preferably, the printer control method of one of Forms 70, 72, and 77 further includes: obtaining operating-condition information indicative of the operating condition of a second printer that is the destination of the print data; and determining whether or not to transmit the print data to the second printer corresponding to the print-request information on the basis of the obtained operating-condition information.

Thus the same advantages as those of the printer of Form 56 are provided.

Form 79

Preferably, the printer control method of Form 73 or 76 further includes determining whether or not to transmit the print data to a second printer corresponding to the print-request information on the basis of time-zone information on a predetermined printable time zone and time information on the reception of the print-request information when the determination unit determines that there is print-instruction information corresponding to the print-request information.

Thus the same advantages as those of the printer of Form 57 are provided.

Form 80

Preferably, the printer control method of one of Forms 73, 76, and 79 further includes: obtaining operating-condition information indicative of the operating condition of a second printer that is the destination of the print data; and determining whether or not to transmit the print data to the second printer corresponding to the print-request information on the basis of the obtained operating-condition information.

Thus the same advantages as those of the printer of Form 58 are provided.

BRIEF DESCRIPTION OF THE DRAWINGS

The invention will be described with reference to the accompanying drawings, wherein like numbers reference like elements.

FIG. 8A is a diagram showing examples of IP addresses assigned to the first printers and the second printers.

FIG. 8B is a diagram showing an example of the data structure of first print-instruction information.

FIG. 8C is a diagram showing an example of the data structure of second print-instruction information.

FIG. 8D is a diagram showing an example of the data structure of print-request information.

FIG. 8E is a diagram showing an example of the data structure of printable-time-zone information.

FIG. 8F is a diagram showing an example of print-request information when the operating condition is abnormal.

FIG. 11A is a diagram showing examples of IP addresses assigned to the information processor, the first printers, and the second printers.

FIG. 11B is a diagram showing an example of the data structure of first print-instruction information.

FIG. 11C is a diagram showing an example of print data stored in the information processor.

FIG. 11D is a diagram showing an example of the data structure of second print-instruction information.

FIG. 11E is a diagram showing an example of the data structure of print-request information.

FIG. 11F is a diagram showing an example of the data structure of printable-time-zone information.

FIG. 11G is a diagram showing an example of the data structure of acquisition-request information.

FIG. 19A is a diagram showing examples of IP addresses assigned to the first printer, the second printer, and the third printer; FIG. 19B is a diagram showing an example of the data structure of first print-instruction information.

FIG. 19C is a diagram showing an example of the data structure of second print-instruction information.

FIG. 19D is a diagram showing an example of the data structure of first print-request information.

FIG. 19E is a diagram showing an example of the data structure of second print-request information.

FIG. 19F is a diagram showing an example of first print-request information when the operating condition is abnormal.

FIG. 19G is a diagram showing an example of second print-request information when the operating condition is abnormal.

DESCRIPTION OF EXEMPLARY EMBODIMENTS

First Embodiment

A first embodiment of the invention will be described with reference to the drawings. FIGS. 1 to 8 show a printing system, printers, and a program and a method for controlling the printers according to the first embodiment.

Figure 1:
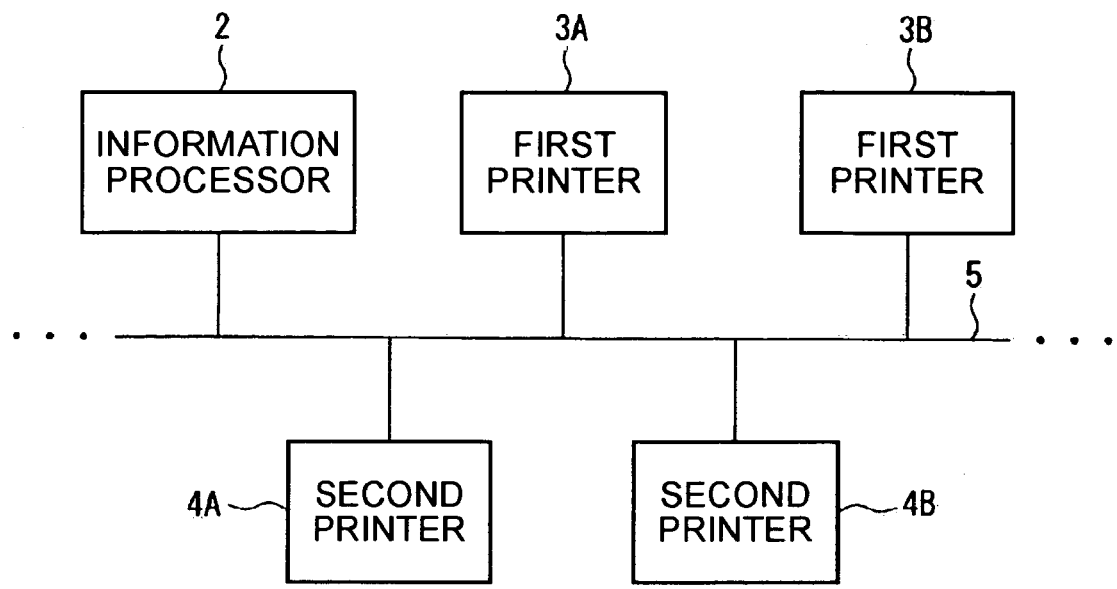
FIG. 1 is a block diagram of a printing system according to a first embodiment of the invention.

The structure of a printing system 1 according to the first embodiment will be described with reference to FIG. 1. FIG. 1 is a block diagram of the printing system 1.

As shown in FIG. 1, the printing system 1 includes an information processor 2, first printers 3A and 3B, second printers 4A and 4B, and a network 5.

The information processor 2 has the function of generating first print-instruction information containing print data and user information, and transmitting the generated first print-instruction information to either one of the first printers 3A and 3B (or alternately, both of the first printers 3A and 3B). The details will be described later.

The first printers 3A and 3B have the function of storing the first print-instruction information received from the information processor 2 and, upon reception of print-request information from the second printer, authenticating a user on the basis of the received print-request information and the stored first print-instruction information and, when the user is authenticated, determining whether or not to transmit print data on the basis of prepared printable-time-zone information and operating-condition information contained in the print request information. Although the printing system 1 includes two printers, the first printers 3A and 3B, as shown in FIG. 1, the number of printers is not limited to two but may be one or three or more. The details will be described later.

The second printers 4A and 4B have the function of obtaining second print-instruction information containing user information via a magnetic card of a user, adding the IP address and operating-condition information of the second printers 4A and 4B to the obtained second print-instruction information to generate print-request information, and transmitting the generated print-request information to the first printers 3A and 3B (or predetermined one of them). Although the printing system 1 includes two second printers 4A and 4B, as shown in FIG. 1, the number of printers is not limited to two but may be one or three or more. The details will be described later.

The network 5 is a known information network such as a LAN or a WAN. The processor and the printers can exchange data via the network 5.

Figure 2:
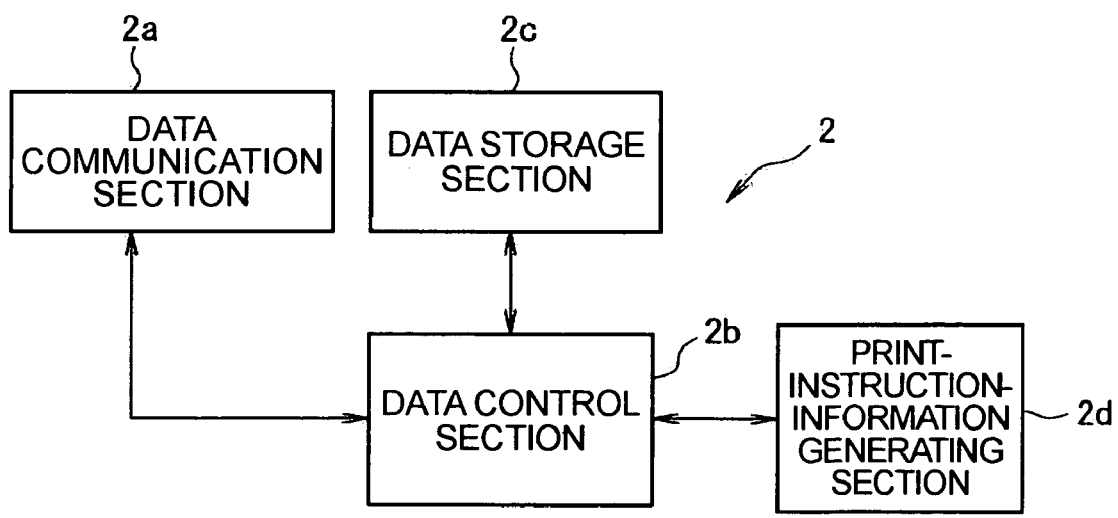
FIG. 2 is a block diagram of an information processor.

Referring to FIG. 2, the detailed structure of the information processor 2 will be described. FIG. 2 is a block diagram of the information processor 2.

As shown in FIG. 2, the information processor 2 includes a data communication section 2a, a data control section 2b, a data storage section 2c, and a print-instruction-information generating section 2d.

The data communication section 2a has the function of exchanging data with the units connected to the network 5, such as transmitting the first print-instruction information to the first printer 3A or 3B via the network 5.

The data control section 2b has the function of centralized control of the flow of data in the information processor 2, such as storing the data obtained from external units via the data communication section 2a into the data storage section 2c, transmitting various data stored in the data storage section 2c to the components, controlling the exchange of data among the components, and transmitting the first print-instruction information generated by the print-instruction-information generating section 2d to the first printer 3A or 3B via the data communication section 2a.

The data storage section 2c has the function of storing document data and image data generated by an editor or the like, and data necessary for processing the components, such as information for generating the first print-instruction information.

The print-instruction-information generating section 2d reads print data stored in the data storage section 2c according to the print instruction from the editor or the like that generates document data or image data, and adds information on the user who gave the print instruction to the read print data to generate the first print-instruction information. The generated first print-instruction information is sent to the first printer 3A or 3B via the data control section 2b. According to the first embodiment, the destination of the first print-instruction information can be selected freely by the user.

The information processor 2 includes a processor, a random access memory (RAM), and a read only memory (ROM) that stores dedicated programs, which are not shown, and provides the foregoing functions by executing the dedicated programs with the processor. The above-mentioned units include units that function only by their dedicated programs and units that function under the control of hardware using dedicated programs.

Figure 3:
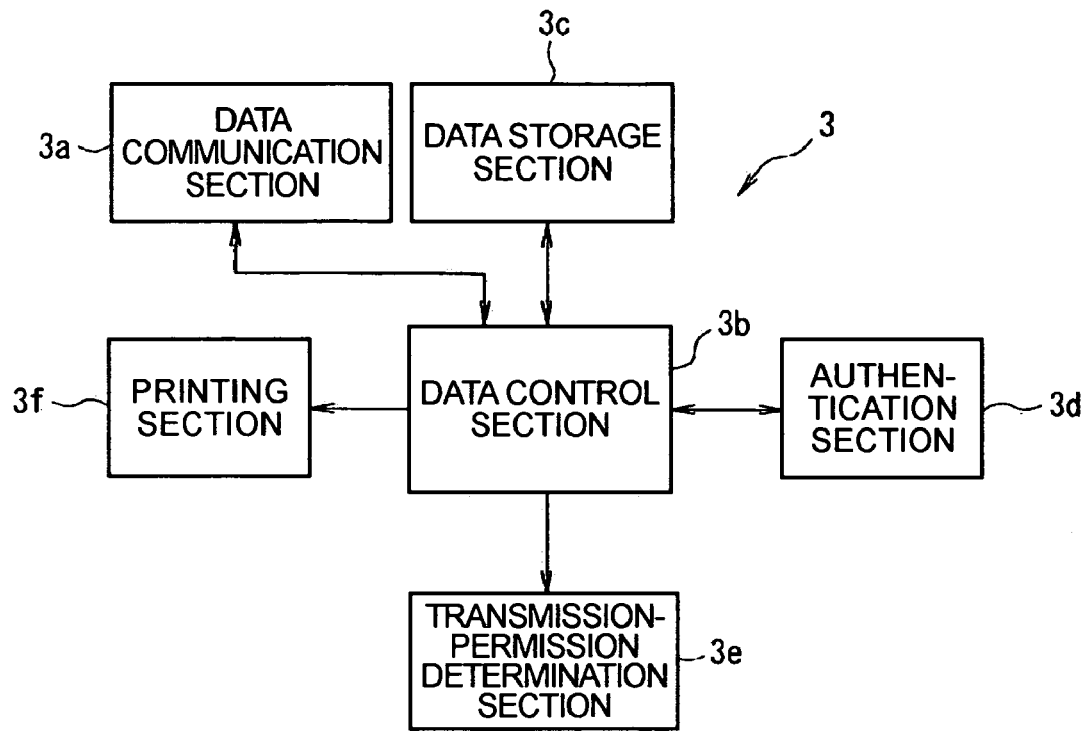
FIG. 3 is a block diagram of a first printer.

Referring to FIG. 3, the detailed structure of the first printers 3A and 3B will be described. The first printers 3A and 3B have the same function and structure, so that, when there is no need to discriminate them from each other, they are generically referred to as a first printer 3. FIG. 3 is a block diagram of the first printers 3A and 3B.

As shown in FIG. 3, the first printer 3 includes a data communication section 3a, a data control section 3b, a data storage section 3c, an authentication section 3d, a transmission-permission determination section 3e, and a printing section 3f.

The data communication section 3a has the function of exchanging data with the information processor 2 and the second printers 4A and 4B, such as receiving various data including the first print-instruction information sent from the information processor 2 and print-request information sent from the second printers 4A and 4B via the network 5, and transmitting print data corresponding to the print-request information to the second printer 4A or 4B.

The data control section 3b has the function of centralized control of the flow of data in the first printer 3, such as storing the first print-instruction information received from the information processor 2 via the data communication section 3a in the data storage section 3c, transmitting various data stored in the data storage section 3c to the components, relaying the exchange of data among the components, and transmitting print data to the second printer 4A or 4B via the data communication section 3a, and the function of obtaining the time of reception of print-request information, which is sent from the second printer 4A or 4B via the data communication section 3a, and storing the reception time in the data storage section 3c.

The data storage section 3c has the function of storing data necessary for processing the first print-instruction information received via the data communication section 3a, printable-time-zone information indicative of printable time zone, etc.

The authentication section 3d has the function of comparing user information (hereinafter, referred to as second authentication information) contained in the print-request information received from the second printer 4A or 4B to user information (hereinafter, referred to as first authentication information) contained in the first print-instruction information stored in the data storage section 3c to determine whether or not they match each other, thereby authenticating the user who gave print instruction.

The transmission-permission determination section 3e has the function of, when there is print data corresponding to the print-request information received from the second printer 4A or 4B, obtaining printable-time-zone information and print-request-information-reception-time information stored in the data storage section 3c via the data control section 3b, determining whether or not it is printable time zone from the obtained information, and determining whether or not to transmit the print data according to the determination result and operating-condition information contained in the print-request information.

The printing section 3f has the function of printing images in image data and documents in document data that construct the print data, according to the print data stored in the data storage section 3c. In this embodiment, the printing section 3f executes printing according to print-instruction information from the information processor 2 to the first printer 3.

The first printer 3 includes a processor, an RAM, and an ROM that stores dedicated programs, which are not shown, and provides the foregoing functions by executing the dedicated programs with the processor. The above-mentioned units include units that function only by their dedicated programs and units that function under the control of hardware using dedicated programs.

Figure 4:
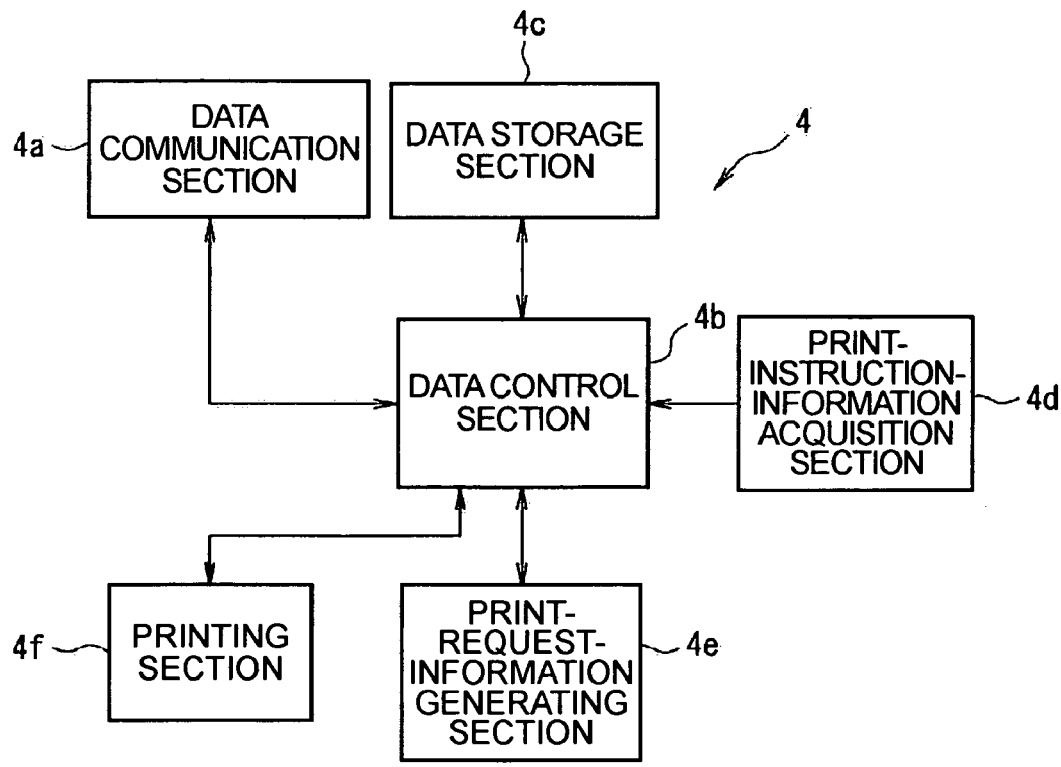
FIG. 4 is a block diagram of a second printer.

Referring to FIG. 4, the detailed structure of the second printers 4A and 4B will be described. The second printers 4A and 4B have the same function and structure, so that, when there is no need to discriminate them from each other, they are generically referred to as a second printer 4. FIG. 4 is a block diagram of the second printer 4.

As shown in FIG. 4, the second printer 4 includes a data communication section 4a, a data control section 4b, a data storage section 4c, a print-instruction-information acquisition section 4d, a print-request-information generating section 4e, and a printing section 4f.

The data communication section 4a has the function of exchanging data with the first printers 3A and 3B, such as transmitting print-request information generated by the print-request-information generating section 4e to the first printers 3A and 3B via the network 5, and receiving print data sent from the first printer 3A or 3B via the network 5.

The data control section 4b has the function of centralized control of the flow of data in the second printer 4, such as storing print data received from the first printer 3A or 3B via the data communication section 4a into the data storage section 4c, transmitting the various data stored in the data storage section 4c to the components, relaying the exchange of data among the components, and transmitting print-request information to the first printer 3A or 3B via the data communication section 4a, and the function of obtaining present operating-condition information on the print function of the second printer 4 via the printing section 4f, and transmitting the obtained operating-condition information to the print-request-information generating section 4e.

The data storage section 4c has the function of storing data necessary for various processings, including the print data received via the data communication section 4a.

The print-instruction-information acquisition section 4d includes a magnetic-card reader, and so has the function of reading the information in user's magnetic cards (hereinafter, referred to as second print-instruction-information). In this embodiment, the magnetic card stores user-identifying information. The print-instruction-information acquisition section 4d reads the user-identifying information as second print-instruction information.

The print-request-information generating section 4e has the function of adding the information (IP address) of the second printer 4 and the operating-condition information obtained via the printing section 4f to the second print-instruction information (user-identifying information) to generate print-request information.

The printing section 4f has the function of printing images in image data and documents in document data that construct the print data, according to the print data received from the first printer 3A or 3B and stored in the data storage section 4c.

The second printer 4 includes a processor, an RAM, and an ROM that stores dedicated programs, which are not shown, and provides the foregoing functions by executing the dedicated programs with the processor. The above-mentioned units include units that function only by their dedicated programs and units that function under the control of hardware using dedicated programs.

Figure 5:
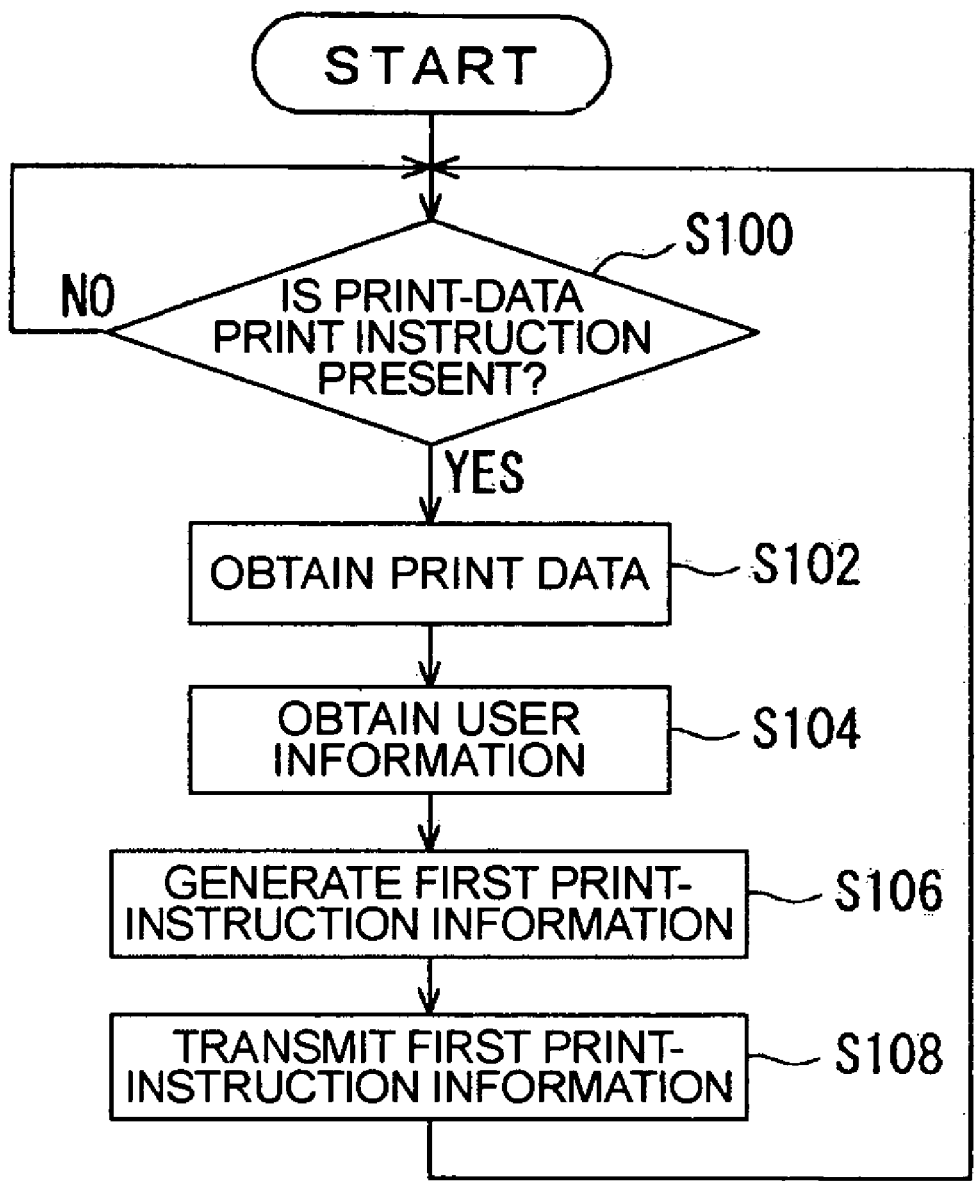
FIG. 5 is a flowchart for the print-instruction-information transmission process of the information processor.

The information processor 2 starts a specified program stored in a region of the ROM by the CPU, and executes the print-instruction-information transmission process shown in the flowchart of FIG. 5 in accordance with the program.

FIG. 5 is a flowchart for the print-instruction-information transmission process of the information processor 2.

When the print-instruction-information transmission process is started by the CPU, the procedure moves to step S100, as shown in FIG. 5.

In step S100, the data control section 2b determines whether or not a print-data print instruction has been given, wherein when it is determined that a print instruction was given (Yes), the procedure moves to step S102; when a negative determination is made (No), the process stands by until a print instruction is given.

When the procedure moves to step S102, the print-instruction-information generating section 2d obtains print data stored in the data storage section 2c via the data control section 2b, and the procedure moves to step S104.

In step S104, the print-instruction-information generating section 2d obtains user information (first authentication information) from the data storage section 2c via the data control section 2b, and the procedure moves to step S106. In this embodiment, user-identifying information such as user-log-in information is stored in the data storage section 2c as user information.

In step S106, the print-instruction-information generating section 2d adds the user information obtained in step S104 and the IP address of the destination first printer 3 to the header information of the print data to generate first print-instruction information, and the procedure moves to step S108.

Figure 6:
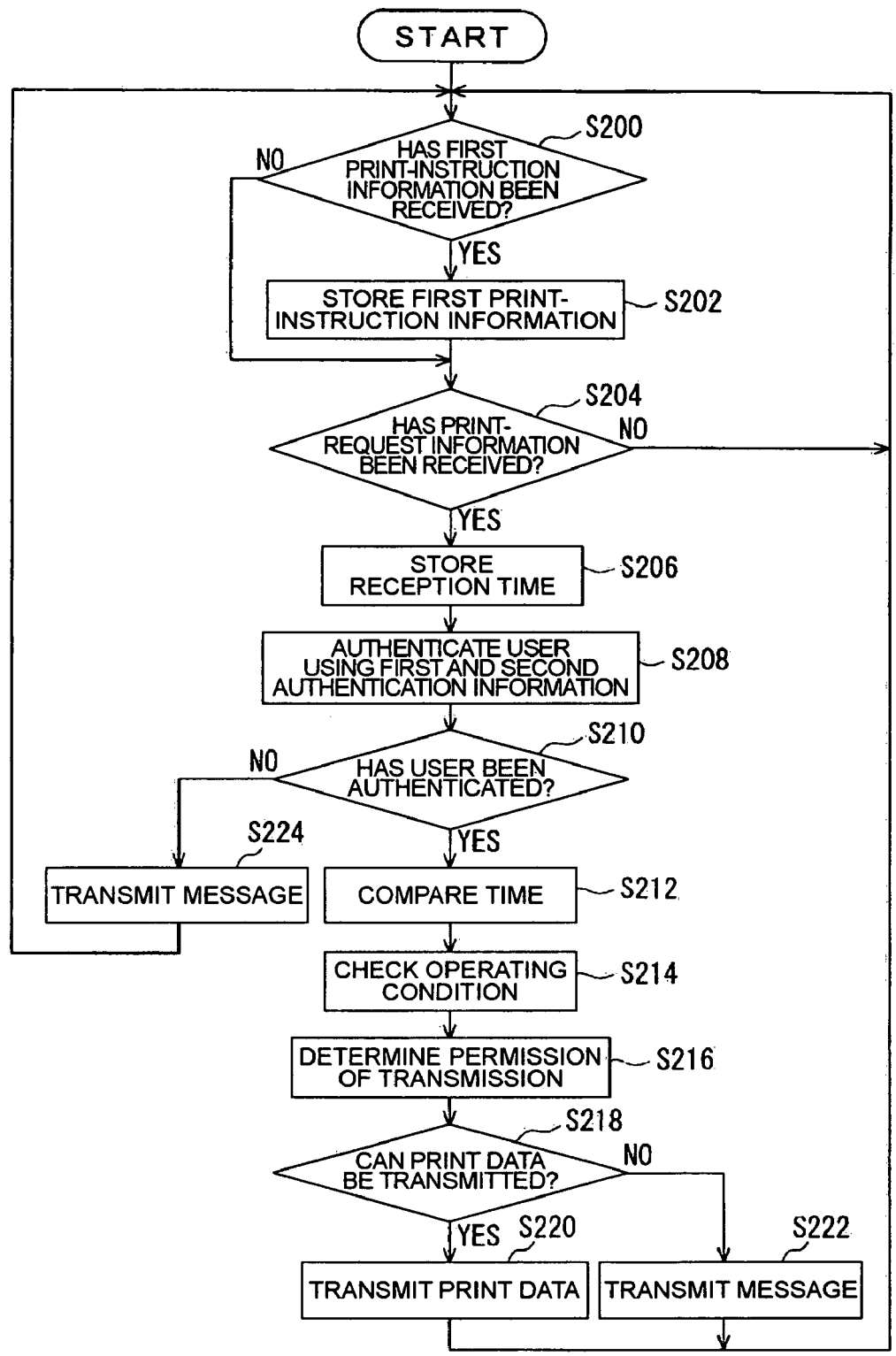
FIG. 6 is a flowchart for the print-data relay process of the first printer.

In step S108, the first print-instruction information generated in step S106 is sent to the first printer 3 corresponding to the IP address in the header information via the data communication section 2a in the data control section 2b, and the procedure moves to step The first printer 3 then starts a specified program stored in a region of the ROM by the CPU, and executes the print-data relay process shown in the flowchart of FIG. 6 in accordance with the program.

FIG. 6 is a flowchart for the print-data relay process of the first printer 3.

When the print-data relay process is started by the CPU, the procedure moves to step S200, as shown in FIG. 6.

In step S200, the data control section 3b determines whether or not first print-instruction information has been received from the information processor 2, wherein when a positive determination is made (Yes), the procedure moves to step S202; when a negative determination is made (No), the procedure moves to step S204.

When the procedure moves to step S202, the data control section 3b stores the first print-instruction information received in step S200 into the data storage section 3c, and the procedure moves to step S204.

In step S204, the data control section 3b determines whether or not the print-request information has been given from the second printer 4, wherein when a positive determination is made (Yes), the procedure moves to step S206; when a negative determination is made (No), the procedure moves to step S200.

When the procedure moves to step S206, the data control section 3b stores the print-request-information reception time into the data storage section 4c, and the procedure moves to step S208. In this embodiment, the information on print-request-information reception time is provided from a watch function section (not shown).

In step S208, the authentication section 3*d* compares second authentication information contained in the print-request information to first authentication information contained in the first print-instruction information stored in the data storage section 3*c*, thereby executes user authentication according to the comparison result, and the procedure moves to step S210.

In step S210, the transmission-permission determination section 3*e* determines whether or not the user is authenticated from the authentication result of step S208, wherein when it is determined that the user is authenticated (Yes), the procedure moves to step S212; when a negative determination is made (No), the procedure moves to step S224.

When the procedure moves to step S212, the transmission-permission determination section 3*e* obtains print-request-information reception time stored in the data storage section 3*c* and printable-time-zone information via the data control section 3*b*, and determines whether or not the time that print-request information is received is the time that printing is available from the obtained reception-time information and printable-time-zone information, and the procedure moves to step S214.

In step S214, the transmission-permission determination section 3*e* determines whether or not the destination second printer 4 can execute printing according to the operating-condition information contained in the print-request information, and the procedure moves to step S216.

In step S216, the transmission-permission determination section 3*e* determines whether or not print data can be transmitted to the destination second printer 4 according to the determination result of steps S212 and S214, and the procedure moves to step S218.

In step S218, the data control section 3*b* determines whether or not print data can be transmitted to the destination second printer 4 according to the determination result of step S216, wherein when a positive determination is made (Yes), the procedure moves to step S220; when a negative determination is made (No), the procedure moves to step S222.

When the procedure moves to step S220, the data control section 3*b* transmits print data corresponding to the print-request information to the second printer 4 corresponding to the IP address contained in the print-request information via the data communication section 3*a*, and the procedure moves to step S200.

On the other hand, when the procedure moves to step S222, the data control section 3*b* transmits a message indicative of that transmission of print data is not allowed to the second printer 4 corresponding to the IP address contained in the print-request information, and the procedure moves to step S200. The second printer 4 can display the received message on a display (not shown).

On the other hand, in step S210, when there is no first print-instruction information corresponding to the print-request information, so that the user is not authenticated, and the procedure moves to step S224, a message indicative of that the user was not authenticated is sent to the second printer 4 corresponding to the IP address contained in the print-request information, and the procedure moves to step S200.

Figure 7:
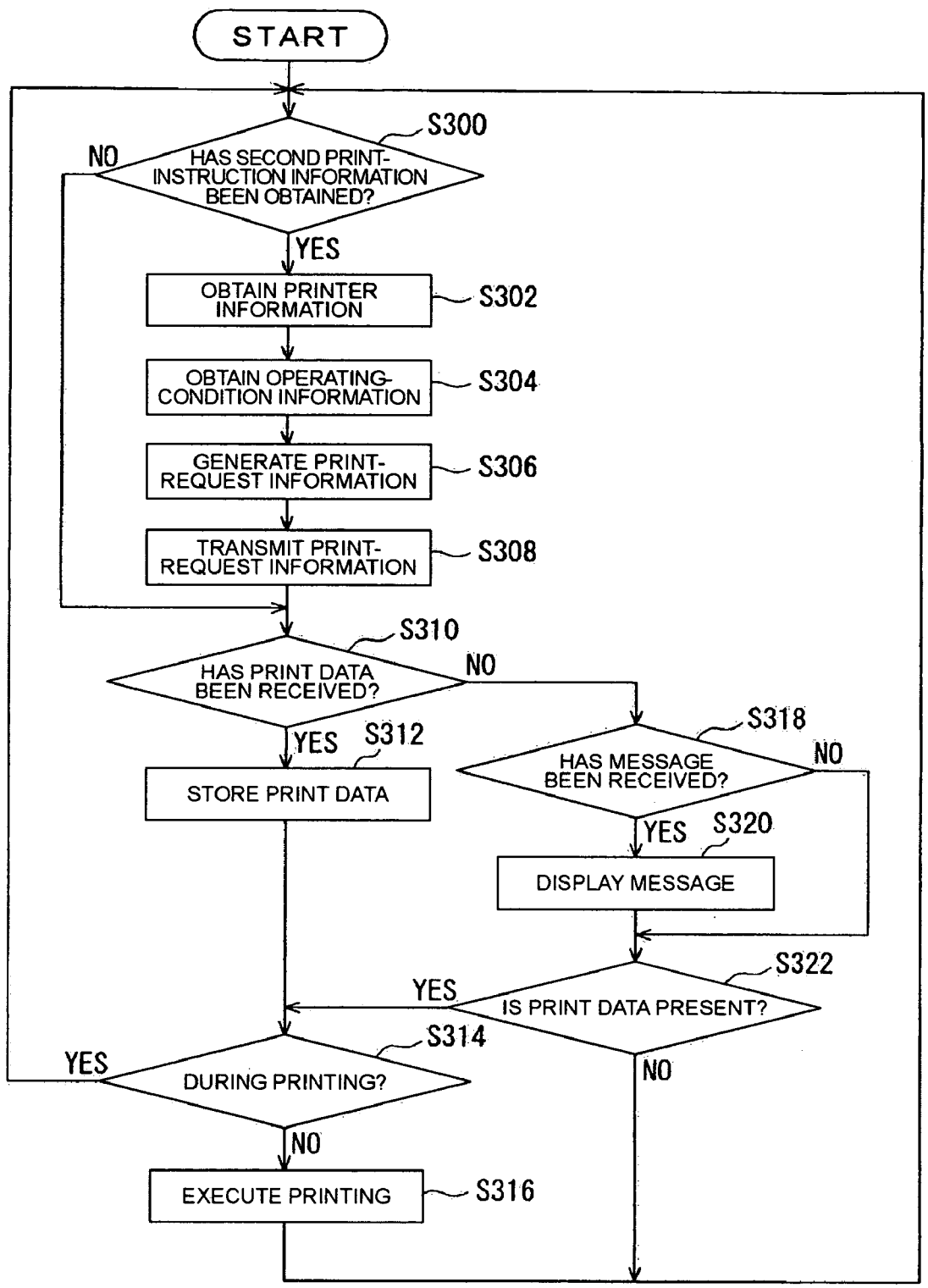
FIG. 7 is a flowchart for the print-data acquisition process and printing process of the second printer.

The second printer 4 starts a specified program stored in a region of the ROM by the CPU, and executes the print-data acquisition process and printing process shown in the flowchart of FIG. 7 according to the program.

FIG. 7 is a flowchart for the print-data acquisition process and printing process of the second printer 4.

When the print-data acquisition process and printing process are started by the CPU, the procedure moves to step S300, as shown in FIG. 7.

In step S300, the data control section 4*b* determines whether or not second print-instruction information has been given via the print-instruction-information acquisition section 4*d*, wherein when a positive determination is made (Yes), the procedure moves to step S302; when a negative determination is made (No), the procedure moves to step S310.

When the procedure moves to step S302, the print-request-information generating section 4*e* obtains information (IP address in this case) of the second printer 4 from the data storage section 4*c* via the data control section 4*b*, and the procedure moves to step S304.

In step S304, the data control section 4*b* obtains operating-condition information indicative of the operating condition of the print function from the printing section 4*f* and transmits the obtained operating-condition information to the print-request-information generating section 4*e*, and the procedure moves to step S306.

In step S306, print-request information is generated according to the second print-instruction information obtained in step S300 the information of the second printer 4 provided in step S302, and the operating-condition information obtained in step S304, and the procedure moves to step S308.

In step S308, the data control section 4*b* transmits the print-request information generated in step S306 to the first printer 3 via the data communication section 4*a*, and the procedure moves to step S310.

In step S310, the data control section 3*b* determines whether or not print data has been received from the first printer 3 via the data communication section 4*a*, wherein when a positive determination is made (Yes), the procedure moves to step S312; when a negative determination is made (No), the procedure moves to step S318.

When the procedure moves to step S312, the data control section 4*b* stores the print data received in step S310 into the data storage section 4*c*, and the procedure moves to step S314.

In step S314, the data control section 4*b* determines whether or not the printing section 4*f* is in process of printing, wherein when a positive determination is made (Yes), the procedure moves to step S300; when a negative determination is made (No), the procedure moves to step S316.

When the procedure moves to step S316, the printing section 4*f* executes printing according to the print data stored in step S312, and the procedure moves to step S300.

On the other hand, when print data is not received in step S310, and the procedure moves to step S318, the data control section 4*b* determines whether or not a message indicative of that print data cannot be sent is received from the first printer 3, wherein when a positive determination is made (Yes), the procedure moves to step S320; when a negative determination is made (No), the procedure moves to step S322.

When the procedure moves to step S320, the data control section 4*b* displays the message received in step S318 on a display (not shown), and the procedure moves to step S322.

In step S322, the data control section 4*b* determines whether or not unprocessed print data is present in the data storage section 4*c*, wherein when a positive determination is made (Yes), the procedure moves to step S314; when a negative determination is made (No), the procedure moves to step S300.

The operation of the embodiment will be described with reference to FIGS. 8A to 8F.

FIG. 8A shows examples of IP addresses assigned to the first printers 3A and 3B and the second printers 4A and 4B; FIG. 8B shows an example of the data structure of the first print-instruction information; FIG. 8C shows an example of the data structure of the second print-instruction information; FIG. 8D shows an example of the data structure of the print-request information; FIG. 8E shows an example of the data structure of the printable-time-zone information; and FIG. 8F shows an example of the print-request information when the operating condition is abnormal.

In the information processor 2, a print instruction is given from a document editor or the like (step S100). The print-instruction-information generating section 2*d* reads print data, user information, etc. from the data storage section 2*c* (steps S102 and S104), and first print-instruction information is generated (step S106). The first print-instruction information is what header information containing user information, the number of sets, and destination address information, as shown in FIG. 8B, is added to data that is converted from document data to page-description language. For the destination-address information in FIG. 8B, the IP address, "111. 111. 111. 001" of the first printer 3A is set, as shown in FIG. 8A. The data control section 2*b* transmits first print-instruction information generated by the print-instruction-information generating section 2*d* to the first printer 3A corresponding t the IP address via the data communication section 2*a* (step S108).

Upon reception of the first print-instruction information sent from the information processor 2 via the data communication section 3*a* (step S200), the first printer 3A stores the received first print-instruction information in the data storage section 3*c* (step S202).

When the user provides instructions to print the data formed by an editor or the like to the information processor 2, the user makes one of the second printers 4A and 4B read a magnetic card having information on the user with a card reader of the second printer 4. Here assume that the second printer 4A reads the magnetic card. Then, the print-instruction-information acquisition section 4*d* can obtain the user information (second authentication information), EPS\0001234, shown in FIG. 8C, as second print-instruction information (step S300).

When the second printer 4A obtains the second print-instruction information, the print-request-information generating section 4*e* obtains the IP address, "111. 111. 111. 003" of the second printer 4A, as information of the second printer 4A, shown in FIG. 8A, from the data storage section 4*c* via the data control section 4*b* (step S302). The data control section 4*b* obtains information on the operating-condition of the second printer 4A via the printing section 4*f*, and transmits the obtained operating-condition information to the print-request-information generating section 4*e* (S304). When the print-request-information generating section 4*e* obtains the second print-instruction information, information of the second printer 4A, and the operating-condition information, it generates the print-request information, shown in FIG. 8D, (step S306). Here the operating-condition information is "normal", showing that there is no problem in printing. When print-request information is generated by the print-request-information generating section 4*e*, the data control section 4*b* transmits the generated print-request information to the first printers 3A and 3B via the data communication section 4*a* (step S308).

Upon reception of the print-request information sent from the second printer 4A via the data communication section 3*a* (step S204), the first printers 3A and 3B obtain the time of the reception and store the time in the data storage section 3*c* (step S206). Here, assume that reception time "10:30" is stored. The first printers 3A and 3B extract user information (second authentication information) from the received print-request information, read the first print-instruction information stored in the data storage section 3*c*, extract user information (first authentication information) from the read first print-instruction information, and compare the extracted first and second authentication information to determine whether or not both information match. In this embodiment, since the first printer 3B stores no first print-instruction information, the first printer 3B transmits a message indicative of that the user was not authenticated to the second printer 4A (step S224).

Since the data storage section 3*c* stores the first print-instruction information shown in FIG. 8B, the first printer 3A extracts the first authentication information "EPS\0001234" from the first print-instruction information, similarly extracts second authentication information "EPS\0001234" from the print-request information shown in FIG. 8D, and compares the information (step S208). The comparison shows that they match each other. Thus the procedure moves to the process of the transmission-permission determination section 3*e* from a conclusion that the user is authenticated because there is first print-instruction information corresponding to the print-request information (step S210). The transmission-permission determination section 3*e* obtains the printable-time-zone information and print-request information reception time from the data storage section 3*c* via the data control section 3*b*, and determines whether or not the reception time is within printable time (step S212). The transmission-permission determination section 3*e* further determines whether or not the destination second printer 4A can execute printing from the operating-condition information contained in the print-request information (step S214), and determines whether or not print data corresponding to the authenticated print-request information can be sent to the destination second printer 4A from the determination results (step S216). Here, assume that the printable-time-zone information "8:00 to 22:00", shown in FIG. 8E, is read. Thus it determines to be within printable time because the reception-time information is "10:30", and that print data can be sent to the destination second printer 4A because the operating-condition information in the print-request information indicates "normal" (step S218), so that print data corresponding to the print-request information is transmitted to the second printer 4A via the data communication section 3*a* (step S220).

Upon reception of the print data sent from the first printer 3A via the data communication section 4*a* (step S310), the second printer 4A stores the received print data in the data storage section 4*c* (step S312). Then the second printer 4A inquires of the printing section 4*f* whether or not it is in process of printing (step S314), wherein when a negative determination is made, the second printer 4A executes printing in the printing section 4*f* according to the print data that was stored before (step S316).

When the data control section 4*b* obtains information indicative of "paper jamming" as operating-condition information in the second printer 4A, the print-request-information generating section 4*e* generates the print-request information, as shown in FIG. 8F. When the first printer 3A receives such print-request information, transmission-permission determination section 3*e* determines after the authentication that print data cannot be sent to the destination second printer 4A because the second printer 4A has a paper jam (step S218), and so transmits a message indicative of that transmission is disabled to the second printer 4A (step S222). Upon reception of the transmission-disabled message from the first printer 3A (step S318), the second printer 4A displays a message, for example, "print-data transmission disabled" on a display (not shown) (step S320). This also applies to the case in which printable time zone is outside the above-mentioned "8:00 to 22:00", in which case the transmission-permission determination section 3e determines that transmission is disabled.

Since print-request information is sent to the first printer 3 in the printing system, the second printer 4 can thus obtain print data sent from the information processor 2 from the first printer 3 that has the first print-instruction information corresponding to the print-request information, thereby printing it. Accordingly, the print data from the information processor 2 can be obtained by the second printer 4 for confidential printing without the intermediary of a printer server or the like, and can be printed.

Also, the transmission-permission determination section 3e can determine on the basis of printable-time-zone information and operating-condition information whether or not print data can be sent to the destination second printer 4. This can prevent printing during a risky time zone and transmission of print data in case of trouble of the second printer 4.

In the first embodiment, the print-instruction-information generating section 2d corresponds to the print-instruction-information generating unit of Form 1; and the first print-instruction-information transmission by the data control section 2b and the data communication section 2a corresponds to the transmission by the print-instruction-information transmission unit of Form 1.

In the first embodiment, the first print-instruction-information storage process by the data control section 3b and the data storage section 3c corresponds to the storage process by the print-instruction-information storage unit of Form 1; the authentication section 3d corresponds to the determination unit of one of Forms 1, 5, 6, 9, 18, 19, 48, 55, and 56; the print-data transmission process to the second printer 4 by the data control section 3b and the data communication section 3a corresponds to the transmission by the print-data transmission unit of one of Forms 1, 9, and 48; and the transmission-permission determination section 3e corresponds to the time-transmission determination unit of one of Forms 5, 18, and 55, and to the operating-condition-transmission determination unit of one of Forms 6, 19, and 56.

In the first embodiment, the print-instruction-information acquisition section 4d corresponds to the print-instruction-information acquisition unit of one of Forms 1, 10, and 49; and the print-request-information generating process by the print-request-information generating section 4e, the data control section 4b, and the data communication section 4a, and the transmission of the print-request information to the first printer 3 correspond to the process of the print-request-information transmission unit of one of Forms 1, 9, 10, 22, 35, 48, 49, 59, and 70.

In the first embodiment, the print-request-information (including operating-condition information) acquisition process by the data control section 3b and the data storage section 3c corresponds to one of the operating-condition-information acquisition unit of one of Forms 6, 19, and 56.

In the first embodiment, step S202 corresponds to the print-instruction-information storage step of one of Forms 22, 35, 59, and 70; steps S208 and S210 correspond to the determination step of one of Forms 22, 31, 32, 35, 44, 45, 59, 66, 67, 70, 77, and 78; steps S206, S212, S216, and S218 correspond to the time-transmission determination step of one of Forms 31, 44, 66, and 77; steps S214, S216, and S218 correspond to the operation-transmission determination step of one of Forms 32, 45, 67, and 78; and step S220 corresponds to the print-data transmission step of one of Forms 22, 35, 59, and 70.

In the first embodiment, step S300 corresponds to the print-instruction-information acquisition step of one of Forms 24, 37, 61, and 72; and steps S302 to S308 correspond to the print-request-information transmission step of one of Forms 24, 37, 61, and 72.

Second Embodiment

A second embodiment of the invention will be described with reference to the drawings. FIGS. 9 to 11G show a printing system, a first printer, a second printer, a program and a method for controlling the first printer, and a program and a method for controlling the second printer according to the second embodiment.

The second embodiment is different from the first embodiment in that the first print-instruction information contains no print data. Thus the first printer 3, when it is determined that transmission is available, further includes the procedure of obtaining print data corresponding to print-request information from the information processor 2. Accordingly, the system configuration of the second embodiment is different from that of the first embodiment in the process of the information processor 2 and the first printer 3.

This embodiment will be described using the system configuration of the first embodiment, and a duplicate description will be omitted here.

The function of the information processor 2 shown in FIG. 2 that is different from that of the first embodiment will be described.

In addition to the functions of the first embodiment, the data control section 2b has the function of reading target print data from the data storage section 2c when first print-instruction information is generated by the print-instruction-information generating section 2d, and storing the print data in association with the generated first print-instruction information. The data control section 2b further has the function of reading print data corresponding to the print-data obtaining request from the first printer 3 from the data storage section 2c, and transmitting the read print data to the first printer 3 that is the source of the acquisition request via the data communication section 2a. Accordingly, the data storage section 2c can store print data with which first print-instruction information is associated in addition to the data described in the first embodiment.

Furthermore, the print-instruction-information generating section 2d has the function of reading user information stored in the data storage section 2c in accordance with the print-instruction fro the user, and generating first print-instruction information on the basis of the read user information. In this embodiment, the first print-instruction information is user information itself.

The function of the first printer 3 shown in FIG. 3 that is different from that of the first embodiment will be described.

In place of the function of transmitting the print data contained in the first print-instruction information to the destination second printer 4 according to the first embodiment, the data control section 3b has the function of generating print-data-acquisition-request information corresponding to the first print-instruction information, which corresponds to print-request information on the print data that is determined to be transmittable by the transmission-permission determination section 3e, transmitting the generated acquisition-request information to the information processor 2 via the data communication section 3a, receiving print data corresponding to the acquisition-request information from the information processor 2 via the data communication section 3a, and transmitting the received print data to the destination second printer 4 via the data communication section 3a. The other functions are the same as those of the first embodiment. As a result, the data storage section 3c stores first print-instruction information containing no print data.

Figure 9:
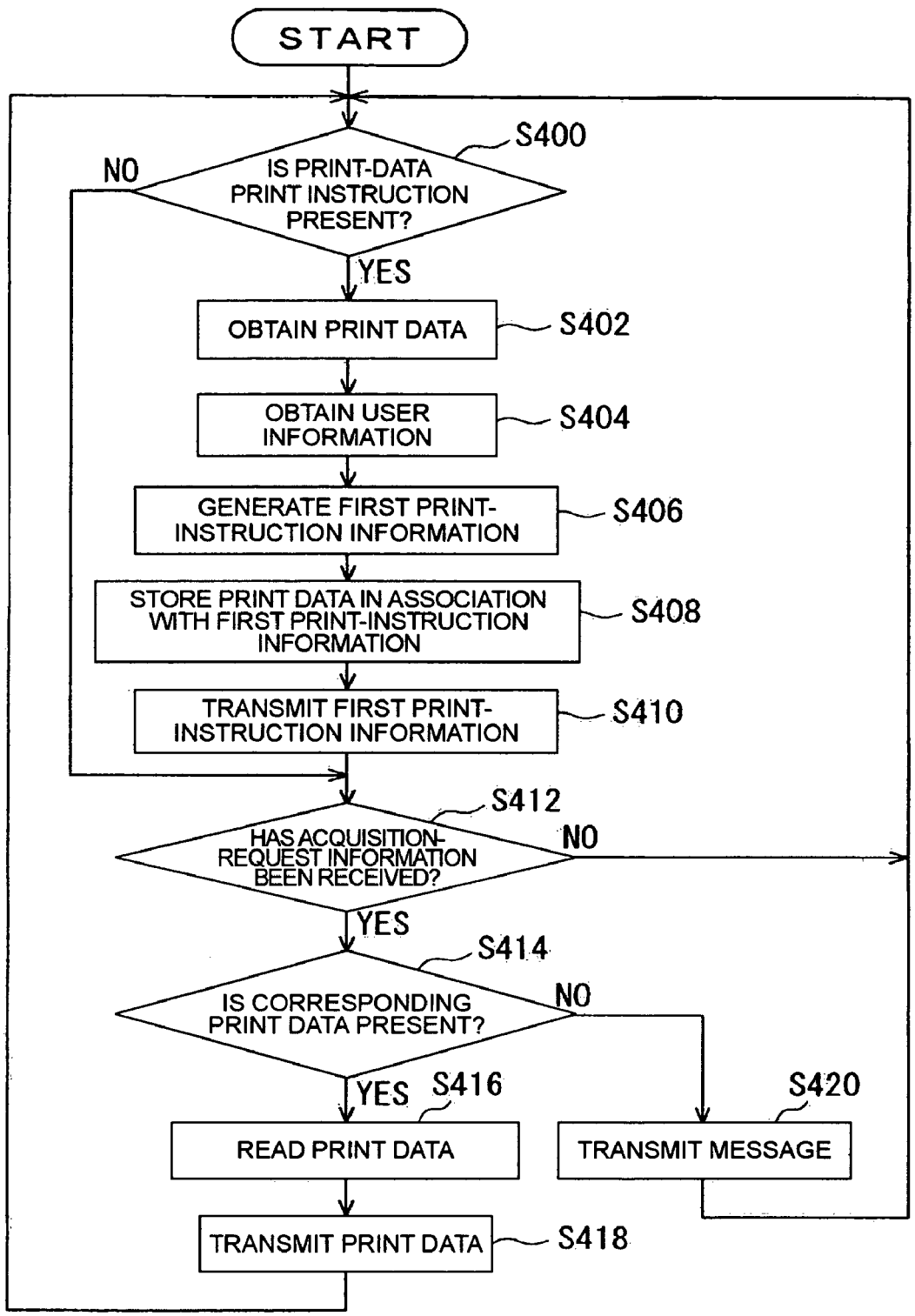
FIG. 9 is a flowchart for the print-information transmission process in the information processor.

The information processor 2 starts a specified program stored in a region of the ROM by the CPU, and executes the print-information transmission process shown in the flowchart of FIG. 9 according to the program.

FIG. 9 is a flowchart for the print-information transmission process of the information processor 2.

When the print-information transmission process is started by the CPU, the procedure moves to step S400, as shown in FIG. 9.

In step S400, the data control section 2b determines whether or not a print-data print instruction has been given, wherein when a positive determination is made (Yes), the procedure moves to step S402; when a negative determination is made (No), the moves to step 412.

When the procedure moves to step S402, the print-instruction-information generating section 2d obtains print data stored in the data storage section 2c via the data control section 2b, and the procedure moves to step S404.

In step S404, the print-instruction-information generating section 2d obtains user information (first authentication information) from the data storage section 2c via the data control section 2b, and the procedure moves to step S406.

In step S406, the print-instruction-information generating section 2d generates first print-instruction information on the basis of the user information, and the procedure moves to step S408.

In step S408, the print-instruction-information generating section 2d associates the print data obtained in step S402 with the first print-instruction information generated in step S406, and the associated print data is stored in the data storage section 2c via the data control section 2b, and the procedure moves to step S410.

In step S410, the data control section 2b transmits the first print-instruction information generated in step S406 to the first printer 3 via the data communication section 2a, and the procedure moves to step S412. In this embodiment, the first printer 3, which is the destination of the first print-instruction information, is set by the user in advance.

In step S412, the data control section 2b determines whether or not print-data-acquisition-request information has been received from the first printer 3 via the data communication section 2a, wherein when a positive determination is made (Yes), the procedure moves to step S414; when a negative determination is made (No), the procedure moves to step S400.

When the procedure moves to step S414, the data control section 2b determines whether or not print data corresponding to the acquisition-request information received in step S412 is present in the data storage section 2c, wherein when a positive determination is made (Yes), the procedure moves to step S416; when a negative determination is made (No), the procedure moves to step S420. In this embodiment, the acquisition-request information has a data structure containing user information corresponding to the print-request information. Accordingly, the data control section 2b can determine the presence of print data by searching for print data corresponding to user information.

When the procedure moves to step S416, the data control section 2b reads print data corresponding to the acquisition-request information from the data storage section 2c, and the procedure moves to step S418.

In step S418, the data control section 2b transmits the print data read in step S416 to the first printer 3, which is the source of the acquisition-request information, via the data communication section 2a, and the procedure moves to step S400.

In step S414, when there is no print data corresponding to the acquisition-request information, so that the procedure moves to step S420, a message indicative of the absence of the print data is sent to the first printer 3, which is the source of the print-request information, and the procedure moves to step S400.

Figure 10:
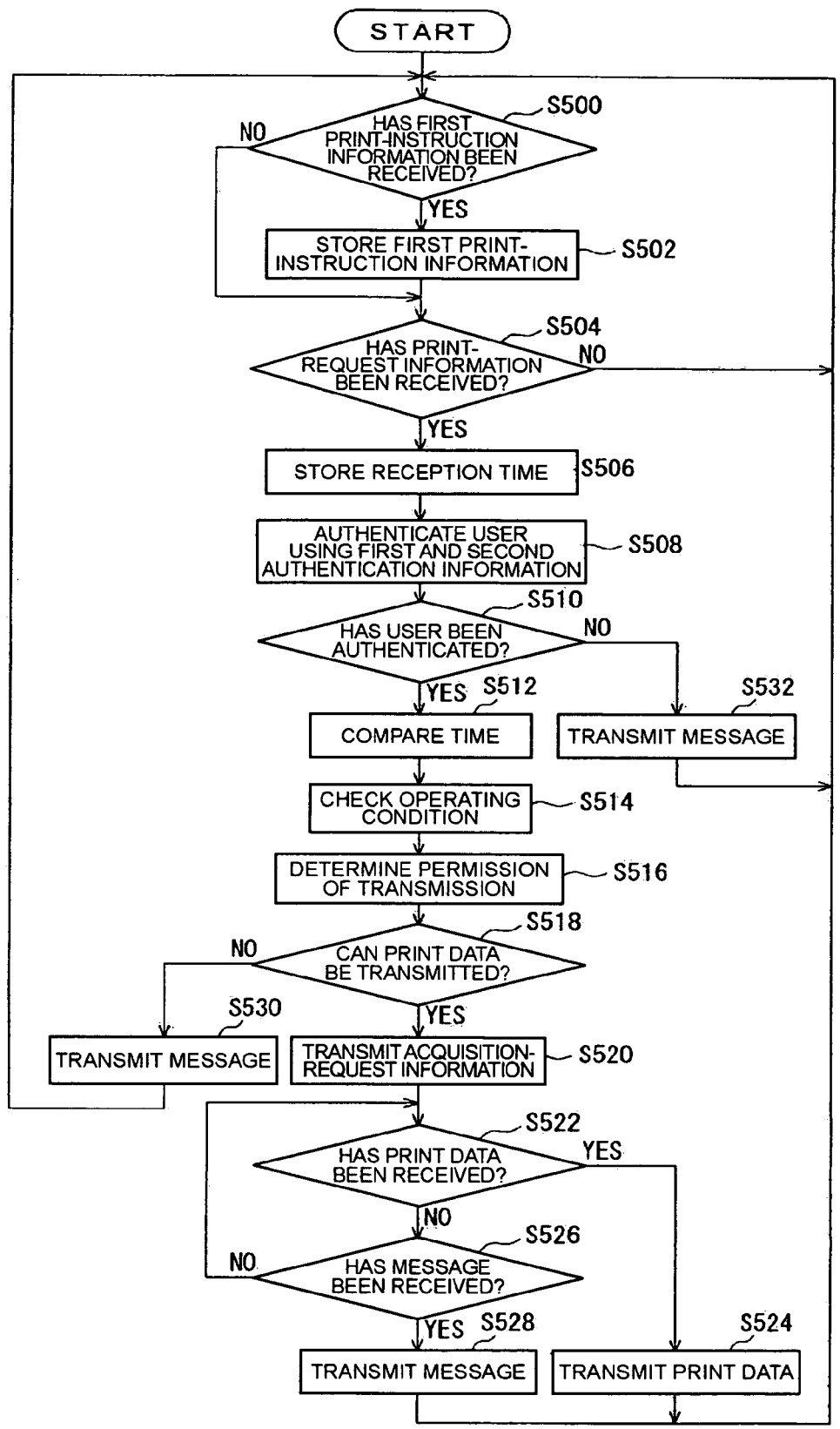
FIG. 10 is a flowchart for the print-data relay process of the first printer.

The first printer 3 starts a specified program stored in a region of the ROM by the CPU, and executes the print-data relay process shown in the flowchart of FIG. 10 according to the program.

FIG. 10 is a flowchart for the print-data relay process of the first printer 3.

When the print-data relay process is started by the CPU, the procedure moves to step S500, as shown in FIG. 10. Here the processes of steps S500 to S518, S530, and S532 are the same as those of steps S200 to S218, S222, and S224 of the print-data relay process in the flowchart of FIG. 5 according to the first embodiment. Accordingly, their description will be omitted here.

The process from step S520 will be described.

When the procedure moves to step S520, the data control section 3b generates print-data-acquisition-request information corresponding to the print-request information received in step S504, and transmits the generated acquisition-request information to the information processor 2, which is the source of the first print-instruction information corresponding to the print-request information, via the data communication section 3a, and the procedure moves to step S522.

In step S522, the data control section 3b determines whether or not the print data corresponding to the acquisition-request information sent in step S520 has been received from the information processor 2 via the data communication section 3a, wherein when a positive determination is made (Yes), the procedure moves to step S524; when a negative determination is made (No), the procedure moves to step S526.

When the procedure moves to step S524, the data control section 3b transmits the print data received in step S522 to the second printer 4, which is the destination of the print data, via the data communication section 3a, and the procedure moves to step S500.

On the other hand, when the procedure moves to step S526, the data control section 3b determines whether or not a message indicative of the absence of the print data is received from the information processor 2, wherein when a positive determination is made (Yes), the procedure moves to step S528; when a negative determination is made (No), the procedure moves to step S522.

When the procedure moves to step S528, the data control section 3b displays the message received in step S526 on a display (not shown), and the procedure moves to step S500.

Referring to FIGS. 11A to 11G, the operation of the embodiment will be described.

FIG. 11A shows examples of IP addresses assigned to the information processor 2, the first printers 3A and 3B, and the second printers 4A and 4B; FIG. 11B shows an example of the data structure of the first print-instruction information; FIG. 11C shows an example of print data stored in the information processor 2; FIG. 11D shows an example of the data structure of the second print-instruction information; FIG. 11E shows an example of the data structure of the print-request information; FIG. 11F shows an example of the data structure of the printable-time-zone information; and FIG. 11G shows an example of the data structure of the acquisition-request information.

In the information processor 2, a print instruction is given from a document editor or the like (step S400). The print-instruction-information generating section 2d reads print data (step S402) and user information (step S404) from the data storage section 2c. First print-instruction information is generated on the basis of the read user information (step S406). As shown in FIG. 11B, the first print-instruction information contains user information, destination-address information (the IP address of the destination first printer 3), and source-address information (the IP address of the information processor 2). In this embodiment, for the destination-address information in FIG. 11B, the IP address "111. 111. 111. 001" of the first printer 3A is set, as shown in FIG. 11A; and for the source-address information, the IP address "111. 111. 111. 005" of the information processor 2 is set, as shown in FIG. 11A. When the first print-instruction information is generated, the data control section 2b stores the specified print data in the data storage section 2c in association with the first print-instruction information (step S408). As shown in FIG. 11C, the print data is stored such that the user information is associated with a document ID indicative of the print data. FIG. 11C shows an example in which user information "EPS\0001234" and a document ID "20040801001" are associated for storage, and an example in which user information "EPS\0001235" and a document ID "20040801002" are associated for storage. Furthermore, the data control section 2b transmits the first print-instruction information generated by the print-instruction-information generating section 2d to the first printer 3A corresponding to the destination IP address contained in the first print-instruction information via the data communication section 2a (step S410)

Upon reception of the first print-instruction information sent from the information processor 2 via the data communication section 3a (step S500), the first printer 3A stores the received first print-instruction information in the data storage section 3c (step S502).

The operation of the information processor 2 of this embodiment is the same as that of the first embodiment. Specifically, when the print-instruction-information acquisition section 4d obtains the print-instruction information shown in FIG. 11D, the print-request-information generating section 4e generates the print-request information shown in FIG. 11E, and transmits the generated print-request information to the first printers 3A and 3B.

When the first printers 3A and 3B receive the print-request information sent from the second printer 4A via the data communication section 3a (step S504), the same operation as that of the first embodiment is executed until the transmission-permission determination process of step S518. In other words, for the print-request information sent from the second printer 4A, the operating condition is "normal", the reception time is within the printable time zone shown in FIG. 11F, and the first printer 3A has first print-instruction information corresponding to the print-request information.

The operation of step S520 and subsequent operations will be described.

When the transmission-permission determination section 3e determines that transmission is allowed, as in the first embodiment, the data control section 3b generates user information contained in the first print-instruction information corresponding to the print-request information and acquisition-request information that contains the IP address of the first printer 3, and transmits the generated acquisition-request information to the information processor 2 corresponding to the IP address contained in the first print-instruction information via the data communication section 3a (step S520). The acquisition-request information has a data structure containing user information "EPS\0001234" contained in the first print-instruction information and the IP address of the first printer 3A, "111. 111. 111. 001" as shown in FIG. 11G.

When the acquisition-request information is sent from the first printer 3A, the information processor 2 receives the acquisition-request information via the data communication section 2a (step S412), and the data control section 2b searches the data storage section 2c using the user information contained in the received acquisition-request information as keyword to determine whether or not print data corresponding to the acquisition-request information is stored in the data storage section 2c from the search result (step S414). As has been described, the data storage section 2c stores print data corresponding to the user information "EPS\0001234". Thus the data control section 2b determines that print data corresponding to the acquisition-request information is present, so that it reads the print data from the data storage section 2c (step S416), and transmits the read print data to the first printer 3A corresponding to the IP address "111. 111. 111. 001" contained in the acquisition-request information (step S418).

When the print data corresponding to the acquisition-request information is sent from the information processor 2, the first printer 3A receives the print data via the data communication section 3a (step S522), and transmits the received print data to the destination second printer 4A (step S524).

Since the printing system transmits print-request information to the first printer 3, the second printer 4 can thus obtain the print data from the information processor 2 from the first printer 3 that has the first print-instruction information corresponding to the print-request information, thereby printing it. Accordingly, the print data from the information processor 2 can be obtained by the second printer 4 for confidential printing without the intermediary of a printer server or the like, and can be printed.

Also, the first printer 3 can obtain the print data corresponding to the print-request information from the second printer 4 from the information processor 2 and transmit it to the destination second printer 4. Accordingly, the first printer 3 has to only store the first print-instruction information that contains no print data and manage it, thus decreasing data memory capacity necessary for relaying print data.

In the second embodiment, the print-instruction-information generating section 2d corresponds to the print-instruction-information generating unit of Form 2; the process of storing the print data in association with the first print-instruction information by the data control section 2b and the data storage section 2c corresponds to the process of the print-data storage unit of Form 2; and the process of transmitting the first print-instruction information by the data control section 2b and the data communication section 2a corresponds to the process of the print-instruction-information transmission unit of Form 2; and the process of transmitting print data to the first printer 3 in response to the acquisition-request information by the data control section 2b and the data communication section 2a corresponds to the process of the first print-data transmission unit of Form 2.

In the second embodiment, the process of storing first print-instruction information by the data control section 3b and the data storage section 3c corresponds to the process of the print-instruction-information storage unit of Form 2; the authentication section 3d corresponds to the determination unit of one of Forms 2, 5, 6, 11, 18, 19, 50, 55, and 56; the process of transmitting print data to the second printer 4 by the data control section 3b and the data communication section 3a corresponds to the process of the second print-data transmission unit of one of Forms 2, 11, and 50; the transmission-permission determination section 3e corresponds to the time-transmission determination unit of one of Forms 5, 18, and 55 and the operation-transmission determination unit of Form 6 or 19; and the process of transmitting acquisition-request information to the information processor 2 by the data control section 3*b* or the data communication section 3*a* corresponds to the process of the acquisition-request-information transmission unit of one of Forms 2, 11, and 50.

In the second embodiment, the print-instruction-information acquisition section 4*d* corresponds to the print-instruction information acquisition unit of one of Forms 2, 11, and 50; and the process of generating print-request information and the process of transmitting the print-request information to the first printer 3 by the print-request information generating section 4*e*, the data control section 4*b* and the data communication section 4*a* correspond to the process of the print-request information transmission unit of one of Forms 2, 11, 12, 24, 37, 50, 51, 61, and 72.

In the second embodiment, the process of obtaining print-request information (including operating-condition information) by the data control section 3*b* and the data communication section 3*a* corresponds to the process of the operating-condition-information acquisition unit of one of Forms 6, 19, and 56.

In the second embodiment, step S502 corresponds to the print-instruction-information storage step of one of Forms 24, 37, 61, and 72; steps S508 and S510 correspond to the determination step of one of Forms 24, 31, 32, 37, 44, 45, 61, 66, 67, 72, 77, and 78; steps S506, S512, S516, and S518 correspond to the time-transmission determination step of one of Forms 31, 44, 66, and 77; steps S514, S516, and S518 correspond to one of the operation-transmission determination step of one of Forms 32, 45, 67, and 78; and step S520 corresponds to the acquisition-request-information transmission step of one of Forms 24, 37, 61, and 72, and the second print-data transmission step of one of Forms 24, 37, 61, and 72.

In the second embodiment, step S300 corresponds to the print-instruction-information acquisition step of one of Forms 24, 37, 61, and 72; and steps S302 to S308 correspond to the print-request-information transmission step of one of Forms 25, 38, 62, and 73.

Third Embodiment

A third embodiment of the invention will be described with reference to the drawings. FIGS. 12 to 19G show a printing system, a first printer, a second printer, a third printer, a program and a method for controlling the first printer, a program and a method for controlling the second printer, and a program and a method for controlling the third printer according to the third embodiment.

Figure 12:
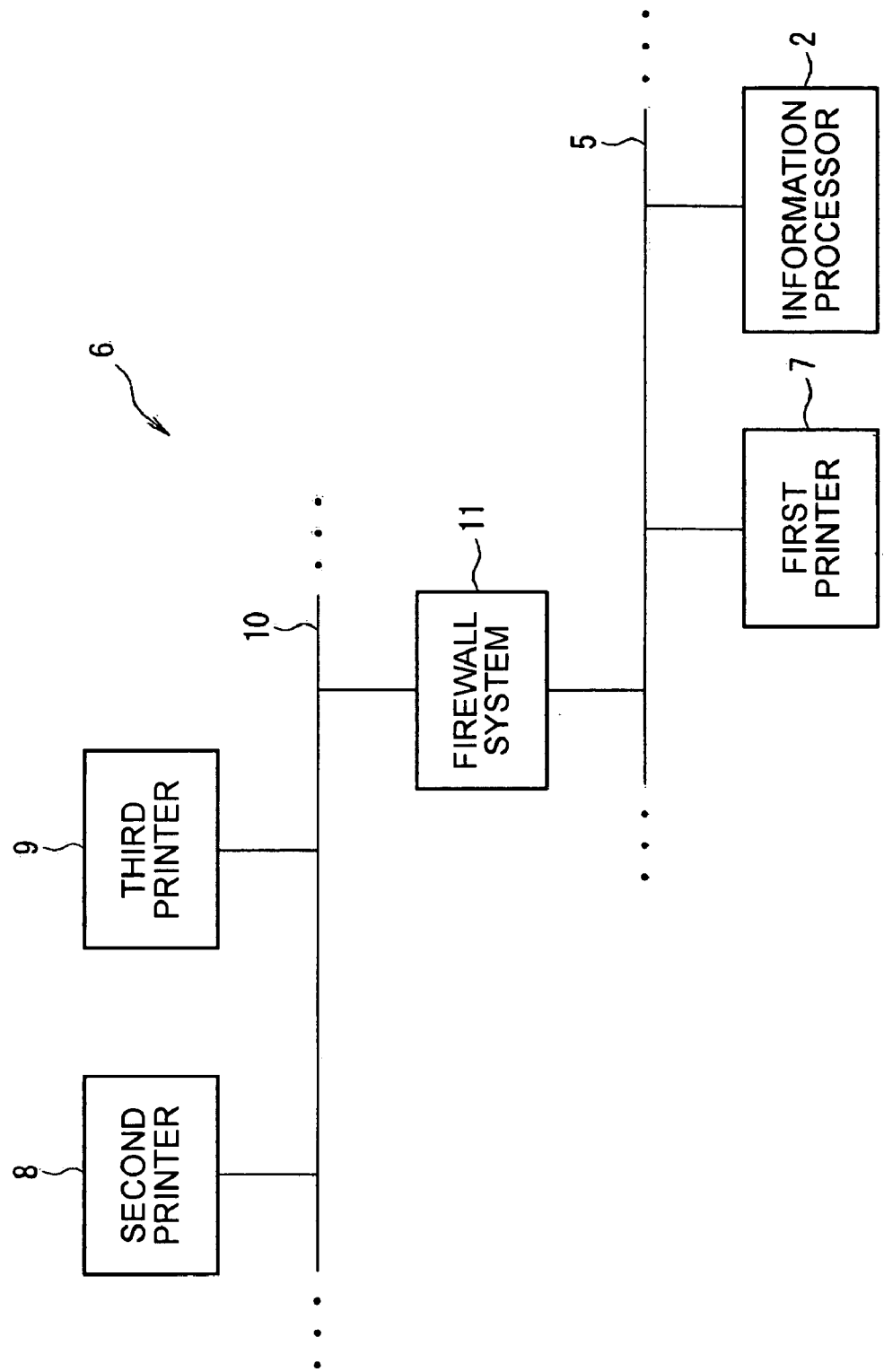
FIG. 12 is a block diagram of a printing system according to a third embodiment of the invention.

The structure of a printing system 6 according to the third embodiment will be described with reference to FIG. 12. FIG. 12 is a block diagram of the printing system 6.

As shown in FIG. 12, the printing system 6 includes an information processor 2, a first printer 7, a second printer 8, a third printer 9, a network 5, a network 10, and a firewall system 11 (hereinafter, referred to as an FW system 11).

The information processor 2 has the function of generating first print-instruction information containing print data and user information, and transmitting the generated first print-instruction information to the first printer 7. Since the third embodiment has a structure similar to that of the first embodiment, the detailed structure will be omitted here.

The first printer 7 has the function of storing the first print-instruction information received from the information processor 2 and, upon reception of second print-request information from the third printer 9, executing authentication on the basis of the received second print-request information and the stored first print-instruction information and, when the user is authorized, determining whether or not to transmit print data on the basis of operating-condition information contained in the second print-request information. Although the printing system 6 includes one printer 7, as shown in FIG. 12, the number of printers is not limited to one but may be two or more. The details will be described later.

The second printer 8 has the function of obtaining second print-instruction information containing user information via a magnetic card of a user, adding the IP address and operating-condition information of the second printer 8 to the obtained second print-instruction information to generate first print-request information, and transmitting the generated first print-request information to the third printer 9. Although the printing system 6 includes one second printer 8, as shown in FIG. 12, the number of printers is not limited to one but may be two or more. The details will be described later.

The third printer 9 has the function of, upon reception of the first print-request information from the second printer 8, adding its information (IP address in this embodiment) to the received first print-request information to generate second print-request information, and transmitting the generated second print-request information to the first printer 7 connected to the network 5 via the FW system 11. The third printer 9 also receives print data corresponding to the second print-request information sent from the first printer 7 via the FW system 11, and transmits the received print data to the second printer 8 corresponding to the second print-request information. Although the printing system 6 includes one third printer 9, as shown in FIG. 12, the number of printers is not limited to one but may be two or more. The details will be described later.

The network 10 is a known information network such as a LAN or a WAN, which is different logically and physically from the network 5 of the first embodiment.

The FW system 11 is a known firewall system, which has the function of monitoring data flowing on the boundary with the outside to detect and cut off incorrect access so as to prevent a third person from entering via an external network, such as the Internet, to read by stealth, alter, or break data and programs. This embodiment allows only the passage of data transmitted from the third printer 9 and sends it to the units connected to the network 5, and allows only the passage of data transmitted from the units connected to the network 5 to the third printer 9.

Figure 13:
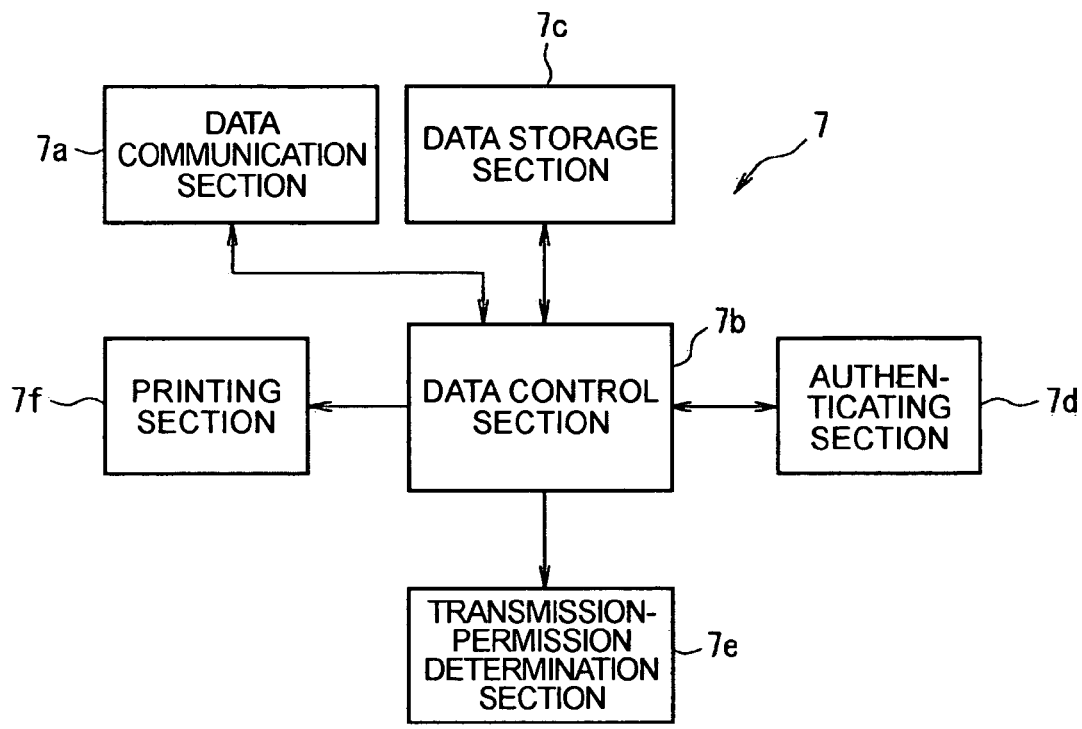
FIG. 13 is a block diagram of a first printer.

Referring to FIG. 13, the detailed structure of the first printer 7 will be described. FIG. 13 is a block diagram of the first printer 7.

As shown in FIG. 13, the first printer 7 includes a data communication section 7*a*, a data control section 7*b*, a data storage section 7*c*, an authenticating section 7*d*, a transmission-permission determination section 7*e*, and a printing section 7*f*.

The data communication section 7*a* has the function of exchanging data with the information processor 2 and the third printer 9, such as receiving various data including the first print-instruction information sent from the information processor 2, and the second print-request information sent from the third printer 9 via the FW system 11, via the network 5, and transmitting print data corresponding to the second print-request information to the third printer 9 via the FW system 11.

The data control section 7*b* has the function of centralized control of the flow of data in the first printer 7, such as storing the first print-instruction information received from the information processor 2 via the data communication section 7*a* in the data storage section 7*c*, transmitting various data stored in the data storage section 7*c* to the components, relaying the exchange of data among the components, and transmitting print data corresponding to the second print-request information to the third printer 9 via the data communication section 7a.

The data storage section 7c has the function of storing data necessary for various processings, in addition to the data such as the first print-instruction information received via the data communication section 7a.

The authentication section 7d has the function of comparing user information (hereinafter, referred to as second authentication information) contained in the second print-request information received from the third printer 9 to user information (hereinafter, referred to as first authentication information) contained in the first print-instruction information stored in the data storage section 7c to determine whether or not they match each other, thereby authenticating the user who gave the print instruction.

The transmission-permission determination section 7e has the function of, when print data corresponding to the second print-request information received from the third printer 9 is stored in the data storage section 7c and the user is authenticated, determining whether or not to transmit the print data according to the operating-condition information contained in the second print-request information.

The printing section 7f has the function of printing images in image data and documents in document data that construct the print data in accordance with the print data stored in the data storage section 7c. In this embodiment, the printing section 7f executes printing according to print-instruction information from the information processor 2 to the first printer 7.

The first printer 7 includes a processor, an RAM, and an ROM that stores dedicated programs (which are not shown), and provides the foregoing functions by executing the dedicated programs with the processor. The above-mentioned units include units that function only by their dedicated programs and units that function by controlling hardware using dedicated programs.

Figure 14:
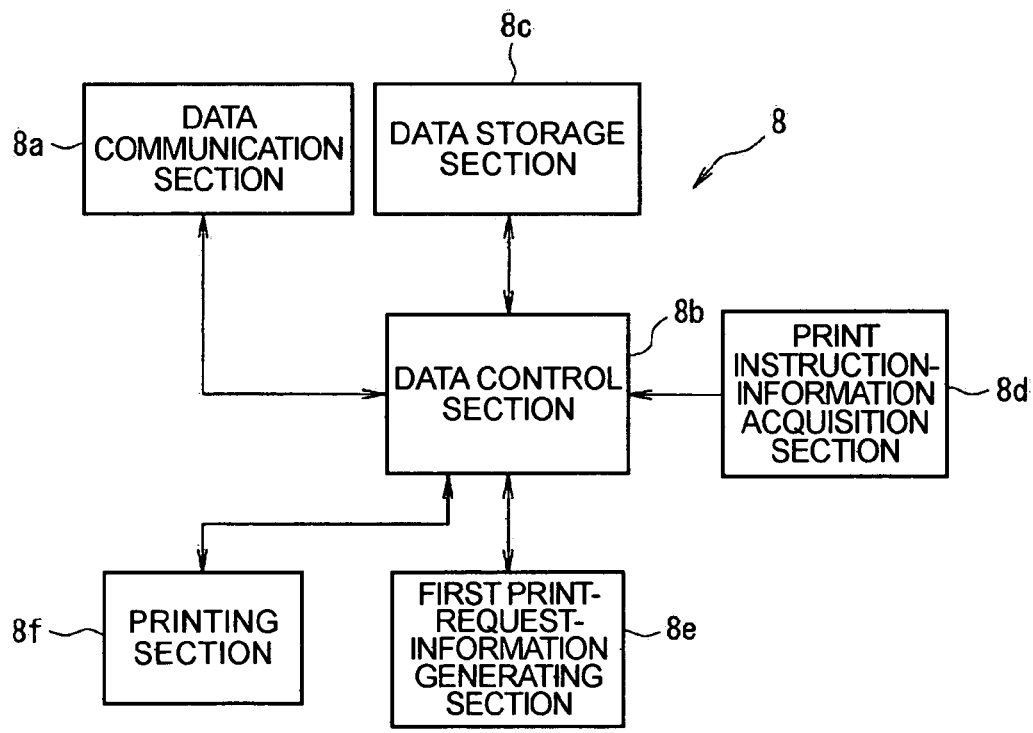
FIG. 14 is a block diagram of a second printer.

Referring to FIG. 14, the detailed structure of the second printer 8 will be described. FIG. 14 is a block diagram of the second printer 8.

As shown in FIG. 14, the second printer 8 includes a data communication section 8a, a data control section 8b, a data storage section 8c, a print-instruction-information acquisition section 8d, a first print-request-information generating section 8e, and a printing section 8f.

The data communication section 8a has the function of exchanging data with the third printer 9, such as transmitting first print-request information generated by the first print-request-information generating section 8e to the third printer 9 via the network 5, and receiving print data transmitted from the third printer 9 via the network 5.

The data control section 8b has the function of centralized control of the flow of data in the second printer 8, such as storing print data received from the third printer 9 via the data communication section 8a in the data storage section 8c, transmitting various data stored in the data storage section 8c to the components, relaying the exchange of data among the components, and transmitting first print-request information to the third printer 9 via the data communication section 8a, and the function of obtaining present operating-condition information of the print function of the second printer 8 via the printing section 8f, and transmitting the obtained operating-condition information to the first print-request-information generating section 8e.

The data storage section 8c has the function of storing data necessary for various processings, in addition to the print data received via the data communication section 8a.

The print-instruction-information acquisition section 8d includes a magnetic-card reader, and so has the function of reading the information in user's magnetic cards (hereinafter, referred to as second print-instruction-information). In this embodiment, the magnetic card stores user-identifying information. The print-instruction-information acquisition section 8d reads the user-identifying information as second print-instruction information.

The first print-request-information generating section 8e has the function of adding the information (IP address) of the second printer 8 and the operating-condition information obtained via the printing section 8f to the second print-instruction information (user-identifying information) to generate first print-request information.

The printing section 8f has the function of printing images in image data and documents in document data that construct the print data on the basis of print data received from the third printer 9 and stored in the data storage section 8c.

The second printer 8 includes a processor, an RAM, and an ROM that stores dedicated programs, which are not shown, and provides the foregoing functions by executing the dedicated programs with the processor. The above-mentioned units include units that function only by their dedicated programs and units that function by controlling hardware with dedicated programs.

Figure 15:
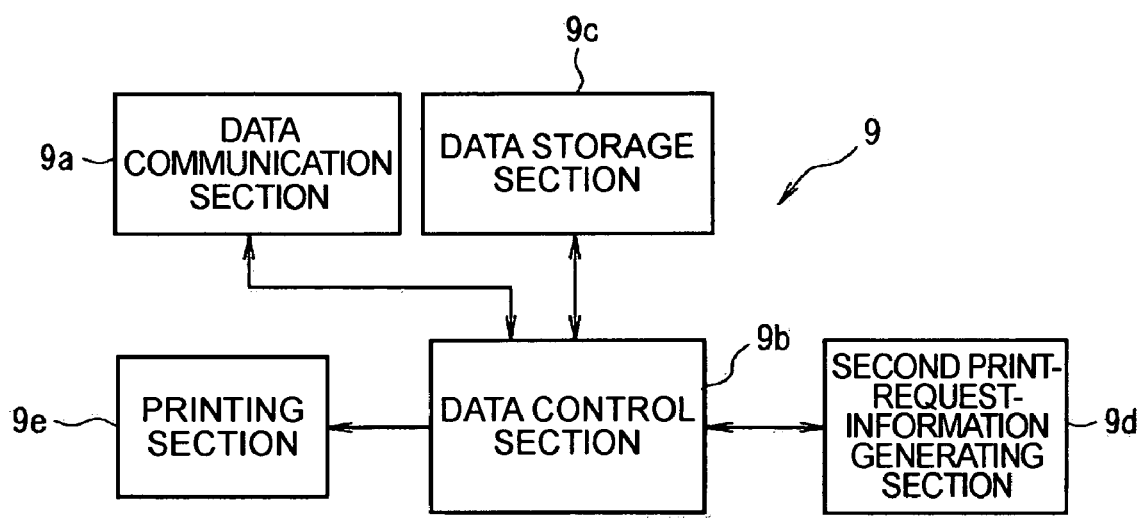
FIG. 15 is a block diagram of a third printer.

Referring to FIG. 15, the detailed structure of the third printer 9 will be described. FIG. 15 is a block diagram of the third printer 9.

As shown in FIG. 15, the third printer 9 includes a data communication section 9a, a data control section 9b, a data storage section 9c, a second print-request-information generating section 9d, and a printing section 9e.

The data communication section 9a has the function of exchanging data among the third printer 9, the first printer 7, the second printer 8, and the information processor 2, such as receiving the first print-request information from the second printer 8 via the network 10, transmitting second print-request information generated by the second print-request-information generating section 9d to the first printer 7 via the network 10 and the FW system 11, receiving print data sent from the first printer 7 or the information processor 2 via the FW system 11 and the network 10, and transmitting print data corresponding to the second print-request information to the second printer 8 via the network 10.

The data control section 9b has the function of centralized control of the flow of data in the third printer 9, such as storing first print-request information received from the second printer 8 and various data including print data received from the first printer 7 via the data communication section 9a in the data storage section 9c, transmitting the various data stored in the data storage section 9c to the components, relaying the exchange of data among the components, and transmitting second print-request information to the first printer 7 via the data communication section 9a, and the function of transmitting print data to the second printer 8 via the data communication section 9a.

The data storage section 9c has the function of storing data necessary for various processings, including the first print-request information and the print data received via the data communication section 9a.

The second print-request-information generating section 9d has the function of adding the information (IP address) of the third printer 9 to the first print-request information sent from the second printer 8 to generate second print-request information.

The printing section 9e has the function of printing images in image data and documents in document data that construct the print data on the basis of print data stored in the data storage section 9c. In this embodiment, the printing section 9e executes printing according to the print-instruction information from the third printer 9 from the information processor 2.

The third printer 9 includes a processor, an RAM, and an ROM that stores dedicated programs, which are not shown, and provides the foregoing functions by executing the dedicated programs with the processor. The above-mentioned units include units that function only by the dedicated programs and units that function by controlling hardware with a dedicated program.

The information processor 2 starts a specified program stored in a region of the ROM by the CPU, and executes the print-instruction-information transmission process shown in the flowchart of FIG. 5 in accordance with the program. The print-instruction-information transmission process of this embodiment is different from that of the first embodiment only in that the first print-instruction information is sent not to the first printer 3 but to the first printer 7. Accordingly, a description of the print-instruction-information transmission process will be omitted here.

Figure 16:
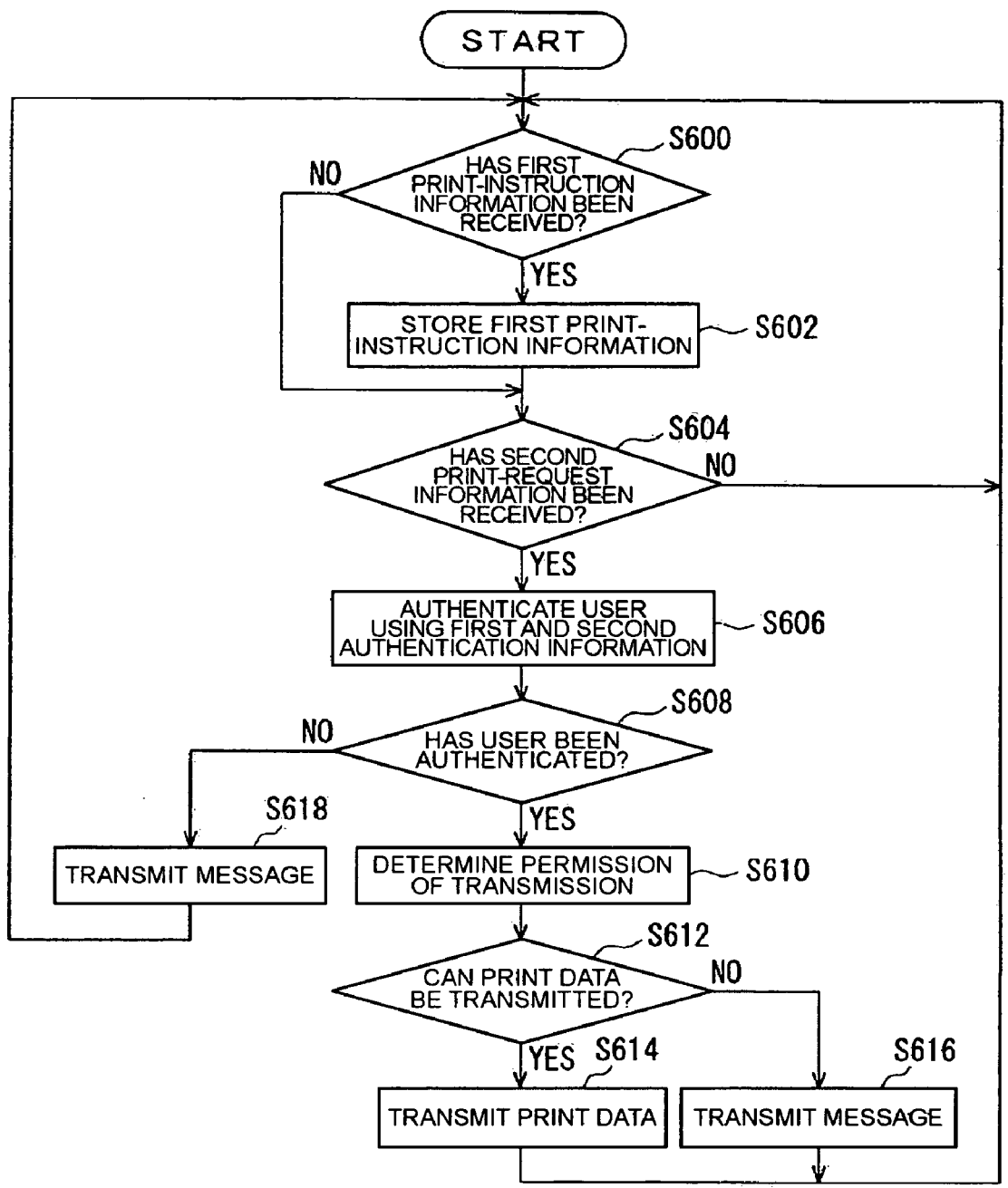
FIG. 16 is a flowchart for the print-data relay process of the first printer.

The first printer 7 starts a specified program stored in a region of the ROM by the CPU, and executes the print-data relay process shown in the flowchart of FIG. 16 in accordance with the program.

FIG. 16 is a flowchart for the print-data relay process of the first printer 7.

When the print-data relay process is started by the CPU, the procedure moves to step S600, as shown in FIG. 16.

In step S600, the data control section 7b determines whether or not first print-instruction information has been received from the information processor 2, wherein when a positive determination is made (Yes), the procedure moves to step S602; when a negative determination is made (No), the procedure moves to step S604.

When the procedure moves to step S602, the data control section 7b stores the first print-instruction information received in step S600 in the data storage section 7c, and the procedure moves to step S604.

In step S604, the data control section 7b determines whether or not the second print-request information has been received from the third printer 9, wherein when a positive determination is made (Yes), the procedure moves to step S606; when a negative determination is made (No), the procedure moves to step S600.

In step S606, the authentication section 7d compares second authentication information contained in the second print-request information to first authentication information contained in the first print-instruction information stored in the data storage section 7c, thereby executes user authentication according to whether or not the authentication information match, and the procedure moves to step S608.

In step S608, the transmission-permission determination section 7e determines whether or not the user has been authenticated from the authentication result of step S606, wherein when a positive determination is made (Yes), the procedure moves to step S610; when a negative determination is made (No), the procedure moves to step S618.

In step S610, the transmission-permission determination section 7e determines whether or not print data can be transmitted to the destination second printer 8 on the basis of the operating-condition information contained in the second print-request information, and the procedure moves to step S612.

In step S612, the data control section 7b determines whether or not print data can be transmitted to the destination second printer 8 on the basis of the determination result of step S610, wherein when a positive determination is made (Yes), the procedure moves to step S614; when a negative determination is made (No), the procedure moves to step S616.

When the procedure moves to step S614, the data control section 7b transmits print data corresponding to the second print-request information to the third printer 9 corresponding to the IP address contained in the second print-request information via the data communication section 7a, and the procedure moves to step S600.

On the other hand, when the procedure moves to step S616, the data control section 7b sends a message indicative of that print data cannot be transmitted, to the third printer 9 corresponding to the IP address contained in the second print-request information, and the procedure moves to step S600.

On the other hand, in step S608, when there is no first print-instruction information corresponding to the second print-request information, so that the user is not authenticated, and the procedure moves to step S618, a message indicative of that the user was not authenticated is sent to the third printer 9 corresponding to the IP address contained in the print-request information, and the procedure moves to step S600.

Figure 17:
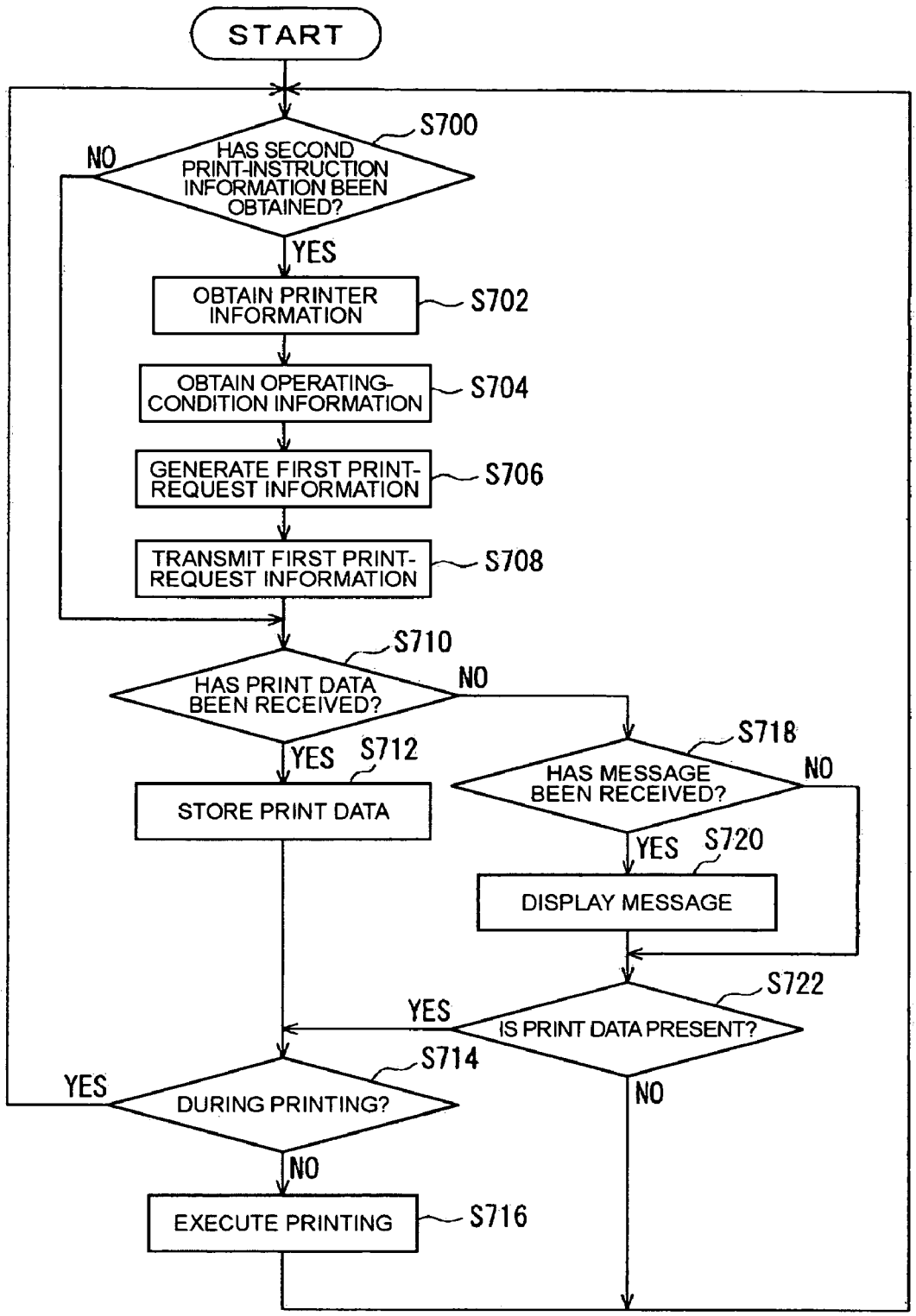
FIG. 17 is a flowchart for the print-data acquisition process and printing process of the second printer.

The second printer 8 starts a specified program stored in a region of the ROM by the CPU, and executes the print-data acquisition process and printing process shown in the flowchart of FIG. 17 in accordance with the program.

FIG. 17 is a flowchart for the print-data acquisition process and printing process of the second printer 8.

When the print-data acquisition process and printing process are started by the CPU, the procedure moves to step S700, as shown in FIG. 17.

In step S700, the data control section 8b determines whether or not second print-instruction information has been given via the print-instruction-information acquisition section 8d, wherein when a positive determination is made (Yes), the procedure moves to step S702; when a negative determination is made (No), the procedure moves to step S710.

When the procedure moves to step S702, the first print-request-information generating section 8e obtains information (IP address in this case) of the second printer 8 from the data storage section 8c via the data control section 8b, and the procedure moves to step S704.

In step S704, the data control section 8b obtains operating-condition information indicative of the operating condition of the print function from the printing section 8f, and transmits the obtained operating-condition information to the first print-request-information generating section 8e, and the procedure moves to step S706.

In step S706, first print-request information is generated on the basis of the second print-instruction information obtained in step S700, the information of the second printer 8 obtained in step S702, and the operating-condition information obtained in step S704, and the procedure moves to step S708.

In step S708, the data control section 8b transmits the first print-request information generated in step S706 to the third printer 9 via the data communication section 8a, and the procedure moves to step S710.

In step S710, the data control section 8b determines whether or not print data has been given from the third printer 9 via the data communication section 8a, wherein when a positive determination is made (Yes), the procedure moves to step S712; when a negative determination is made (No), the procedure moves to step S718.

When the procedure moves to step S712, the data control section 8*b* stores the print data received in step S710 in the data storage section 8*c*, and the procedure moves to step S714.

In step S714, the data control section 8*b* determines whether or not the printing section 8*f* is in process of printing, wherein when a positive determination is made (Yes), the procedure moves to step S700; when a negative determination is made (No), the procedure moves to step S716.

When the procedure moves to step S716, the printing section 8*f* executes printing in accordance with the print data stored in step S712, and the procedure moves to step S700.

On the other hand, when print data is not received in step S710, and the procedure moves to step S718, the data control section 8*b* determines whether or not a message indicative of that print data cannot be sent is received from the third printer 9, wherein when a positive determination is made (Yes), the procedure moves to step S720; when a negative determination is made (No), the procedure moves to step S722.

When the procedure moves to step S720, the data control section 8*b* displays the message received in step S718 on a display (not shown), and the procedure moves to step S722.

In step S722, the data control section 8*b* determines whether or not unprocessed print data is present in the data storage section 8*c*, wherein when a positive determination is made (Yes), the procedure moves to step S714; when a negative determination is made (No), the procedure moves to step S700.

Figure 18:
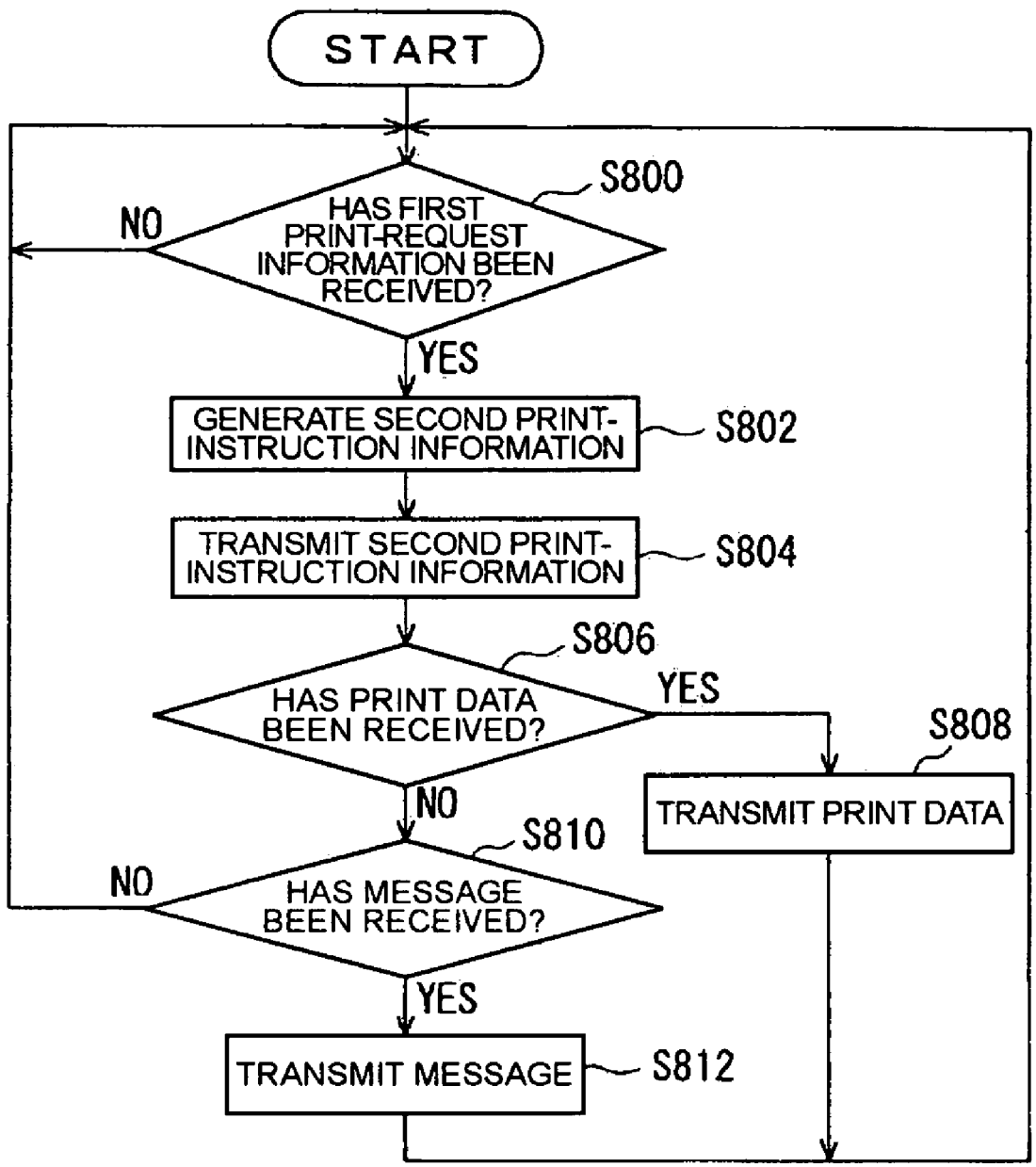
FIG. 18 is a flowchart for the print-data relay process of the third printer.

The third printer 9 starts a specified program stored in a region of the ROM by the CPU, and executes the print-data relay process shown in the flowchart of FIG. 18 according to the program.

FIG. 18 is a flowchart for the print-data relay process of the third printer 9.

When the print-data relay process is started by the CPU, the procedure moves to step S800, as shown in FIG. 18.

In step S800, the data control section 9*b* determines whether or not first print-request information sent from the second printer 8 has been received via the data communication section 9*a*, wherein when a positive determination is made (Yes), the procedure moves to step S802; when a negative determination is made (No), the process stands by until it is received.

When the procedure moves to step S802, the second print-request-information generating section 9*d* adds the information (IP address) of the third printer 9 to the first print-request information received in step S800 to generate second print-request information, and the procedure moves to step S804.

In step S804, the data control section 9*b* transmits the second print-request information generated in step S802 to the first printer 7 via the data communication section 9*a*, and the procedure moves to step S806.

In step S806, the data control section 9*b* determines whether or not print data corresponding to the second print-request information sent from the first printer 7 via the data communication section 9*a* in step S804 has been received, wherein when a positive determination is made (Yes), the procedure moves to step S808; when a negative determination is made (No), the procedure moves to step S810.

When the procedure moves to step S808, the data control section 9*b* transmits the print data received in step S806 to the second printer 8 corresponding to the IP address contained in the second print-request information via the data communication section 9*a*, and the procedure moves to step S800.

On the other hand, when the procedure moves to step S810, the data control section 9*b* determines whether or not a message has been received which indicates that print data corresponding to the second print-request information sent from the first printer 7 via the data communication section 9*a* in step S804 cannot be transmitted, wherein when a positive determination is made (Yes), the procedure moves to step S812; when a negative determination is made (No), and the procedure moves to step S800.

When the procedure moves to step S812, the data control section 9*b* transmits the message received in step S810 to the second printer 8 corresponding to the IP address contained in the second print-request information sent in step S804, and the procedure moves to step S800.

Referring to FIGS. 19A to 19G, the operation of this embodiment will be described.

FIG. 19A shows examples of IP addresses assigned to the first printer 7, the second printer 8, and the third printer 3; FIG. 19B shows an example of the data structure of the first print-instruction information; FIG. 19C shows an example of the data structure of the second print-instruction information; FIG. 19D shows an example of the data structure of the first print-request information; FIG. 19E shows an example of the data structure of the second print-request information; FIG. 19F shows an example of the first print-request information when the operating condition is abnormal; and FIG. 19G shows an example of the second print-request information when the operating condition is abnormal.

In the information processor 2, a print instruction is given from a document editor or the like (step S100). The print-instruction-information generating section 2*d* reads print data, user information, etc. from the data storage section 2*c* (steps S102 and S104), and generates first print-instruction information (step S106). The first print-instruction information is what header information containing user information, the number of sets, and destination address information, as shown in FIG. 19B, is added to data that is converted from document data to page-description language. For the destination-address information in FIG. 19B, the IP address "111. 111. 111. 006" of the first printer 7 on the network 5 is set, as shown in FIG. 19A. The data control section 2*b* transmits the first print-instruction information generated by the print-instruction-information generating section 2*d* to the first printer 7 corresponding to the IP address via the data communication section 2*a* (step S108).

Upon reception of the first print-instruction information sent from the information processor 2 via the data communication section 7*a* (step S600), the first printer 7 stores the received first print-instruction information in the data storage section 7*c* (step S602).

When the user provides instructions to print data created by an editor or the like to the information processor 2, the user makes the card reader of the second printer 8 connected to a network that is different from that of the first printer 7 read a magnetic card to which information on the user is written. Thus, the print-instruction-information acquisition section 8*d* can obtain the user information (second authentication information) EPS\0001234, shown in FIG. 19C, as second print-instruction information (step S700).

When the second print-instruction information is provided, the second printer 8 obtains the IP address "111. 111. 112. 001" of the second printer 8, shown in FIG. 19A, from the data storage section 8*c* via the data control section 8*b* by the first print-request-information generating section 8*e* (step S702). The data control section 8*b* obtains the information on the operating condition of the second printer 8 via the printing section 8*f*, and transmits the obtained operating-condition information to the first print-request-information generating section 8*e* (S704). When the first print-request-information generating section 8*e* obtains the second print-instruction information, the information of the second printer 8, and the operating-condition information, it generates the first print-request information, shown in FIG. 19D, (step S706). Here the operating-condition information indicates "normal", showing that there is no problem in printing process. When the first print-request information is generated by the first print-request-information generating section 8*e*, the data control section 8*b* transmits the generated first print-request information to the third printer 9 via the data communication section 8*a* (step S708). In this embodiment, the destination of the first print-request information is only one, the third printer 9. However, when there are two or more third printers, the first print-request information may be sent to all of them, or alternatively, to any of the third printers selected by the user.

Upon reception of the first print-request information sent from the second printer 8 via the data communication section 9*a* (step S800), the third printer 9 adds the IP address of the third printer 9 "111. 111. 111. 002", as shown in FIG. 19A, to the received first print-request information in the second print-request information generating section 9*d* to generate the second print-request information, as shown in FIG. 19E (step S802). Then the data control section 9*b* transmits the generated second print-request information to the first printer 7 via the data communication section 9*a*. In this embodiment, the destination of the second print-request information is only one, the first printer 7. However, when there are two or more first printers, the second print-request information may be sent to all of them, or alternatively, to any of the first printers selected by the user.

Upon reception of the second print-request information from the third printer 9, the first printer 7 receives the second print-request information via the data communication section 7*a* (step S604), and extracts user information (second authentication information) from the received second print-request information. The first printer 7 further reads the first print-instruction information stored in the data storage section 3*c*, and extracts user information (first authentication information) from the read first print-instruction information. The first printer 7 then compares the extracted first and second authentication information to each other to determine whether or not both information match.

Since the data storage section 7*c* of the first printer 7 stores the first print-instruction information shown in FIG. 19B, the first printer 7 extracts the first authentication information "EPS\0001234" from the first print-instruction information, similarly extracts second authentication information "EPS\0001234" from the received second print-request information shown in FIG. 19E, and compares the information (step S606). The comparison shows that they match each other. Thus the procedure moves to the process of the transmission-permission determination section 7*e* from a conclusion that the user is authenticated because there is first print-instruction information corresponding to the second print-request information (step S608). The transmission-permission determination section 7*e* determines whether or not print data corresponding to the authenticated second print-request information can be sent to the destination second printer 8 on the basis of the operating-condition information contained in the second print-request information (step S610). Here the operating-condition information in the second print-request information indicates "normal", as shown in FIG. 19E. Accordingly, the transmission-permission determination section 7*e* determines that the print data can be sent to the second printer 8 (step S612), so that print data corresponding to the second print-request information is sent to the third printer 9 via the data communication section 7*a* (step S614).

When the print data corresponding to the second print-request information shown in FIG. 19E is sent from the first printer 7, the third printer 9 receives the print data via the data communication section 9*a* (step S806), and transmits the received print data to the second printer 8 corresponding to the IP address "111. 111. 112. 001" contained in the second print-request information via the data communication section 9*a* (step S808).

Upon reception of the print data sent from the third printer 9 via the data communication section 8*a* (step S710), the second printer 8 stores the received print data in the data storage section 7*c* (step S7122). Then the second printer 8 inquires of the printing section 7*f* to determine whether or not it is in process of printing (step S714), wherein when a negative determination is made, the printing section 7*f* executes printing according to the print data that was stored before (step S716).

On the other hand, when the data control section 8*b* obtains information indicative of "excess printing" in which a large amount of print data is being printed" as operating-condition information from the printing section 8*f* in the second printer 8, the first print-request-information generating section 8*e* generates first print-request information, as shown in FIG. 19F. The transmission-permission determination section 7*e* of the first printer 7, which has received the second print-request information generated from the first print-request information, determines that no print data can be sent to the second printer 8 because the destination second printer 8 is in the condition of "excess printing" after the authentication (step S612), and transmits a message indicative of that transmission is disabled to the third printer 9 (step S614). Upon reception of the message (step S810), the third printer 9 transmits the message to the second printer 8 corresponding to the IP address contained in the second print-request information (step S812). Upon reception of the message indicative of transmission-disabled from the third printer 9 (step S718), the second printer 8 displays the received message on a display (not shown) (step S720). Thus the user is notified of that the second printer 8 cannot execute printing.

As in the first and second embodiments, the permission of transmission may be determined from printable time zone. In this case, the transmission-permission determination section 8*e* determines that no print data can be sent to the second printer 8 when the second-print-request-information reception time is outside the time zone 8:00-22:00.

Since the printing system 6 transmits first print-request information to the third printer 9, the second printer 8 can thus obtain print data sent from the information processor 2 from the first printer 7 that has the first print-instruction information corresponding to the first print-request information via the third printer 9, thereby printing it. Accordingly, the print data from the information processor 2 can be obtained by the second printer 8 for confidential printing without the intermediary of a printer server or the like, and can be printed.

Also, the transmission-permission determination section 8*e* can determine whether or not print data can be sent to the destination second printer 8 on the basis of operating-condition information. This can prevent transmission of print data when the second printer 8 is disabled.

Also, since the print data from the first printer 7 is transferred to the second printer 8 via the third printer 9, the print data can be obtained from the first printer 7 that is on a network that is different from that of the second printer 8 without the intermediary of the FW system 11 that can transmit only the data to/from the third printer 9.

In the third embodiment, the print-instruction-information generating section 2*d* corresponds to the print-instructioninformation generating unit of Form 3; and the process of transmitting print-instruction information by the data control section 2b and the data communication section 2a corresponds to the print-instruction-information transmission unit of Form 3.

In the third embodiment, the process of storing first print-instruction information by the data control section 7b and the data storage section 7c corresponds to the process of the print-instruction-information storage unit of Form 3; the authentication section 7d corresponds to the determination unit of one of Forms 3, 7, 8, 13, 20, 21, 51, 57, and 58; the process of transmitting print data to the third printer 9 by the data control section 7b and the data communication section 7a corresponds to the process of the first print-data transmission unit of one of Forms 3, 13, and 51; and the transmission-permission determination section 7e corresponds to the operation-transmission determination unit of one of Forms 8, 21, and 58.

In the third embodiment, the print-instruction-information acquisition section 8d corresponds to the print-instruction information acquisition unit of one of Forms 3, 14, and 52; and the process of generating first print-request information by the first print-request-information generating section 8e and the process of transmitting the first print-request information to the third printer 9 by the data control section 8b and the data communication section 8a correspond to the process of the first print-request-information transmission unit of one of Forms 3, 14, and 52.

In the third embodiment, the process of obtaining second print-request information (including operating-condition information) of the data control section 7b and the data communication section 7a corresponds to the process of the operating-condition-information acquisition unit of one of Forms 8, 21, and 58.

In the third embodiment, the process of generating second print-request information by the second print-request-information generating section 9d and the process of transmitting the second print-request information to the first printer 7 by the data control section 9b and the data communication section 9a correspond to the process of the second print-request-information transmission unit of one of Forms 3, 13, 15, 26, 39, 51, 53, 62, and 73; and the process of transmitting print data to the second printer 8 by the data control section 9b and the data communication section 9a corresponds to the process of the second print-data transmission unit of Form 3.

In the third embodiment, step S602 corresponds to the first print-instruction-information storage step of one of Forms 26, 39, 62, and 73; steps S604 to S608 correspond to the determination step of one of Forms 26, 33, 34, 39, 46, 47, 62, 68, 69, 73, 79, and 80; steps S610 and S612 correspond to the operation-transmission determination step of one of Forms 34, 47, 69, and 80; and step S614 corresponds to the first print-data transmission step of one of Forms 26, 39, 62, and 73.

In the third embodiment, step S700 corresponds to the print-instruction-information acquisition step of one of Forms 27, 40, 63, and 74; and steps S702 to S708 correspond to the first print-request-information transmission step of one of Forms 27, 40, 63, and 74.

The third embodiment may also include no print data in the first print-instruction information, as in the second embodiment. With such a structure, the first printer 7 increases in the number of procedures for obtaining print data corresponding to the second print-request information from the information processor 2 when print data can be sent to the second printer 8 as a result of determination for the permission of transmission. Accordingly, the details of the process of the information processor 2 and the first printer 7 are partly different in the system configuration of the third embodiment, as in the second embodiment. The operation of the information processor 2 is the same as the flowchart of FIG. 9 according to the second embodiment except that the third printer 9 is interposed between the first printer 7 and the second printer 8. The operation of the first printer 7 can be achieved by executing the process of steps S520 to S524 of the flowchart for the first printer 3 shown in FIG. 10 after step S612 of the flowchart for the first printer 7 shown in FIG. 16. At that time, the print data and the message are sent to the second printer 8 via the third printer 9.

Since the printing system transmits first print-request information to the third printer 9, the second printer 8 can thus obtain print data sent from the information processor 2 from the first printer 7 that has the first print-instruction information corresponding to the first print-request information via the third printer 9, thereby printing it. Thus the first printer 7 can obtain the print data corresponding to the second print-request information from the third printer 9 from the information processor 2 and transmit it to the third printer 9. Accordingly, the first printer 7 has to only store first print-instruction information that contains no print data and manage it, thus reducing the memory capacity of data necessary for relaying print data.

In this case, the print-instruction-information generating section 2d corresponds to the print-instruction-information generating unit of Form 4; the process of transmitting the first print-instruction information by the data control section 2b and the data communication section 2a corresponds to the process of the print-instruction-information transmission unit of Form 4; the process of storing print data corresponding to the first print-instruction information by the data control section 2b and the data storage section 2c corresponds to the process of the print-data storage unit of Form 4; and the process of transmitting print data to the first printer 7 in response to the acquisition-request information of the data control section 2b and the data communication section 2a corresponds to the first print-data transmission unit of Form 4.

The process of storing first print-instruction information by the data control section 7b and the data storage section 7c corresponds to the process of the print-instruction-information storage unit of Form 4; the authentication section 7d corresponds to the determination unit of one of Forms 4, 7, 8, 16, 20, 21, 54, 57, and 58; the process of transmitting print data to the third printer 9 by the data control section 7b and the data communication section 7a corresponds to the process of the second print-data transmission unit of one of Forms 4, 16, and 54; the transmission-permission determination section 7e corresponds to the operation-transmission determination unit of one of Forms 8, 21, and 58; and the process of transmitting acquisition-request information to the information processor 2 by the data control section 7b and the data communication section 7a corresponds to the process of the acquisition-request-information transmission unit of one of Forms 4, 16, and 54.

The print-instruction-information acquisition section 8d corresponds to the print-instruction-information acquisition unit of one of Forms 4, 17, and 55; and the process of generating first print-request information by the first print-request-information generating section 8e and the process of transmitting the first print-request information to the third printer 9 by the data control section 8b and the data communication section 8a correspond to the process of the first print-request-information transmission unit of one of Forms 4, 17, and 55.

The process of obtaining second print-request information (including operating-condition information) of the data control section 7b and the data communication section 7a corresponds to the process of the operating-condition-information acquisition unit of one of Forms 8, 21, and 58.

The process of generating second print-request information by the second print-request-information generating section 9d and the process of transmitting the second print-request information to the first printer 7 by the data control section 9b and the data communication section 9a correspond to the process of the second print-request-information transmission unit of one of Forms 4, 16, 29, 42, 54, 65, and 76; and the process of transmitting print data to the second printer 8 by the data control section 9b and the data communication section 9a corresponds to the process of the third print-data transmission unit of one of Forms 4, 15, and 53.

Step S602 corresponds to the print-instruction-information storage step of one of Forms 29, 42, 65, and 76; steps S604 to S608 correspond to the determination step of one of Forms 29, 33, 34, 42, 46, 47, 65, 68, 69, 76, 79, and 80; and steps S610 and S612 correspond to the operating-condition-transmission determination step of one of Forms 34, 47, 69, and 80.

When the process of steps S520 to S524 in FIG. 10 is provided after step S612 of FIG. 16 as steps S614 to S618, step S614 corresponds to the acquisition-request-information transmission step of one of Forms 29, 42, 65, and 76; and step S618 corresponds to the third print-data transmission step of one of Forms 28, 41, 64, and 75.

In the third embodiment, step S700 corresponds to the print-instruction-information acquisition step of Form 30 or 43; and steps S702 to S708 correspond to the first print-request-information transmission step of Form 30 or 43.

In the first and second embodiments, print-request information containing user information (second authentication information) is sent to the first printer. The invention is not limited to that, but may have a structure in which print-request information containing no user information is transmitted to the first printer to establish the connection between the second printer and the first printer, and then user information is transmitted from the second printer 4 to the first printer 3.

Although the first and second embodiments have been described using an example in which the first printer 3 has no confidential printing function, the invention is not limited to that; also the first printer 3 may have the confidential printing function.

Although the third embodiment has been described using an example in which the first printer 7 and the third printer 9 have no confidential printing function, the invention is not limited to that; at least one of the first printer 7 and the third printer 9 may have the confidential printing function.

Although the first to third embodiments determine a destination printer by the IP addresses of the printers and information processor, to which data is transmitted, the invention is not limited to that; any information for determining a destination printer, such as a MAC address, may be used.

The foregoing embodiments have been described for the case in which control programs stored in the ROM are executed to execute the processes of the flowcharts of FIGS. 5 to 7, FIGS. 9 and 10, and FIGS. 16 to 18. The invention is not limited to that; the processes may be executed by reading programs indicative of the procedures from a storage medium which stores the program to a RAM.

Examples of the storage medium are semiconductor storage media such as a RAM and a ROM; magnetic storage media, such as an FD and an HD; optical-reading storage media such as a CD, a CDV, an LD, and a DVD; and magnetic/optical-reading storage media such as an MO, which include any computer-readable storage media irrespective of the reading method: electrical, magnetic, or optical.

What is claimed is:

1. A printing system comprising:

a first printer;

a second printer connected to the first printer, the first and second printers executing printing based on print data; and a print instruction unit connected to the first printer, wherein the first printer and the print instruction unit are connected so that data can be transmitted, and the first printer and the second printer are connected so that data can be transmitted;

the print instruction unit includes:

a print-instruction-information generating unit that generates first print-instruction information containing the print data and first authentication information;

a print-instruction-information transmission unit that transmits the first print-instruction information generated by the print-instruction-information generating unit to the first printer;

a print-instruction-information acquisition unit that obtains second print-instruction information of the print data for the second printer, the second print-instruction information containing second authentication information corresponding to the first authentication information; and a print-request-information transmission unit that transmits print-request information to the first printer, the print-request information containing information on the second printer in addition to the second print-instruction information obtained by the print-instruction-information acquisition unit;

the first printer includes:

a print-instruction-information storage unit that stores the first print-instruction information received from the print instruction unit;

a determination unit that receives the print-request information transmitted from the print-request-information transmission unit, and determines whether there is first print-instruction information corresponding to the print-request information based on the second authentication information in the received print-request information and the first authentication information contained in the first print-instruction information stored in the print-instruction-information storage unit; and a print-data transmission unit that transmits print data corresponding to the print-request information to the second printer corresponding to the print-request information when it is determined from the determination result of the determination unit that first print-instruction information corresponding to the print-request information is present; and the second printer executes printing based on the print data received from the first printer and corresponding to the print-request information.

2. A printing system comprising:

a first printer;

a second printer connected to the first printer, the first and second printers executing printing based on print data; and a print instruction unit connected to the first printer, wherein the first printer and the print instruction unit are connected so that data can be transmitted, and the first printer and the second printer are connected so that data can be transmitted;

the print instruction unit includes:
- a print-instruction-information generating unit that generates first print-instruction information containing first authentication information corresponding to the print data;
- a print-data storage unit that stores print data corresponding to the first print-instruction information;
- a print-instruction-information transmission unit that transmits the first print-instruction information generated by the print-instruction-information generating unit to the first printer;
- a first print-data transmission unit that reads print data corresponding to the print-data-acquisition-request information received from the first printer from the print-data storage unit and transmits the read print data to the first printer that is the source of the acquisition-request information;
- a print-instruction-information acquisition unit that obtains second print-instruction information of the print data for the second printer, the second print-instruction information containing second authentication information corresponding to the first authentication information; and
- a print-request-information transmission unit that transmits print-request information to the first printer, the print-request information containing information on the second printer in addition to the second print-instruction information obtained by the print-instruction-information acquisition unit;

the first printer includes:
- a print-instruction-information storage unit that stores the first print-instruction information received from the print instruction unit;
- a determination unit that receives the print-request information transmitted from the print-request-information transmission unit and determines whether there is first print-instruction information corresponding to the print-request information based on the second authentication information in the received print-request information and the first authentication information contained in the print-instruction information stored in the print-instruction-information storage unit;
- an acquisition-request-information transmission unit that transmits acquisition-request information of print data corresponding to the first print-instruction information to the print instruction unit when it is determined from the determination result of the determination unit that first print-instruction information corresponding to the print-request information is present; and
- a second print-data transmission unit that transmits print data corresponding to the acquisition-request information received from the print instruction unit to a second printer corresponding to the print-request information; and the second printer executes printing based on the print data received from the first printer and corresponding to the print-request information.

3. A printing system comprising:
- a first printer;
- a second printer;
- a third printer connected to the second printer, the printers executing printing based on print data; and
- a print instruction unit connected to the first and third printers, wherein the first printer and the print instruction unit and the third printer are connected so that data can be transmitted, and the second printer and the third printer are connected so that data can be transmitted;

the print instruction unit includes:
- a print-instruction-information generating unit that generates first print-instruction information containing the print data and first authentication information;
- a print-instruction-information transmission unit that transmits the first print-instruction information generated by the print-instruction-information generating unit to the first printer;
- a print-instruction-information acquisition unit that obtains second print-instruction information of the print data for the second printer, the second print-instruction information containing second authentication information corresponding to the first authentication information; and
- a first print-request-information transmission unit that transmits first print-request information to the third printer, the first print-request information containing information on the second printer in addition to the second print-instruction information obtained by the print-instruction-information acquisition unit;

the first printer includes:
- a print-instruction-information storage unit that stores the first print-instruction information received from the print instruction unit;
- a determination unit that determines whether there is first print-instruction information corresponding to the second print-request information, based on the second authentication information in the second print-request information received from the third printer and the first authentication information contained in the first print-instruction information stored in the print-instruction-information storage unit; and
- a first print-data transmission unit that transmits print data corresponding to the second print-request information to the third printer corresponding to the second print-request information when it is determined from the determination result of the determination unit that first print-instruction information corresponding to the second print-request information is present;

the third printer includes:
- a second print-request-information transmission unit that transmits second print-request information to the first printer, the second print-request information containing information on the third printer in addition to the first print-request information received from the second printer; and
- a second print-data transmission unit that transmits the print data received from the first printer and corresponding to the second print-request information to the second printer corresponding to the second print-request information; and the second printer executes printing based on the print data received from the third printer and corresponding to the print-request information.

4. A printing system comprising:
- a first printer;
- a second printer;

a third printer connected to the second printer, the printers executing printing based on print data; and
a print instruction unit connected to the first and third printers, wherein
the first printer and the print instruction unit and the third printer are connected so that data can be transmitted, and the second printer and the third printer are connected so that data can be transmitted;
the print instruction unit includes:
  a print-instruction-information generating unit that generates first print-instruction information containing first authentication information corresponding to the print data;
  a print-data storage unit that stores print data corresponding to the first print-instruction information;
  a print-instruction information transmission unit that transmits the first print-instruction information generated by the print-instruction-information generating unit to the first printer;
  a first print-data transmission unit that reads print data corresponding to the print-data-acquisition-request information received from the first printer from the print-data storage unit and transmits the read print data to the first printer that is the source of the acquisition-request information;
  a print-instruction-information acquisition unit that obtains second print-instruction information of the print data for the second printer, the second print-instruction information containing second authentication information corresponding to the first authentication information; and
  a first print-request-information transmission unit that transmits first print-request information to the third printer, the first print-request information containing information on the second printer in addition to the second print-instruction information obtained by the print-instruction-information acquisition unit;
the first printer includes:
  a print-instruction-information storage unit that stores the first print-instruction information received from the print instruction unit;
  a determination unit that determines whether there is first print-instruction information corresponding to the second print-request information, based on the second authentication information in the second print-request information received from the third printer and the first authentication information contained in the first print-instruction information stored in the print-instruction-information storage unit;
  an acquisition-request-information transmission unit that transmits acquisition-request information of print data corresponding to the first print-instruction information to the print instruction unit when it is determined from the determination result of the determination unit that first print-instruction information corresponding to the second print-request information is present; and
  a second print-data transmission unit that transmits print data received from the print instruction unit and corresponding to the second acquisition-request information to the third printer corresponding to the second print-request information;
the third printer includes:
  a second print-request-information transmission unit that transmits second print-request information containing information on the third printer in addition to the first print-request information received from the second printer to the first printer; and
  a third print-data transmission unit that transmits print data received from the first printer and corresponding to the second print-request information to the second printer corresponding to the second print-request information; and
the second printer executes printing based on the print data received from the third printer and corresponding to the print-request information.

5. A printer comprising:
  a print-instruction-information storage unit that stores print-instruction information received from a print instruction unit and containing print data and first authentication information;
  a determination unit that receives print-request information transmitted from a print-request-information transmission unit that transmits print-request information on the print data, the print-request information containing second authentication information corresponding to the first authentication information and information on another printer, and determines whether there is print-instruction information corresponding to the print-request information based on the second authentication information in the received print-request information and the first authentication information contained in the print-instruction information stored in the print-instruction-information storage unit; and
  a print-data transmission unit that transmits print data corresponding to the print-request information to another printer corresponding to the print-request information when it is determined from the determination result of the determination unit that print-instruction information corresponding to the print-request information is present.

6. The printer according to claim 5, further comprising a time-transmission determination unit that determines whether to transmit the print data to the second printer corresponding to the print-request information based on time-zone information on a predetermined printable time zone and time information on the reception of the print-request information when the determination unit determines that there is print-instruction information corresponding to the print-request information.

7. The printer according to claim 5, further comprising:
  an operating-condition-information acquisition unit that obtains operating-condition information indicative of the operating condition of the second printer that is the destination of the print data; and
  an operation-transmission determination unit that determines whether to transmit the print data to the second printer corresponding to the print-request information based on the obtained operating-condition information.

8. A printer comprising:
  a print-instruction-information storage unit that stores print-instruction information received from a print instruction unit and containing first authentication information;
  a determination unit that receives print-request information transmitted from a print-request-information transmission unit that transmits print-data-print-request information containing second authentication information corresponding to the first authentication information and information on a source printer, and determines whether there is print-instruction information corresponding to the print-request information based on the second authentication information in the received print-request information and the first authentication information contained in the print-instruction information stored in the print-instruction-information storage unit;

an acquisition-request-information transmission unit that transmits print-data-acquisition-request information corresponding to the print-request information to the print instruction unit when it is determined from the determination result of the determination unit that print-instruction information corresponding to the print-request information is present; and a print-data transmission unit that transmits print data corresponding to the acquisition-request information received from the print instruction unit to the source printer corresponding to the print-request information.

9. A printer comprising:

a print-instruction-information storage unit that stores print-instruction information received from a print instruction unit and containing print data and first authentication information;

a determination unit that receives print-request information transmitted from a print-request-information transmission unit that transmits print-request information containing second authentication information corresponding to the first authentication information, information on a source printer, and information on a second printer that is different from the source printer, and determines whether there is print-instruction information corresponding to the print-request information based on the second authentication information in the received print-request information and the first authentication information contained in the print-instruction information stored in the print-instruction-information storage unit; and a print-data transmission unit that transmits print data corresponding to the print-request information to the second printer corresponding to the print-request information when it is determined from the determination result of the determination unit that print-instruction information corresponding to the print-request information is present.

10. A printer comprising:

a print-instruction-information storage unit that stores print-instruction information received from a print instruction unit and containing first authentication information;

a determination unit that receives the print-request information transmitted from a print-request-information transmission unit that transmits print-request information containing second authentication information corresponding to the first authentication information, information on a source printer, and information on a second printer that is different from the source printer, and determines whether there is print-instruction information corresponding to the print-request information based on the second authentication information in the received print-request information and the first authentication information contained in the print-instruction information stored in the print-instruction-information storage unit;

an acquisition-request-information transmission unit that transmits print-data-acquisition-request information corresponding to the print-instruction information to the print instruction unit when it is determined from the determination result of the determination unit that print-instruction information corresponding to the print-request information is present; and a print-data transmission unit that transmits print data corresponding to the acquisition-request information received from the print instruction unit to the second printer corresponding to the print-request information.

11. A printer control program stored in a computer readable medium comprising a program for a computer to use in executing:

storing print-instruction information received from a print instruction unit in a print-instruction-information storage unit, the print-instruction information containing print data and first authentication information;

receiving the print-request information transmitted from a print-request-information transmission unit that transmits print-request information on the print data, the print-request information containing second authentication information corresponding to the first authentication information and information on a source printer, and determining whether there is print-instruction information corresponding to the print-request information based on the second authentication information in the received print-request information and the first authentication information contained in the first print-instruction information stored in the print-instruction-information storage unit; and transmitting print data corresponding to the print-request information to the source printer corresponding to the print-request information when it is determined from the determination result of the determination step that print-instruction information corresponding to the print-request information is present.

12. A printer control program stored in a computer readable medium comprising a program for a computer to use in executing:

obtaining second print-instruction information of the print data for a printer, the second print-instruction information containing second authentication information corresponding to first authentication information in first print-instruction information containing the first authentication information; and transmitting print-request information to another printer that is different from the printer, the print-request information containing information on the printer in addition to the second print-instruction information obtained in the print-instruction-information acquisition step.

13. A printer control program stored in a computer readable medium comprising a program for a computer to use in executing:

storing print-instruction information received from a print instruction unit in a print-instruction-information storage unit, the print-instruction information containing first authentication information;

receiving print-request information transmitted from a print-request-information transmission unit that transmits print-request information on the print data, the print-request information containing second authentication information corresponding to the first authentication information and information on a source printer, and determining whether there is print-instruction information corresponding to the print-request information based on the second authentication information in the received print-request information and the first authentication information contained in the print-instruction information stored in the print-instruction-information storage unit;

transmitting print-data-acquisition-request information corresponding to the print-instruction information to the print instruction unit when it is determined from the determination result of the determination step that print-instruction information corresponding to the print-request information is present; and transmitting print data corresponding to the print-request information received from the print instruction unit to the source printer corresponding to the print-request information.

14. A printer control program stored in a computer readable medium comprising a program for a computer to use in executing:

storing print-instruction information received from a print instruction unit in a print-instruction-information storage unit, the print-instruction information containing print data and first authentication information;

receiving print-request information transmitted from a print-request-information transmission unit that transmits print-request information, the print-request information containing second authentication information corresponding to the first authentication information, information on a source printer, and information on a second printer that is different from the source printer, and determining whether there is print-instruction information corresponding to the print-request information based on the second authentication information in the received print-request information and the first authentication information contained in the print-instruction information stored in the print-instruction-information storage unit; and transmitting print data corresponding to print-request information to the second printer corresponding to the print-request information when it is determined from the determination result of the determination step that print-instruction information corresponding to the print-request information is present.

15. A printer control program stored in a computer readable medium comprising a program for a computer to use in executing:

storing print-instruction information received from a print instruction unit in a print-instruction-information storage unit, the print-instruction information containing first authentication information;

receiving print-request information transmitted from a print-request-information transmission unit that transmits print-request information containing second authentication information corresponding to the first authentication information, information on a printer, and information on a second printer that is different from the printer, and determining whether there is print-instruction information corresponding to the print-request information based on the second authentication information in the received print-request information and the first authentication information contained in the print-instruction information stored in the print-instruction-information storage unit;

transmitting print-data-acquisition-request information corresponding to the print-instruction information to the print instruction unit when it is determined from the determination result of the determination step that print-instruction information corresponding to the print-request information is present; and transmitting print data corresponding to the acquisition-request information received from the print instruction unit to a printer corresponding to the print-request information.

16. A printer control method comprising:

storing print-instruction information received from a print instruction unit in a print-instruction-information storage unit, the print-instruction information containing print data and first authentication information;

receiving print-request information transmitted from a print-request-information transmission unit that transmits the print-request information on the print data, the print-request information containing second authentication information corresponding to the first authentication information and information on a printer, and determining whether there is print-instruction information corresponding to the print-request information based on the second authentication information in the received print-request information and the first authentication information contained in the first print-instruction information stored in the print-instruction-information storage unit; and transmitting print data corresponding to the print-request information to a printer corresponding to the print-request information when it is determined from the determination result of the determination step that print-instruction information corresponding to the print-request information is present.

17. A printer control method comprising:

storing print-instruction information received from a print instruction unit in a print-instruction-information storage unit, the print-instruction information containing first authentication information;

receiving print-request information transmitted from a print-request-information transmission unit that transmits the print-data-print-request information, the print-request information containing second authentication information corresponding to the first authentication information and information on a source printer, and determining whether there is print-instruction information corresponding to the print-request information, based on the second authentication information in the received print-request information and the first authentication information contained in the print-instruction information stored in the print-instruction-information storage unit;

transmitting print-data-acquisition-request information corresponding to the print-request information to the print instruction unit when it is determined from the determination result of the determination step that print-instruction information corresponding to the print-request information is present; and transmitting print data corresponding to the acquisition-request information received from the print instruction unit to a printer corresponding to the print-request information.

18. A printer control method comprising:

storing print-instruction information received from a print instruction unit in a print-instruction-information storage unit, the print-instruction information containing print data and first authentication information;

receiving second print-request information transmitted from a print-request-information transmission unit that transmits the second print-request information containing second authentication information corresponding to the first authentication information, information on a source printer, and information on a second printer that is different from the source printer, and determining whether there is print-instruction information corresponding to the second print-request information, based on the second authentication information in the received print-request information and the first authentication information contained in the print-instruction information stored in the print-instruction-information storage unit; and transmitting print data corresponding to the print-request information to the second printer corresponding to the print-request information when it is determined from the determination result of the determination step that first print-instruction information corresponding to the print-request information is present.

19. A printer control method comprising:

obtaining second print-instruction information for a printer, the second print-instruction information containing second authentication information corresponding to first authentication information in first print-instruction information containing the first authentication information; and transmitting print-request information to a second printer that is different from the printer, the print-request information containing information on the printer in addition to the second print-instruction information obtained in the print-instruction-information acquisition step.

20. A printer control method comprising:

transmitting second print-request information to a second printer that is different from a first printer, the second print-request information containing information on the first printer that relays print request in addition to first print-request information received from the first printer and containing second authentication information and information on the first printer; and transmitting print data corresponding to the second print-request information received from the second printer to a printer corresponding to the second print-request information.

21. A printer control method comprising:

storing print-instruction information received from a print instruction unit in a print-instruction-information storage unit, the print-instruction information containing first authentication information;

receiving print-request information transmitted from a print-request-information transmission unit that transmits the print-request information containing second authentication information corresponding to the first authentication information, information on a source printer, and information on a second printer that is different from the source printer, and determining whether there is print-instruction information corresponding to the print-request information, based on the second authentication information in the received print-request information and the first authentication information contained in the print-instruction information stored in the print-instruction-information storage unit;

transmitting print-data-acquisition-request information corresponding to the print-instruction information to the print instruction unit when it is determined from the determination result of the determination step that print-instruction information corresponding to the print-request information is present; and transmitting print data corresponding to the acquisition-request information received from the print instruction unit to the second printer corresponding to the print-request information.

* * * * *